US008447708B2

(12) United States Patent
Sabe

(10) Patent No.: US 8,447,708 B2
(45) Date of Patent: May 21, 2013

(54) METHOD AND APPARATUS THAT CARRIES OUT SELF-ORGANIZING OF INTERNAL STATES OF A STATE TRANSITION PREDICTION MODEL, AND OBTAINS A MAXIMUM LIKELIHOOD SEQUENCE

(75) Inventor: Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 12/915,616

(22) Filed: Oct. 29, 2010

(65) Prior Publication Data

US 2011/0112997 A1 May 12, 2011

(30) Foreign Application Priority Data

Nov. 11, 2009 (JP) ................................ P2009-258208

(51) Int. Cl.
*G06F 11/00* (2006.01)
(52) U.S. Cl.
USPC ........................................................... 706/12
(58) Field of Classification Search
USPC .................................................. 706/12, 45, 62
See application file for complete search history.

(56) References Cited

U.S. PATENT DOCUMENTS

| | | | | |
|---|---|---|---|---|
| 5,638,489 A * | 6/1997 | Tsuboka | ........................ | 704/256 |
| 7,346,595 B2 * | 3/2008 | Aoyama et al. | ................. | 706/25 |
| 7,725,412 B2 * | 5/2010 | Aoyama et al. | ................. | 706/20 |
| 7,747,084 B2 * | 6/2010 | Picard | ........................... | 382/228 |
| 7,783,585 B2 * | 8/2010 | Sabe et al. | ...................... | 706/16 |
| 8,290,885 B2 * | 10/2012 | Sabe et al. | ...................... | 706/14 |
| 2006/0184471 A1 * | 8/2006 | Minamino et al. | .............. | 706/16 |
| 2007/0250461 A1 * | 10/2007 | Sabe et al. | ...................... | 706/12 |
| 2007/0280006 A1 * | 12/2007 | Aoyama et al. | .......... | 365/189.01 |
| 2009/0234467 A1 * | 9/2009 | Sabe et al. | ...................... | 700/29 |

FOREIGN PATENT DOCUMENTS

JP    2009-223444    10/2009

OTHER PUBLICATIONS

Antonio Torralba et al., "Context-based Vision System for Place and Object Recognition", IEEE Int. Conf. Computer Vision, vol. 1, No. 1, pp. 273-280, 2003.

* cited by examiner

*Primary Examiner* — David Vincent
(74) *Attorney, Agent, or Firm* — Finnegan, Henderson, Farabow, Garrett & Dunner, L.L.P.

(57) ABSTRACT

An information processing device includes a model learning unit that carries out learning for self-organization of internal states of a state transition prediction model which is a learning model having internal states, a transition model of the internal states, and an observation model where observed values are generated from the internal states, by using first time series data, wherein the model learning unit learns the observation model of the state transition prediction model after the learning using the first time series data, by fixing the transition model and using second time series data different from the first time series data, thereby obtaining the state transition prediction model having a first observation model where each sample value of the first time series data is observed and a second observation model where each sample value of the second time series data is observed.

10 Claims, 26 Drawing Sheets

METHOD AND APPARATUS THAT CARRIES OUT SELF-ORGANIZING OF INTERNAL STATES OF A STATE TRANSITION PREDICTION MODEL, AND OBTAINS A MAXIMUM LIKELIHOOD SEQUENCE

BACKGROUND OF THE INVENTION

1. Field of the Invention

The present invention relates to an information processing device, an information processing method, and a program, and more particularly to an information processing device, an information processing method, and a program, which enable an agent (autonomous agent) capable of autonomously doing an action to efficiently imitate (copy) an action done by another person which is an object other than the agent.

2. Description of the Related Art

As an agent which can do actions autonomously, there is an agent which learns a learning model such as an HMM (hidden Markov model), and a controller which, for each state transition in the HMM, outputs an action to be done for causing the state transition, using an observed value sequence obtained by sensing environments (for example, refer to Japanese Unexamined Patent Application Publication No. 2009-223444).

In such an agent, a state sequence in which one state reaches another state in the HMM is obtained, and an action causing a state transition in the state sequence is done using a controller.

In addition, a human being can imitate other people except for himself/herself, and the imitation leads the human being to obtain skills or knowledge more efficiently than learning by trial and error without assistance.

As for the imitation for obtaining skills or knowledge or the like, a person doing an imitation (imitator) moves his/her own body such that, for example, a state of the imitator himself/herself becomes a state of another person who is perceived by stimuli (light from another person and the like) received from another person.

That is to say, the imitator moves his/her body such that a state of the imitator himself/herself which is (internally) perceived by the imitator himself/herself matches a state of another person perceived by stimuli received from another person.

It may be thought that when a human being (imitator) imitates another person, the imitator knows, from his/her experiences till then, senses which the imitator is likely to feel when a state of the imitator himself/herself matches a state of another person, and moves his/her body so as to obtain the senses.

Therefore, in order to do an imitation, it is necessary to correlate a state (a state of another person which is visually seen) of another person perceived by stimuli which the imitator receives from another person with senses (a state of the imitator himself/herself which the imitator feels) which the imitator is likely to feel when the state of the imitator himself/herself matches the state of another person perceived by the imitator.

Here, the correlation is also hereinafter referred to as a correlation of a state of an imitator himself/herself with a state of another person.

In order to do an imitation, as a physiological knowledge to support the necessity of the correlation of a state of an imitator himself/herself with a state of another person, there are neurons called a mirror neuron.

For example, there exists a neuron group commonly ignited in the brain when a human being himself/herself does an action (deed) (behavior) of "grasping" and when he/she observes the same action of "grasping" done by another person, and the neuron group is called the mirror neuron.

When an agent is made to imitate an object other than the agent, that is, for example, another agent, it is necessary for the agent which is an imitator to correlate a state of the imitator himself/herself with a state of another person.

However, when the agent is made to imitate an object other than the agent, that is, for example, another agent, it is difficult for the agent which is an imitator to correlate a state of the imitator himself/herself with a state of another person without any condition (assumption).

In other words, when the agent is made to imitate another agent, data indicating a state of another person is observed by the agent which is an imitator (hereinafter, also referred to as "a self agent") from another agent which is another person (hereinafter, also referred to as "the other agent"). In addition, in the self agent, data indicating a state of the imitator himself/herself is observed from internal movable parts or the like of the self agent.

In the self agent, an observed value measured as data indicating a state of another person and an observed value measured as data indicating a state of an imitator himself/herself will be observed values different in kind (modal).

Specifically, when see-and-copy is done by seeing and copying another person in order to do an imitation, in the self agent, for example, an image obtained by capturing the other agent with a camera is observed as an observed value indicating a state of another person, and angles of movable parts (for example, parts corresponding to joints) of the self agent are observed as observed values indicating a state of the imitator himself/herself (here, a state of a posture).

Since the image of the other agent and the angles of the movable parts of the self agent are observed values which are different in kind, the self agent may not determine whether or not a state of the self agent itself matches a state of the other agent contained in the image taken by the camera through comparison of the angles of the movable parts of the self agent with the image of the other agent. Therefore, it is difficult to learn (obtain) a correlation of a state of the imitator himself/herself with a state of another person, that is, for the self agent to recognize the angle of the movable parts of the self agent itself necessary to match a state of the self agent itself to a state of the other agent contained in the image of the other agent.

In order for the self agent to learn a correlation of a state of the imitator (the self agent) himself/herself with a state of another person (the other agent), it is necessary to set predetermined conditions (hereinafter, also referred to as "correlation conditions") for correlating a state of the imitator himself/herself with a state of another person to an environment where the learning is carried out.

For example, when the self agent has succeeded in doing a certain action, by designating as the correlation condition that a so-called care giver does the same action as the action in which the self agent has succeeded along with an utterance indicating the action, the self agent can correlate a state of the imitator (the self agent) himself/herself with a state of another person (the care giver).

In other words, for example, when the self agent has succeeded in doing an action of grasping a glass, by the care giver doing the action of grasping a glass along with an utterance of "grasping a glass," the self agent can correlate a state when the self agent itself does an action of grasping a glass with a state when another person (the care giver) does an action of grasping a glass.

In addition, for example, as senses of a child are prompted to be developed by parents copying actions of the child, the self agent can correlate a state of another person (the care giver) with a state of the imitator (the self agent) himself/ herself by designating as the correlation condition that the care giver copies the action done by the self agent with a significance probability.

Further, for example, a mirror is installed in front of the self agent, the correlation condition is to regard the self agent in the mirror as another person, and thereby the self agent may correlate a state of another person (the self agent in the mirror) with a state of the imitator (the self agent) himself/herself. Also, in this case, after the learning of the correlation of a state of the imitator himself/herself with a state of another person has progressed to some degree, the other agent is placed instead of the mirror, and thereby the self agent can imitate the action done by the other agent by using a result of the learning of the correlation of a state of the imitator himself/herself with a state of another person.

SUMMARY OF THE INVENTION

As described above, when the self agent imitates an action of another person such as the other agent, it is necessary to carry out learning of the correlation of a state of the imitator himself/herself with a state of another person under the correlation condition depending on the care giver or the like.

However, the learning of the correlation of a state of the imitator himself/herself with a state of another person under the correlation condition is not efficient, and moreover, it is difficult for the self agent to efficiently imitate various actions of another person such as the other agent.

Even if other people do not do an action with the intention of teaching, a human being has a capability of imitating other people's actions, and there is increase in requests for the self agent to efficiently imitate various actions of another person such that the self agent is made to have the same capability as human beings.

It is desirable for an agent to efficiently imitate actions done by another person.

According to an embodiment of the present invention, there is provided an information processing device including a model learning means or a program enabling a computer to function as an information processing device that carries out learning for self-organization of internal states of a state transition prediction model which is a learning model having internal states, a transition model of the internal states, and an observation model where observed values are generated from the internal states, by using first time series data, wherein the model learning means learns the observation model of the state transition prediction model after the learning using the first time series data, by fixing the transition model and using second time series data different from the first time series data, thereby obtaining the state transition prediction model having a first observation model where each sample value of the first time series data is observed and a second observation model where each sample value of the second time series data is observed.

According to an embodiment of the present invention, there is provided an information processing method including the steps of: carrying out learning for self-organization of internal states of a state transition prediction model which is a learning model having internal states, a transition model of the internal states, and an observation model where observed values are generated from the internal states, by using first time series data; and learning the observation model of the state transition prediction model after the learning using the first time series data, by fixing the transition model and using second time series data different from the first time series data, thereby obtaining the state transition prediction model having a first observation model where each sample value of the first time series data is observed and a second observation model where each sample value of the second time series data is observed.

As described above, learning for self-organization of internal states of a state transition prediction model which is a learning model having internal states, a transition model of the internal states, and an observation model where observed values are generated from the internal states, is carried out by using first time series data, and learning of the observation model of the state transition prediction model after the learning using the first time series data, is carried out by fixing the transition model and using second time series data different from the first time series data, thereby obtaining the state transition prediction model having a first observation model where each sample value of the first time series data is observed and a second observation model where each sample value of the second time series data is observed.

In addition, the information processing device may be a stand-alone device or internal blocks constituting a single device.

Also, the program may be provided by transmission through a transmission medium or by being recorded in a recording medium.

According to an embodiment of the present invention, it is possible to obtain the state transition prediction model having the first observation model where each sample value of the first time series data is observed and the second observation model where each sample value of the second time series data is observed. In addition, by using the state transition prediction model, for example, it is possible for an agent to efficiently imitate an action done by another person.

DESCRIPTION OF THE PREFERRED EMBODIMENTS

An agent according to an embodiment of the present invention

Figure 1:
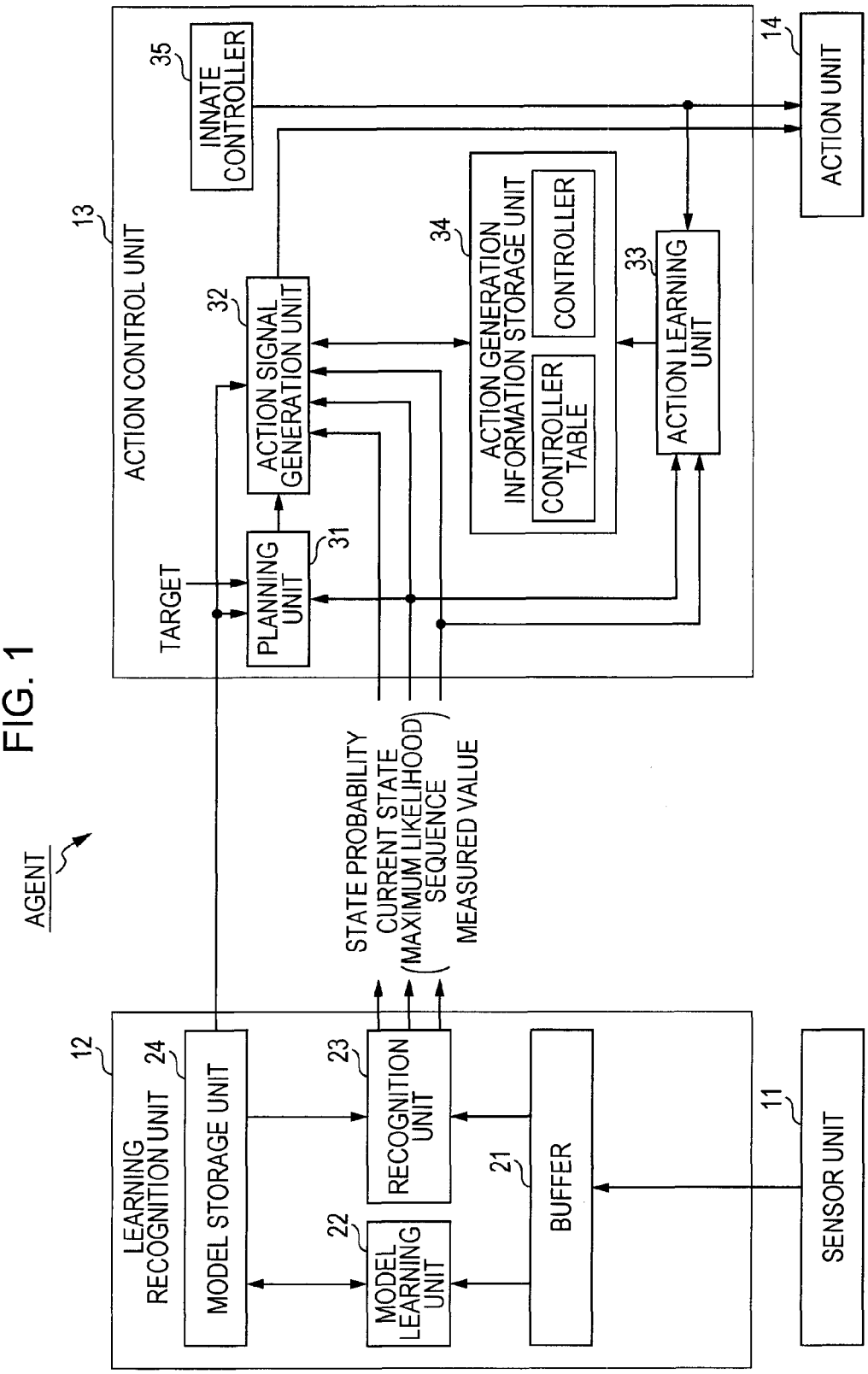
FIG. 1 is a block diagram illustrating a configuration example according to an embodiment of an agent to which the present invention is applied.

FIG. 1 is a block diagram illustrating a configuration example of an agent to which an information processing device of the present invention is applied.

In FIG. 1, the agent has a sensor unit 11, a learning recognition unit 12, an action control unit 13, and an action unit 14, and autonomously does an action. In addition, the agent imitates the other agent which is a different agent.

The sensor unit 11 is constituted by, for example, a sensor, which senses physical quantities, such as a camera capturing a subject and outputting images containing the subject, or a detector detecting angles of rotating movable parts (not shown) of the action unit 14.

The sensor unit 11 outputs the image containing the subject or the angles of the movable parts of the action unit 14, which are obtained as a result of the sensing, in a time series as observed values which can be observed.

The observed values output from the sensor unit 11 are supplied to the learning recognition unit 12.

The learning recognition unit 12 includes a buffer 21, a model learning unit 22, a recognition unit 23, and a model storage unit 24. The learning recognition unit 12 learns a multi-observation prediction model by using time series data which is a time series of the observed values from the sensor unit 11, and recognizes the time series data by using the multi-observation prediction model after the learning.

In other words, the buffer 21 is supplied with the observed values from the sensor unit 11.

The buffer 21 sequentially stores the observed values from the sensor unit 11.

The model learning unit 22 reads a time series of the observed values stored in the buffer 21 as model learning data used for learning of the multi-observation prediction model stored in the model storage unit 24, and learns the multi-observation prediction model stored in the model storage unit 24 by using the model learning data.

The recognition unit 23 reads the time series of the observed values stored in the buffer 21 as recognition target data to be recognized using the multi-observation prediction model stored in the model storage unit 24, and recognizes the recognition target data by using the multi-observation prediction model stored in the model storage unit 24.

The model storage unit 24 stores the multi-observation prediction model.

The multi-observation prediction model stored in the model storage unit 24 is a learning model which has internal states, and has a transition model of the internal states and an observation model where observed values are generated from the internal states. The multi-observation prediction model employs a state transition prediction model which is a learning model enabling an observed value in a following time period to be predicted.

In other words, the multi-observation prediction model may employ the state transition prediction model using, for example, the HMM (hidden Markov model) which has, for example, a transition probability (transition model) of a state transition between the internal states where observed values are observed and an observation likelihood (observation model) where the observed values are observed from the internal states.

Here, the model learning unit 22 carries out learning for self-organization of the multi-observation prediction model stored in the model storage unit 24 (learning where model parameters of the multi-observation prediction model are determined using only the model learning data and thus the model parameters are not forced to be controlled externally) by using later-described first time series data of the time series of the observed values stored in the buffer 21 as the model learning data.

In addition, the model learning unit 22 learns the multi-observation prediction model after the learning using the first time series data, by fixing a transition probability and by using later-described second time series data different from the first times series data of the time series of the observed values stored in the buffer 21.

Therefore, the model learning unit 22 obtains the multi-observation prediction model which is the state transition prediction model having first observation likelihood where each sample value of the first time series data is observed and second observation likelihood where each sample value of the second time series data is observed.

Thereby, the first and second time series data, that is, a plurality of time series data is observed in the multi-observation prediction model.

When recognizing recognition target data, the recognition unit 23, by using the multi-observation prediction model stored in the model storage unit 24, as described later, obtains a state probability of each state (internal state) of the multi-observation prediction model, and, in the multi-observation prediction model, obtains the maximum likelihood sequence (maximum state sequence) as a sequence of the states (internal states) generating a state transition such that a likelihood where the recognition target data is observed is maximized.

The recognition unit 23 supplies the state probability obtained during the recognition of the recognition target data, an observed value (latest observed value) which is the last sample value in the maximum likelihood sequence and the recognition target data, and a current state (the last state in the maximum likelihood sequence) which is a state where the latest observed value of sample values of the recognition target data is observed in the maximum likelihood sequence where the recognition target data is observed to the action control unit 13.

The action control unit 13 controls actions of the agent by using the multi-observation prediction model stored in the model storage unit 24, or the state probability supplied from the recognition unit 23, the maximum likelihood sequence (including the current state), the latest observed value, and the like.

In other words, the action control unit 13 includes a planning unit 31, an action signal generation unit 32, an action learning unit 33, an action generation information storage unit 34, and an innate controller 35.

The planning unit 31 is supplied with the current state (the last state in the maximum likelihood sequence) from the recognition unit 23, and supplied with target information indicating a target state of the states in the multi-observation prediction model from the outside or the inside of the agent.

Now, a state sequence (a sequence of states in the multi-observation prediction model) of reaching another state $S_e$ from one state $S_s$ in the multi-observation prediction model is referred to as a plan, an initial state (the state $S_s$) in the plan is referred to as a start state, and a last state (the state $S_e$) in the plan is referred to as a target state.

The planning unit 31 refers to the multi-observation prediction model stored in the model storage unit 24 and performs the planning such that, for example, when the current state from the recognition unit 23 is assumed as the start state and a state indicated by the target information is assumed as the target state, a state sequence where likelihood of a state transition from the start state to the target state is maximized is obtained as the plan. The planning unit 31 supplies the plan obtained by the planning to the action signal generation unit 32.

The action signal generation unit 32 is not only supplied with the plan from the planning unit 31 but also the observed value, the state probability, and the current state from the recognition unit 23.

The action signal generation unit 32 obtains (generates) action signals by which the agent does a predetermined action such as an action according to the plan from the planning unit 31, based on the multi-observation prediction model stored in the model storage unit 24, the action generation information stored in the action generation information storage unit 34, and the observed values, the state probability, and the current state from the recognition unit 23, and supplies the action signals to the action unit 14.

The action learning unit 33 is supplied with the current state and the latest observed value from the recognition unit 23. In addition, the action learning unit 33 is supplied with the action signals generated by the innate controller 35.

The action learning unit 33, by using the current state and the latest observed value from the recognition unit 23, and the action signals from the innate controller 35, carries out an action learning such that the action learning unit 33 learns the relationship between the action signal for making the agent do a predetermined action and a state transition in the multi-observation prediction model caused by an action responding to the action signal.

In addition, the action learning unit 33 obtains action generation information also used to generate action signals causing a predetermined state transition in the multi-observation prediction model, by the action learning, and supplies the action generation information to the action generation information storage unit 34.

The action generation information storage unit 34 stores the action generation information which is supplied from the action learning unit 33 and obtained as a result of the action learning.

Here, in FIG. 1, the action generation information is constituted by a controller table and a controller.

If a state transition from a certain state $S_i$ to another state $S_j$ in the multi-observation prediction model is denoted by $A_{ij}$, the controller is a function $F_{ij}(o)$ outputting an action signal, for example, having an observed value o as an input, and exists for each state transition $A_{ij}$.

The function $F_{ij}(o)$ as the controller can be correlated with a controller ID (identification) unique to the controller, and thus, in the controller table, the state transition $A_{ij}$ can be correlated with the controller ID of the controller (function $F_{ij}(o)$) which is to be used to generate action signals for doing actions causing the state transition $A_{ij}$.

Therefore, when generating an action signal for doing an action causing a certain state transition $A_{ij}$, the action signal generation unit 32 first refers to the controller table and recognizes the controller ID correlated with the state transition $A_{ij}$. The action signal generation unit 32 generates the action signal by using the controller (function $F_{ij}(o)$) correlated with the controller ID recognized from the controller table.

The innate controller 35 randomly generates action signals for making the agent do various kinds of actions. The innate controller 35 generates a signal where a proper perturbation is added to a signal with a pattern determined by a designer of the agent or the like in advance, as an action signal for making the agent do an innate action.

The action signal generated by the innate controller 35 is supplied to the action unit 14 and the action learning unit 33.

The action unit 14 has movable parts (not shown) such as arms or feet of a body of the agent, and an actuator or the like for driving the movable parts.

In the action unit 14, the actuator drives the movable parts in response to the action signals from the action signal generation unit 32 or the innate controller 35, and thereby the agent does a predetermined action.

The Multi-Observation Prediction Model

The multi-observation prediction model stored in the model storage unit 24 in FIG. 1 may employ, for example, as described above, the state transition prediction model using the HMM.

Here, the HMM will be described before the state transition prediction model as the multi-observation prediction model stored in the model storage unit 24 is described.

Figure 2:
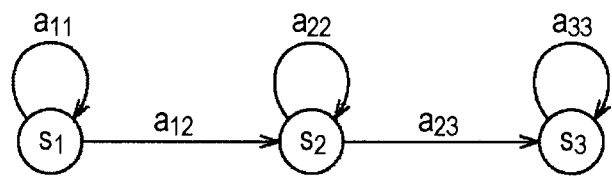
FIG. 2 is a diagram illustrating an example of a left-to-right type HMM.

FIG. 2 is a diagram illustrating an example of a left-to-right type HMM.

The left-to-right type HMM is an HMM where states are arranged in a straight line from left to right, and can perform a self transition (a state transition from a certain state to the state) and a state transition from a certain state to a state positioned at the further right than the certain state. The left-to-right type HMM may be used for, for example, speech recognition or the like.

The HMM in FIG. 2 is constituted by three states $S_1$, $S_2$ and $S_3$, and is just allowed, as the state transition, for the self transition and the transition from a certain state to a state adjacent thereto on the right.

In addition, the HMM is defined by an initial probability $\pi_i$ of a state $S_i$, a state transition $a_{ij}$, and an observation likelihood (output probability distribution) $b_i(o)$ where a predetermined observed value o is observed from the state $S_i$.

Here, the initial probability $\pi_i$ is a probability that the state $S_i$ is in an initial state (first state). In the left-to-right type HMM, the initial probability $\pi_1$ of a leftmost state $S_1$ is assumed as 1.0, and the initial probability $\pi_i$ of another state $S_i$ is assumed as 0.0.

The transition probability $a_{ij}$ is a probability that the state $S_i$ is transited to a state $S_j$.

The observation likelihood (output probability distribution) $b_i(o)$ is a probability (probability distribution) that the observed value o is observed from the state $S_i$ during the state transition to the state $S_j$. The observation likelihood $b_i(o)$ may employ a value which becomes a probability in the case where the observed value o is a discrete value, and may employ a probability distribution function in the case where the observed value o is a continuous value. The probability distribution function may employ, for example, a gauss distribution (normal distribution) defined by a mean value (mean vector) and a variance (covariance matrix).

Figure 3:
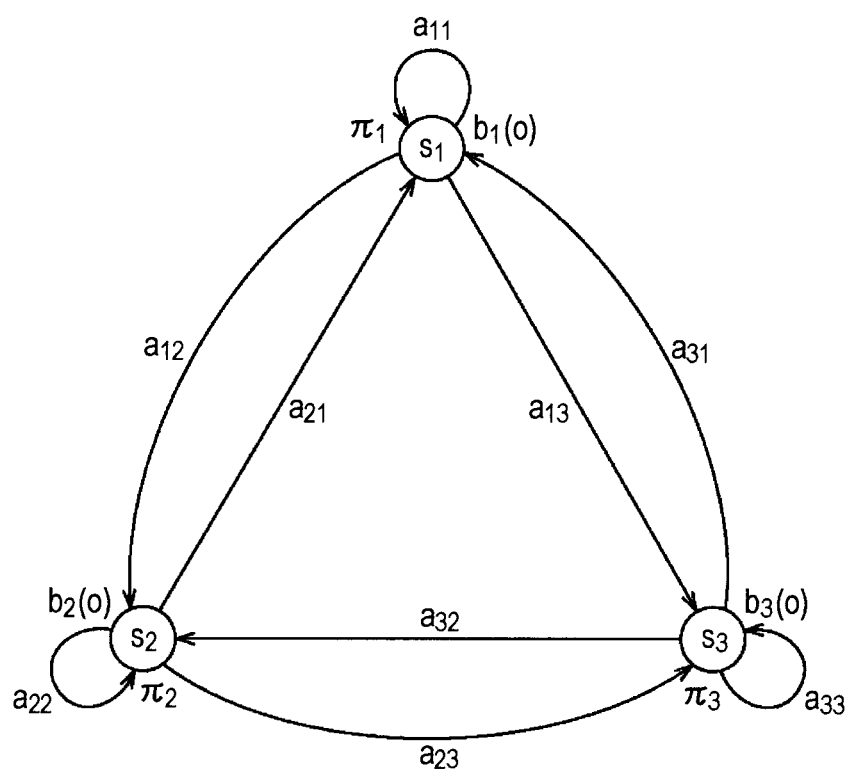
FIG. 3 is a diagram illustrating an example of an ergodic type HMM.

FIG. 3 is a diagram illustrating an example of an ergodic type HMM.

The ergodic type HMM is an HMM which has no limitation in a state transition, that is, enables a state transition from an arbitrary state $S_i$ to an arbitrary state $S_j$.

The HMM in FIG. 3 is constituted by three states $S_1$, $S_2$ and $S_3$, and is allowed for an arbitrary state transition.

The ergodic type HMM is an HMM with the highest degree of freedom of a state transition, but if the number of states is increased, there is a case where there is convergence to a local minimum depending on initial values of the model parameters (the initial probability $\pi_i$, the transition probability $a_{ij}$, and the observation likelihood $b_i(o)$) of the HMM, and thus appropriate model parameters may not be obtained.

Therefore, a hypothesis that "most of phenomena in the natural world can be represented by a sparse coupling such as a small world network" is employed, and the multi-observation prediction model is assumed to employ a state transition prediction model using an HMM where a state transition is limited to a sparse structure.

Here, the sparse structure is a structure where there is much limitation in states which can be transited from a certain state, not a compact state transition as in the ergodic type HMM where a certain state can be transited to an arbitrary state.

In addition, here, even in the sparse structure, it is assumed that at least one state transition to another state exists, and a self transition exists.

Figure 4A:
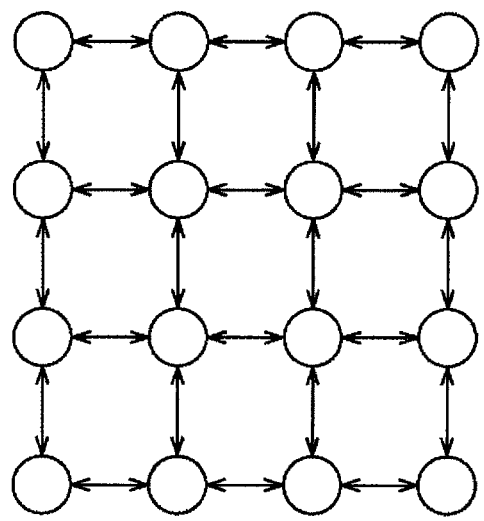
FIGS. 4A and 4B are diagrams illustrating a two-dimensional vicinity constrained HMM.
Figure 4B:
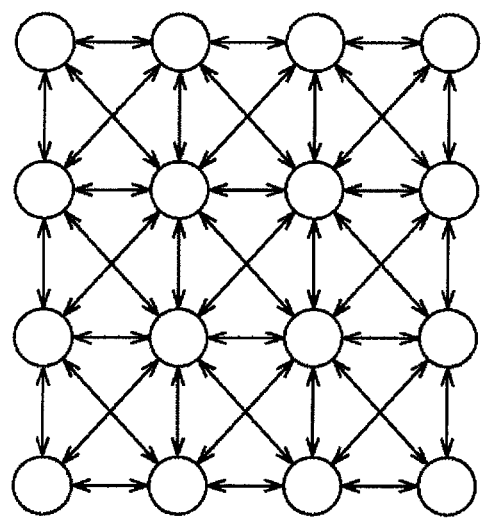

FIGS. 4A and 4B are diagrams illustrating examples of a two-dimensional vicinity constrained HMM which is an HMM with the sparse structure.

On the HMM in FIGS. 4A and 4B, in addition to the sparse structure, a limitation that states constituting the HMM are disposed in the lattice shape on a two-dimensional plane is imposed.

Here, in the HMM in FIG. 4A, a state transition to another state is limited to states adjacent in the transverse direction and states adjacent in the longitudinal direction. In the HMM in FIG. 4B, a state transition to another state is limited to states adjacent in the transverse direction, states adjacent in the longitudinal direction, and states adjacent in the diagonal direction.

Figure 5A:
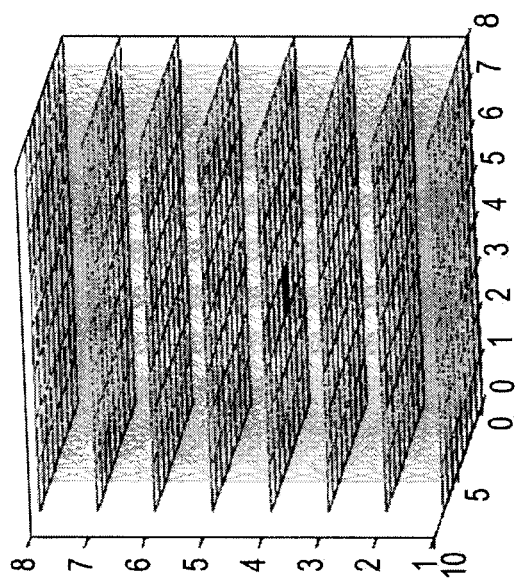
FIGS. 5A to 5C are diagrams illustrating examples other than the two-dimensional vicinity constrained HMM, as HMMs with a sparse structure.
Figure 5B:
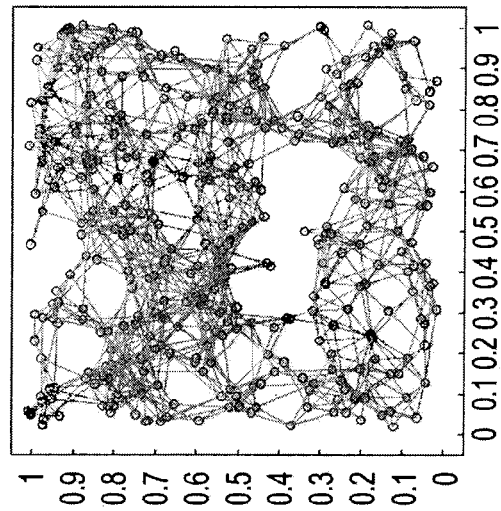
Figure 5C:
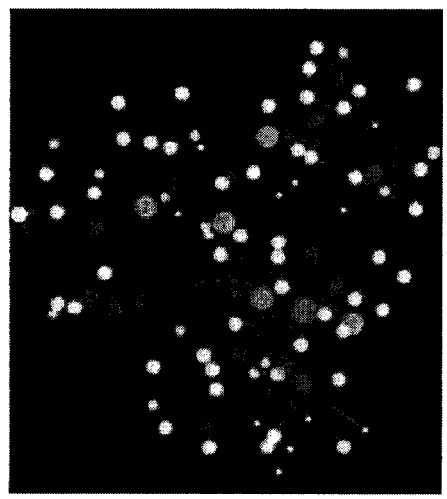

FIGS. 5A to 5C are diagrams illustrating examples other than the two-dimensional vicinity constrained HMM as HMMs with a sparse structure.

In other words, FIG. 5A shows an example of an HMM having a three-dimensional grid limitation. FIG. 5B shows an example of an HMM having a two-dimensional random disposition limitation. FIG. 5C shows an example of an HMM by a small world network.

Figure 6:
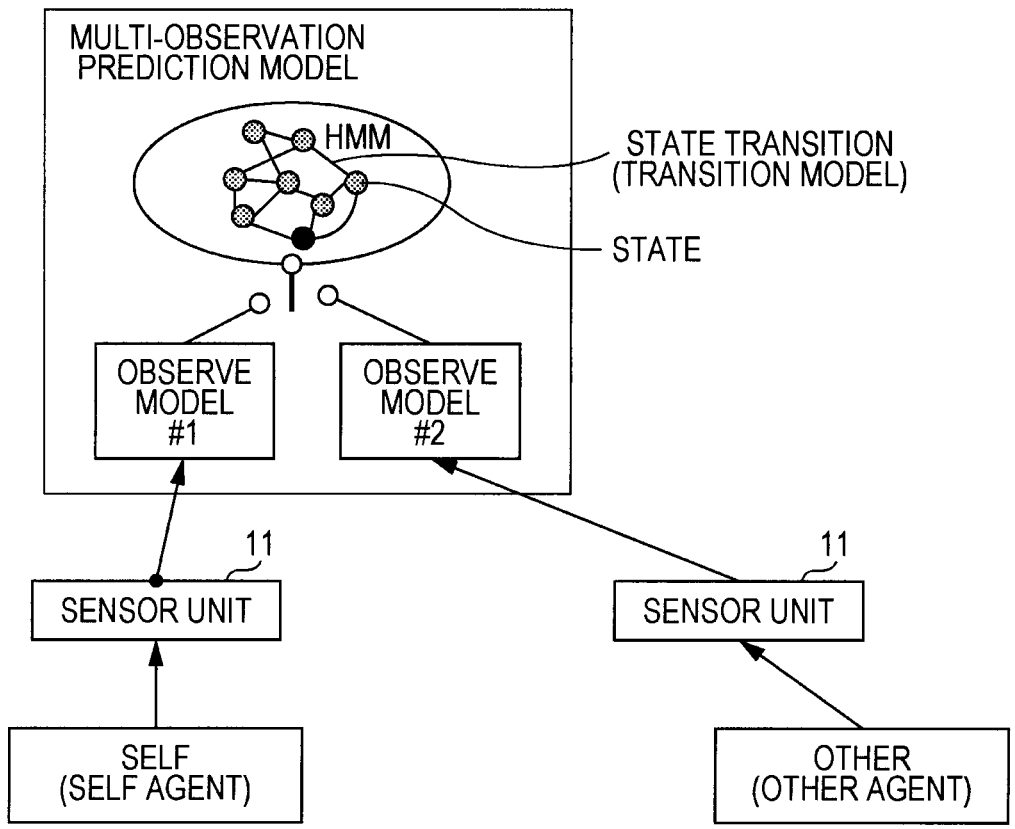
FIG. 6 is a schematic diagram illustrating a state transition prediction model as a multi-observation prediction model.

FIG. 6 is a schematic diagram illustrating the multi-observation prediction model stored in the model storage unit 24 in FIG. 1.

As described with reference to FIG. 1, the multi-observation prediction model is a state transition prediction model having a transition probability of a state transition between the internal states where observed values are observed and an observation likelihood (observation model) where the observed values are observed from the internal states, and may employ the state transition prediction model using, for example, the HMM.

As the multi-observation prediction model, the state transition prediction model using the HMM is the same as the HMM in that the model has a plurality of states (states in the HMM) (hidden nodes) as the internal states, and each state is defined by an initial state probability in an initial state, a transition probability (transition model) that a state transition between states is generated, and an observation likelihood (observation model) where an observed value is observed from each state.

However, the state transition prediction model using the HMM as the multi-observation prediction model is different from the HMM in that the model has, as an observation likelihood, a plurality of observation likelihoods (output probability distribution of an observed value of each of two (or more) pieces of time series data) of a first observation likelihood (observation model #1) where a first observed value is observed from each state and a second observation likelihood (observation model #2) where a second observed value different from the first observed value is observed from each state.

Here, the agent in FIG. 1, as a self agent, imitates the other agent which is another person, and does the same action as the other agent.

In order for the self agent to imitate the other agent and do the same action as the other agent, first, it is necessary for the self agent itself to autonomously do an action (learn (obtain) a body model of the self agent itself).

Also, in order for the self agent to imitate the other agent and do the same action as the other agent, it is necessary for the self agent to recognize an observed value observed from the other agent (recognize of an action of the other agent).

Further, in order for the self agent to imitate the other agent and do the same action as the other agent, first, it is necessary for the self agent to do an action such that an observed value the same as an observed value (an action of the other agent) observed from the other agent when the self agent is observed from another person is observed.

Therefore, in order for the self agent in FIG. 1 to autonomously do an action first of all, the self agent designates an observed value which is observed when the self agent itself does an action and is data indicating a state of the agent itself, as a first observed value, and uses first time series data which is a time series of the first observed value as model learning data, thereby learning time series patterns of the first observed values observed regarding various kinds of actions done by the self agent itself.

In other words, the self agent designates, for example, angles of the movable parts of the action unit 14 obtained by the sensor unit 11 sensing the self agent itself (the action unit 14 thereof) as the first observed values, and, uses the first time series data which is a time series of the first observed values, thereby learning the multi-observation prediction model.

In addition, in order for the self agent to recognize an observed value observed from the other agent, the self agent designates an observed value which is data observed from the other agent and indicating a state of another person as the second observed value, and uses the second time series data which is a time series of the second observed values as model learning data, thereby learning time series patterns of the second observed values observed regarding various kinds of actions done by the other agent.

In other words, the self agent designates, for example, an image of the other agent obtained by the sensor unit 11 sensing the other agent as the second observed value, and uses the second time series data which is a time series of the second observed values, thereby learning the multi-observation prediction model.

In addition, in order for the self agent to do an action such that an observed value the same as an observed value (an action of the other agent) observed from the other agent when the self agent is observed from another person is observed, the self agent learns a correlation of a state of another person (the other agent) with a state of the imitator (the self agent) himself/herself, that is, a relationship (correspondence relationship between the first observed value and the second observed value) between the second observed value observed when the other agent does a certain action and the first observed value observed when the self agent does the same action as the other agent.

However, the self agent learns the correlation of a state of the imitator (the self agent) himself/herself with a state of another person (the other agent) when learning the multi-observation prediction model for recognizing the second time series data observed from the other agent, that is, the learning is carried out at the same time.

In other words, the learning of the multi-observation prediction model for the recognition of the second time series data by using the second time series data in the self agent is carried out by using the multi-observation prediction model after the learning using the first time series data and by fixing an initial state probability and a transition probability (transition model) of the multi-observation prediction model.

Accordingly, in the self agent, during the learning of the multi-observation prediction model using the first time series data, the initial state probability and the transition probability of the multi-observation prediction model, and the first observation likelihood (observation model #1) which is an observation likelihood of the first observed value, are obtained by using the first time series data.

In addition, during the learning of the multi-observation prediction model using the second time series data, the second observation likelihood (observation model #2) which is an observation likelihood of the second observed value is obtained by using the second time series data and fixing the initial state probability and the transition probability of the multi-observation prediction model after the learning employing the first time series data.

As a result, in the multi-observation prediction model, it is possible to allocate the second observed value (observation likelihood thereof) to each state in the multi-observation prediction model which can obtain a state sequence with a high likelihood where the first time series data is observed, such that a likelihood where the second time series data is observed is heightened.

In the multi-observation prediction model, if the learning of the correlation of a state of the imitator (the self agent) himself/herself with another person (the other agent) has been carried out accurately, that is, if the second observed value which is observed when the other agent does a certain action and the first observed value when the self agent does the same action as the other agent are allocated to a state in the multi-observation prediction model, the self agent, in the multi-observation prediction model, does an action so as to observe the time series of the first observed value (the first time series data) which causes a state transition of a state sequence with a high likelihood where the time series of the second observed value (the second time series data) observed from the other agent is observed, and thereby the self agent does an action the same as an action of the other agent where the time series of the second observed value is observed.

Figure 7:
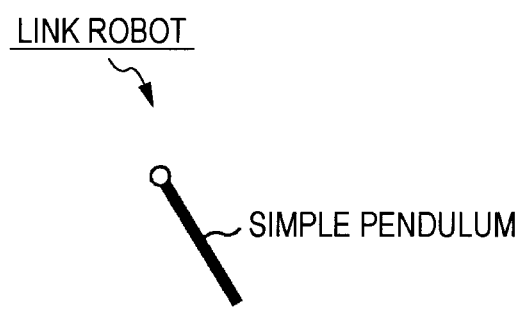
FIG. 7 is a diagram illustrating a configuration example of an appearance of a self agent.

Examples of an appearance of the agent and the observed value observed from the agent FIG. 7 is a diagram illustrating a configuration example of an appearance of the agent in FIG. 1 as the self agent.

In FIG. 7, the self agent is a rotatable simple pendulum which is a robot (a one-link robot) with one link (a linked portion is one), which can do an action where a movable part having a rod shape, as a simple pendulum, rotates (within the plane) with respect to its one end.

Figure 8:
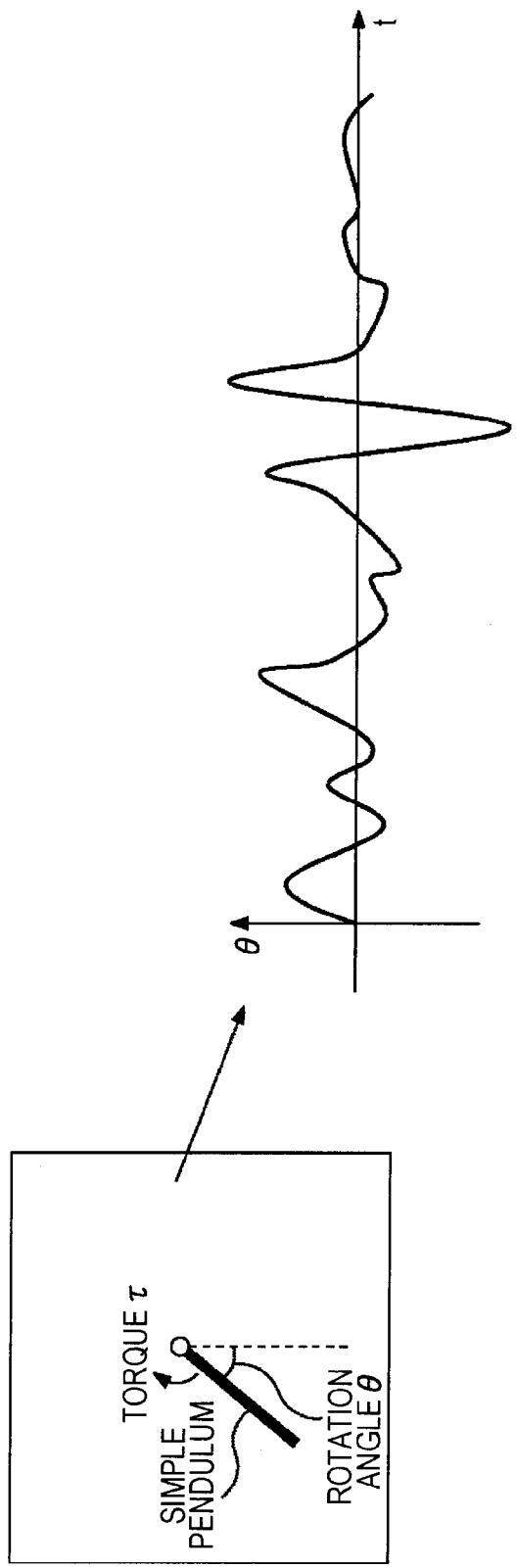
FIG. 8 is a diagram illustrating an example of a first observed value observed from the self agent.

FIG. 8 is a diagram illustrating an example of the first observed value observed from the simple pendulum as the self agent.

The simple pendulum as the self agent rotates by being applied with torque $\tau$, and the sensor unit 11 senses the rotation angle $\theta$ of the simple pendulum and outputs the rotation angle $\theta$ as the first observed value. In this case, the first time series data becomes the time series of the rotation angle $\theta$ which is the first observed value as shown in FIG. 8.

In addition, the torque $\tau$ is applied to the simple pendulum in response to an action signal.

Therefore, the self agent can control the rotation angle $\theta$ as the first observed value by using the torque $\tau$ applied in response to the action signal.

Here, in an enhanced learning for controlling the rotation angle $\theta$ of the simple pendulum by using the torque $\tau$, under the assumption that a physical parameter such as mass or friction coefficient of the simple pendulum is unknown, two variables, that is, the rotation angle $\theta$ and the angular velocity of the simple pendulum can be used as observed values which can be observed so as to represent a state of the simple pendulum to be unique.

In addition, in the enhanced learning, a task which becomes an objective and an objective function for achieving the objective are designed (set).

Here, in the enhanced learning, the task which becomes the objective is, for example, that the simple pendulum swings upwards, i.e., that the rotation angle $\theta$ becomes 180 degrees, and in this case, the objective function for achieving the objective is a function dependent on the task, such as giving rewards for the rotation angle $\theta$ of 180 degrees or giving higher rewards as the rotation angle $\theta$ becomes closer to 180 degrees.

Meanwhile, since the self agent has an objective of imitating the other agent (an action thereof), a task which becomes the objective varies depending on actions of the other agent to be tried to be imitated, and an objective function dependent on the task is not necessary.

In addition, in this embodiment, observed values observed from the self agent are forced to employ only the rotation angle $\theta$ of the simple pendulum and a rotation angle $\theta$ which is one of the angular velocities.

Figure 9:
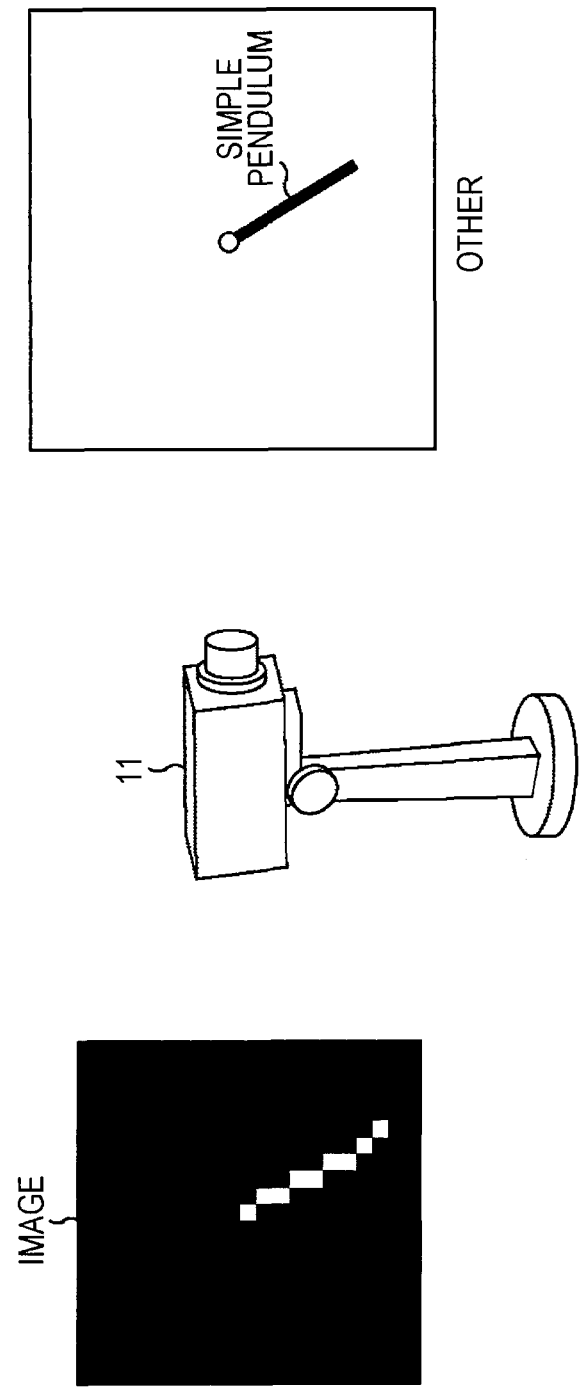
FIG. 9 is a diagram illustrating a configuration example of an appearance of the other agent and an example of a second observed value observed from the other agent.

FIG. 9 is a diagram illustrating a configuration example of an appearance of the other agent and an example of the second observed value observed from the other agent.

In FIG. 9, a simple pendulum which can do the same action as the self agent is employed as the other agent.

Also, in FIG. 9, image data obtained by photographing the other agent is employed as the second observed value.

In other words, the sensor unit 11 senses a subject which is a target other than the self agent and photographs the subject, thereby outputting image data obtained as a result thereof as the second observed value.

Therefore, the first observed value and the second observed value are different in kind (modal).

Figure 10:
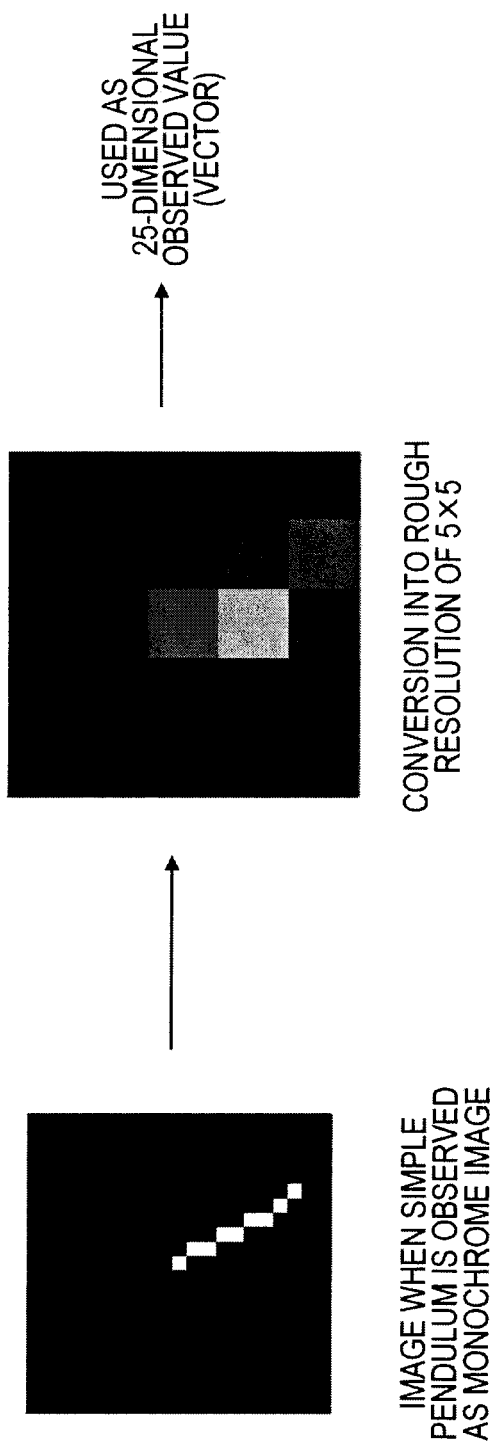
FIG. 10 is a diagram illustrating a detailed example of the second observed value.

FIG. 10 is a diagram illustrating a detailed example of the second observed value.

In FIG. 10, a monochrome image obtained by photographing the other agent from the front side (the direction perpendicular to the plane where the simple pendulum as the other agent rotates) is converted into an image with a rough resolution of, for example, 5×5 pixels in width and height by the bi-linear interpolation or the like, and a 25-dimensional vector having twenty five pixel values corresponding to pixel values of the 5×5 pixels as components is employed as the second observed value.

Learning of the Multi-Observation Prediction Model

Figure 11:
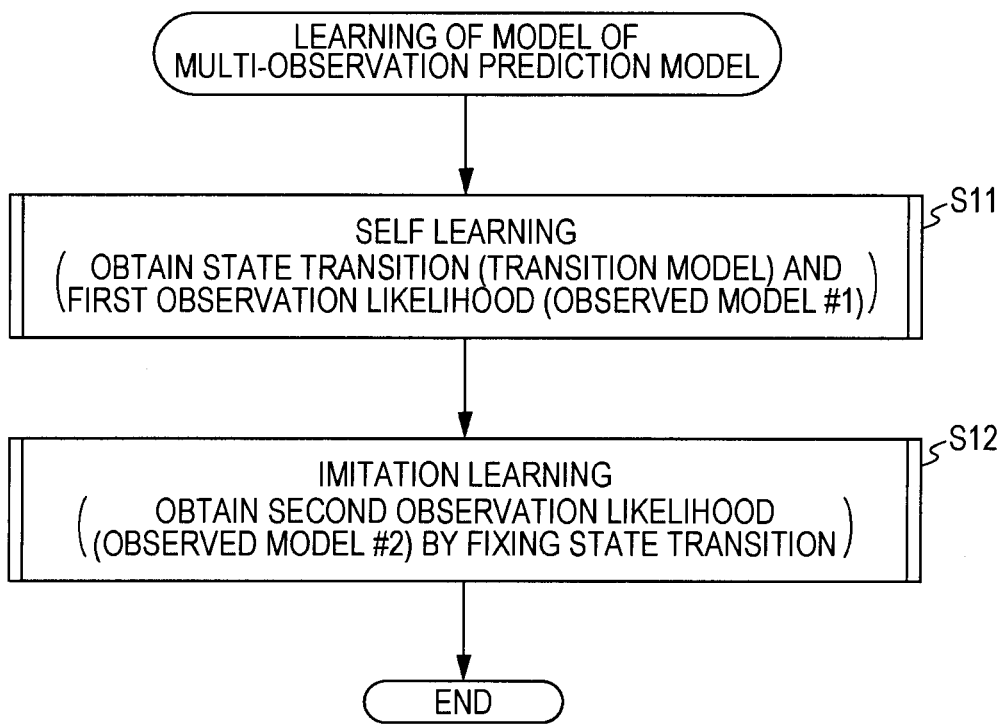
FIG. 11 is a flowchart illustrating a model learning process.

FIG. 11 is a flowchart illustrating a process (model learning process) of learning of the multi-observation prediction model carried out by the model learning unit 22 in FIG. 1.

In the agent in FIG. 1 as the self agent, the innate controller 35 generates an action signal for making the self agent do an innate action which is supplied to the action unit 14 and the action learning unit 33.

The action unit 14 drives the movable part in response to the action signal from the innate controller 35, and thereby the simple pendulum as the self agent does an action of rotation due to a torque $\tau$ responding to the action signal.

The sensor unit 11 senses the rotation angle $\theta$ of the simple pendulum as the self agent which rotates in response to the action signal from the innate controller 35, and supplies the rotation angle $\theta$ to the buffer 21 in a time series as the first observed value.

The buffer 21 stores the time series of the first observed value from the sensor unit 11. If the time series of the first observed value with a certain number of samples, that is, if the first time series data with a certain length of time series is stored in the buffer 21, the model learning unit 22, at step S11, employs the first time series data stored in the buffer 21 as model learning data, and learns the multi-observation prediction model stored in the model storage unit 24 according to the Baum-Welch algorithm, thereby obtaining the initial state probability, the transition probability, and the first observation likelihood.

Here, the learning of the multi-observation prediction model using the first time series data is hereinafter also referred to as a self learning.

In the self learning, the self agent does an action such that the self agent itself confirms by trial and error what action is being done in response to the action signal, and learns the multi-observation prediction model by using the time series of the first observed value observed when the action has been done in response to the action signal.

In addition, the first observed value is an observed value observed from the self agent itself (the body thereof), and the learning of the multi-observation prediction model using the time series of the first observed value can be referred to as a learning of a body model of modeling the body (function) of the self agent.

After the self learning at step S11, for example, the other agent is placed in front of the self agent, and the simple pendulum as the other agent does an action (rotation) while randomly changing, for example, torques. The second observed value which is image data obtained by the sensor unit 11 sensing and photographing the other agent doing the action is supplied to the buffer 21 in a time series.

The buffer 21 stores the time series of the second observed value supplied from the sensor unit 11. If the time series of the second observed value with a certain number of samples, that is, the second time series data with a certain length of time series is stored in the buffer 21, the model learning unit 22, at step S12, employs the second time series data stored in the buffer 21 as model learning data, and learns the multi-observation prediction model stored in the model storage unit 24 according to the Baum-Welch algorithm by fixing the initial state probability and the transition probability obtained using the first time series data, thereby obtaining the second observation likelihood, and the model learning process ends.

The learning of the multi-observation prediction model using the second time series data (learning of the multi-observation prediction model after the self learning) is hereinafter also referred to as an imitation learning.

The Self Learning

Figure 12:
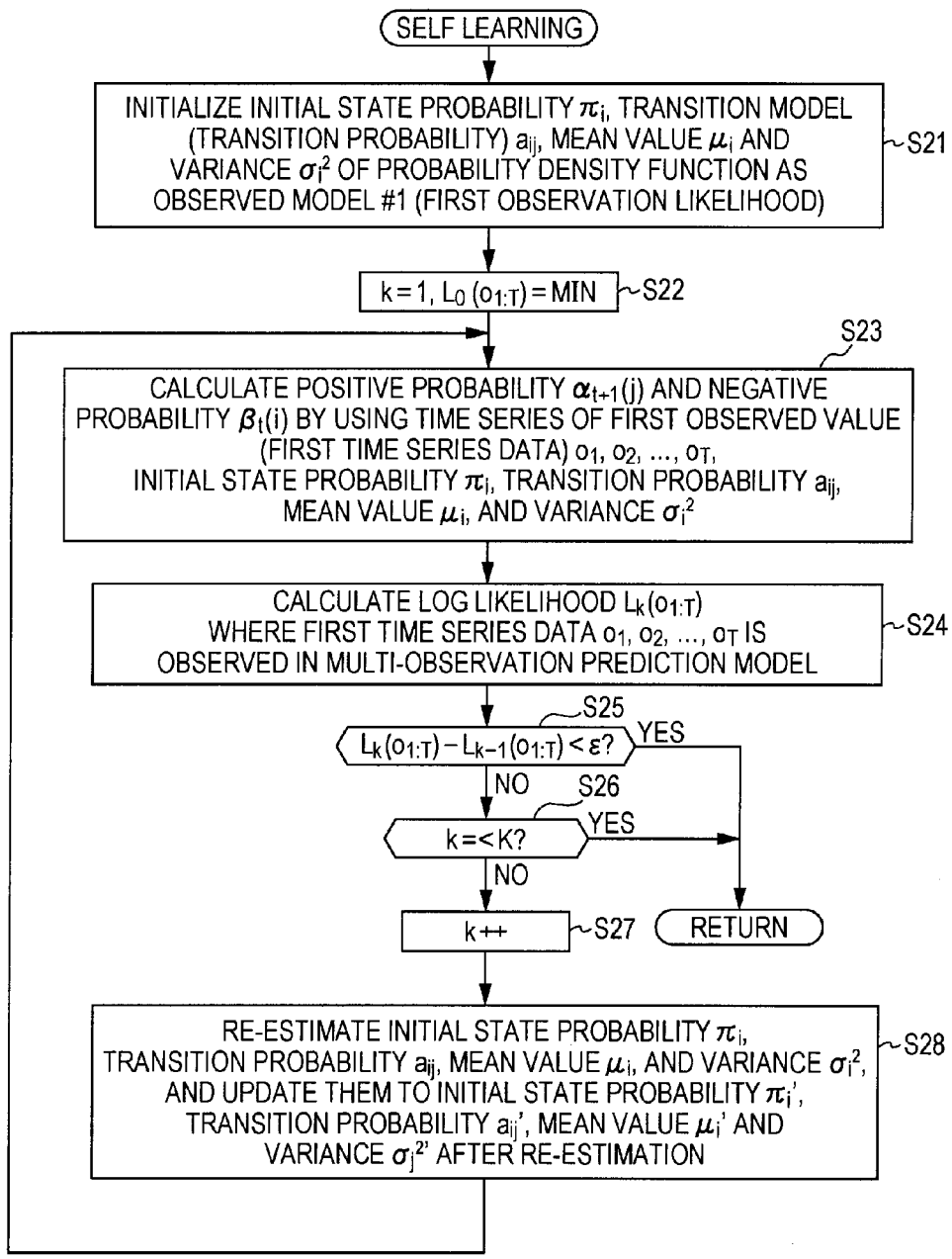
FIG. 12 is a flowchart illustrating a self learning process.

FIG. 12 is a detailed flowchart illustrating the self learning according to the Baum-Welch algorithm performed at step S11 in FIG. 11.

During the self learning, at step S21, the model learning unit 22 initializes the initial state probability $\pi_i$, the transition probability $a_{ij}$, and the first observation likelihood $b_j(o)$ of the multi-observation prediction model.

Here, the initial state probability $\pi_i$ indicates an initial probability of the i-th state $S_i$ in the multi-observation prediction model. If the total number of states in the multi-observation prediction model is assumed as N, the initial state probability $\pi_i$ is initialized to, for example, 1/N.

The transition probability $a_{ij}$ indicates a probability that a state $S_i$ is transited to a state $S_j$. The transition probability $a_{ij}$ is initialized to, for example, an arbitrary value such that summation of the transition probability that the state $S_i$ is transited to each of $S_1$ to $S_N$ becomes 1.0.

The first observation likelihood $b_j(o)$ means a likelihood where the first observed value o is observed from a state $S_j$.

If the first observed value o is a discrete value, the first observation likelihood $b_j(o)$ means a probability that the first observed value o is observed, and if the total number of kinds of discrete values which are the first observed values are assumed as N', the first observation likelihood $b_j(o)$ is initialized to, for example, 1/N'.

In addition, if the first observed value o is a continuous value, the first observation likelihood $b_j(o)$ is expressed by, for example, the probability density function.

In the state $S_j$, the probability density function expressing the first observation likelihood $b_j(o)$ where the first observed value o is observed employs, for example, the normal distribution $N(x, \mu_j, \sigma_j^2)$ where a mean value (mean vector) of a variable x is denoted by $\mu_j$, and a variance (variance covariance matrix) is denoted by $\sigma_j^2$, and, in this case, in the initialization of the first observation likelihood $b_j(o)$, the mean value $\mu_j$ and the variance $\sigma_j^2$ are initialized.

If the first observed value o is normalized so as to have values ranging from 0.0 to 1.0, the mean value is initialized to, for example, 0.5 or the like which is the middle value in the range of 0.0 to 1.0. In addition, the variance $\sigma_j^2$ is initialized to, for example, 0.5 or the like which is great in the variance in the range of 0.0 to 1.0.

Here, since the initial state probability $\pi_i$, the transition probability $a_{ij}$, and the first observation likelihood $b_j(o)$ of the multi-observation prediction model are respectively equivalent to the initial state probability, the transition probability, and the observation likelihood (output probability distribution) of the HMM, they are also collectively referred to as HMM parameters.

At step S21, the HMM parameters (the initial state probability $\pi_i$, the transition probability $a_{ij}$, and the first observation likelihood $b_j(o)$) of the model parameters in the multi-observation prediction model are initialized, and the process goes to step S22, where the model learning unit 22 initializes a variable k for counting the number of the re-estimation of the HMM parameters, to 1.

In addition, the model learning unit 22 initializes a log likelihood $L_0(o_{1:T})$ where the first time series data $o_{1:T}$ which is a time series of the first observed value o as the model learning data stored in the buffer 21 is observed, to a small value MIN corresponding to an extent that is not regarded as the first time series data $o_{1:T}$ being observed, in a multi-observation prediction model defined by HMM parameters after re-estimation of 0 time (HMM parameters which is not re-estimated yet), and the process goes to step S23 from step S22.

Here, the first time series data $o_{1:T}$ is a time series $o_1, o_2, \ldots, o_T$ of the first observed values o of T.

At step S23, the model learning unit 22 calculates a positive probability $\alpha_{t+1}(j)$ and a negative probability $\beta_t(i)$ by using the first time series data $o_{1:T}$ and the HMM parameters (the initial state probability $\pi_i$, the transition probability $a_{ij}$, and the first observation likelihood $b_j(o)$), and the process goes to step S24.

Here, the positive probability $\alpha_{t+1}(j)$ indicates a probability that the time series $o_1, o_2, \ldots, o_T$ of the first observed values is observed, a certain state is in a state $S_i$ at the time t, thereafter a state transition to a state $S_j$ occurs, and a first observed value $o_{t+1}$ is observed from the state $S_j$.

In addition, the negative probability $\beta_t(i)$ indicates a probability that a certain state is in a state $S_i$ at the time t, a state transition to a state $S_j$ occurs, and thereafter a time series $o_{t+1}, o_{t+2}, \ldots, o_T$ of the first observed values are observed.

The positive probability $\alpha_{t+1}(i)$ is calculated based on equations (1) and (2).

$$\alpha_1(i) = \pi_i \tag{1}$$

$$\alpha_{t+1}(j) = \left[\sum_{i=1}^{N} \alpha_t(i) a_{ij}\right] b_j(o_{t+1}) \tag{2}$$

In addition, the negative probability $\beta_t(i)$ is calculated based on equations (3) and (4).

$$\beta_T(j) = 1 \tag{3}$$

$$\beta_t(i) = \sum_{j=1}^{N} a_{ij} b_j(o_{t+1}) \beta_{t+1}(j) \tag{4}$$

The first observation likelihood $b_j(o_t)$ in equations (2) and (4) is expressed by equation (5) by using the normal distribution $N(x, \mu_j, \sigma_j^2)$ where a mean value of the variable x is denoted by $\mu_j$ and the variance is denoted by $\sigma_j^2$.

$$b_j(o_t) = N(x, \mu_j, \sigma_j^2) \tag{5}$$

At step S24, the model learning unit 22 calculates a log likelihood $L_k(o_{1:T})$ where the first time series data $o_{1:T}$ as the model learning data stored in the buffer 21 is observed, based on equation (6) by using the positive probability $\alpha_T(i)$ obtained at previous step S23, in a multi-observation prediction model defined by the HMM parameters after k re-estimations, and the process goes to step S25.

$$L_k(o_{1:T}) = \log\left(\sum_{i=1}^{N} \alpha_T(i)\right) \tag{6}$$

At step S25, the model learning unit 22 determines whether or not a difference $L_k(o_{1:T}) - L_{k-1}(o_{1:T})$ between the log likelihood $L_k(o_{1:T})$ calculated based on the HMM parameters after the k re-estimations and a log likelihood $L_{k-1}(o_{1:T})$ calculated based on the HMM parameters after previous (k−1) re-estimations is smaller than a predetermined small threshold value $\epsilon$ which is set in advance.

If the difference $L_k(o_{1:T}) - L_{k-1}(o_{1:T})$ is determined to be smaller than the threshold value $\epsilon$ at step S25, that is, for example, if the log likelihood $L_k(o_{1:T})$ calculated based on the HMM parameters after the k re-estimations is hardly increased from the log likelihood $L_{k-1}(o_{1:T})$ calculated based on the HMM parameters after the previous (k−1) re-estimations, and thus the HMM parameters converge, the model learning unit 22 finishes the self learning process.

On the other hand, if the difference $L_k(o_{1:T}) - L_{k-1}(o_{1:T})$ is determined not to be smaller than the threshold value $\epsilon$ at step S25, that is, if the log likelihood $L_k(o_{1:T})$ calculated based on the HMM parameters after the k re-estimations is increased by the threshold value c or more from the log likelihood $L_{k-1}(o_{1:T})$ calculated based on the HMM parameters after the previous (k−1) re-estimations, the process goes to step S26, where the model learning unit 22 determines whether or not the variable k is equal to or smaller than the maximum number K which is preset as the maximum number of re-estimations of the HMM parameters.

If the variable k is determined to be equal to or smaller than the maximum number K at step S26, the process goes to step S27, where the model learning unit 22 increases the variable k by 1, and the process goes to step S28.

At step S28, the model learning unit 22 re-estimates the HMM parameters, and the current parameters are updated to the HMM parameters after the re-estimation.

In other words, when the initial state probability $\pi_i$, the transition probability $a_{ij}$, and the mean value $\mu_j$ and the variance $\sigma_j^2$ of the first observation likelihood $b_j(o)$ after the re-estimations are respectively denoted by $\pi_i'$, $a_{ij}'$, $\mu_j'$, and $\sigma_j^{2'}$, the model learning unit 22 obtains (re-estimates) $\pi_i'$, $a_{ij}'$, $\mu_j'$ and $\sigma_j^{2'}$, based on equations (7), (8), (9), and (10).

$$\pi_i' = \alpha_1(i)\beta_1(i) \tag{7}$$

$$a_{ij}' = \frac{\sum_{t=1}^{T-1} \alpha_t(i) a_{ij} b_j(o_{t+1}) \beta_{t+1}(j)}{\sum_{t=1}^{T-1} \alpha_t(i) \beta_t(i)} \tag{8}$$

$$\mu_j' = \frac{\sum_{t=1}^{T} \alpha_t(j) \beta_t(j) o_t}{\sum_{t=1}^{T} \alpha_t(j) \beta_t(j)} \tag{9}$$

$$\sigma_j^{2'} = \frac{\sum_{t=1}^{T} \alpha_t(j) \beta_t(j) o_t^2}{\sum_{t=1}^{T} \alpha_t(j) \beta_t(j)} - \mu_j' \tag{10}$$

The model learning unit 22 updates the initial state probability $\pi_i$, the transition probability $a_{ij}$, and the mean value $\mu_j$ and the variance $\sigma_j^2$ of the first observation likelihood $b_j(o)$ to $\pi_i'$, $a_{ij}'$, $\mu_j'$ and $\sigma_j^{2'}$ after the re-estimations.

Subsequently, the process returns to step S23 from step S28. The same process is repeated from the step using the initial state probability $\pi_i$, the transition probability $a_{ij}$, and the mean value $\mu_j$ and the variance $\sigma_j^2$ of the first observation likelihood $b_j(o)$, which have been updated.

On the other hand, if the variable k is determined not to be equal to or smaller than the maximum number K at step S26, that is, if the HMM parameters do not converge even by re-estimations of only the maximum number K, the model learning unit 22 finishes the self learning process.

Figure 13:
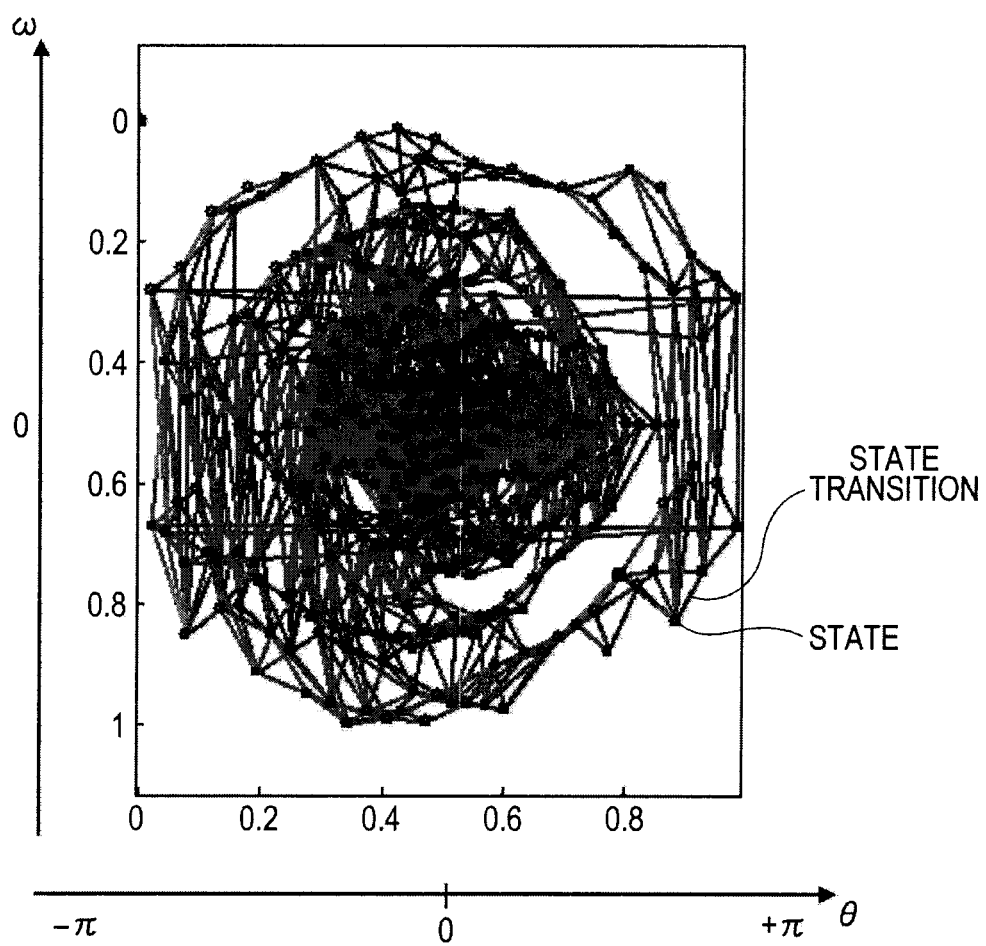
FIG. 13 is a diagram illustrating a multi-observation prediction model after the self learning.

FIG. 13 is a diagram illustrating the multi-observation prediction model after the self learning.

In other words, FIG. 13 shows states and state transitions obtained by carrying out the self learning when using the two-dimensional vicinity constrained HMM (FIG. 4) having 484 states as the multi-observation prediction model.

In FIG. 13, the transverse axis expresses the rotation angle θ of the simple pendulum as the self agent and the longitudinal axis expresses the angular velocity ω of the simple pendulum. Here, the two-dimensional plane defined by the transverse axis expressing the rotation angle θ and the longitudinal axis expressing the angular velocity ω is also referred to as a (θ, ω) plane.

In FIG. 13, in the case where the recognition unit 23 recognizes first time series data $o=o_{t-L+1}, o_{t-L+2}, \ldots o_t$, having the time series length of L, as recognition target data and thereby a certain state $S_i$ can be obtained as a state (current state) $S_t$ at the time t, actual rotation angle θ' and angular velocity ω' of the simple pendulum are recorded, average values $\theta_{ave}$ and $\omega_{ave}$ of the actual rotation angle θ' and the angular velocity ω' recorded for the state $S_i$ are respectively obtained, and the state $S_i$ is plotted in a position $(\theta, \omega)=(\theta_{ave}, \omega_{ave})$ on the (θ, ω) plane.

In addition, in FIG. 13, the transition probability $a_{ij}$ shows 0.01 or more state transition.

In FIG. 13, each state $S_i$ in the multi-observation prediction model is transited only to several states around the state $S_i$ as a principle. However, as the exception thereof, corresponding to the variation of the rotation angle θ from one side of −π or π to the other side, the state transition occurs between a state where the rotation angle θ is positioned in −π and a state where the rotation angle θ is positioned in π.

As described above, it is learned that the occurrence of the state transition only among several states of the vicinity and between the states where the rotation angle θ positioned in −π and the rotation angle θ position in π corresponds to continuous variation of the rotation angle θ and the angular velocity ω of the simple pendulum, and represents a behavior (rotation) of the simple pendulum in the sparse-structured HMM.

Also, in the self learning, it is learned that only the rotation angle θ of the rotation angle θ and the angular velocity ω is used as the model learning data, but states with different angular velocities ω are plotted at the position where the rotation angle θ is the same in FIG. 13, and thus a behavior of the simple pendulum as the self agent which is changed by the angular velocity ω is represented in the multi-observation prediction model after the self learning.

Figure 14:
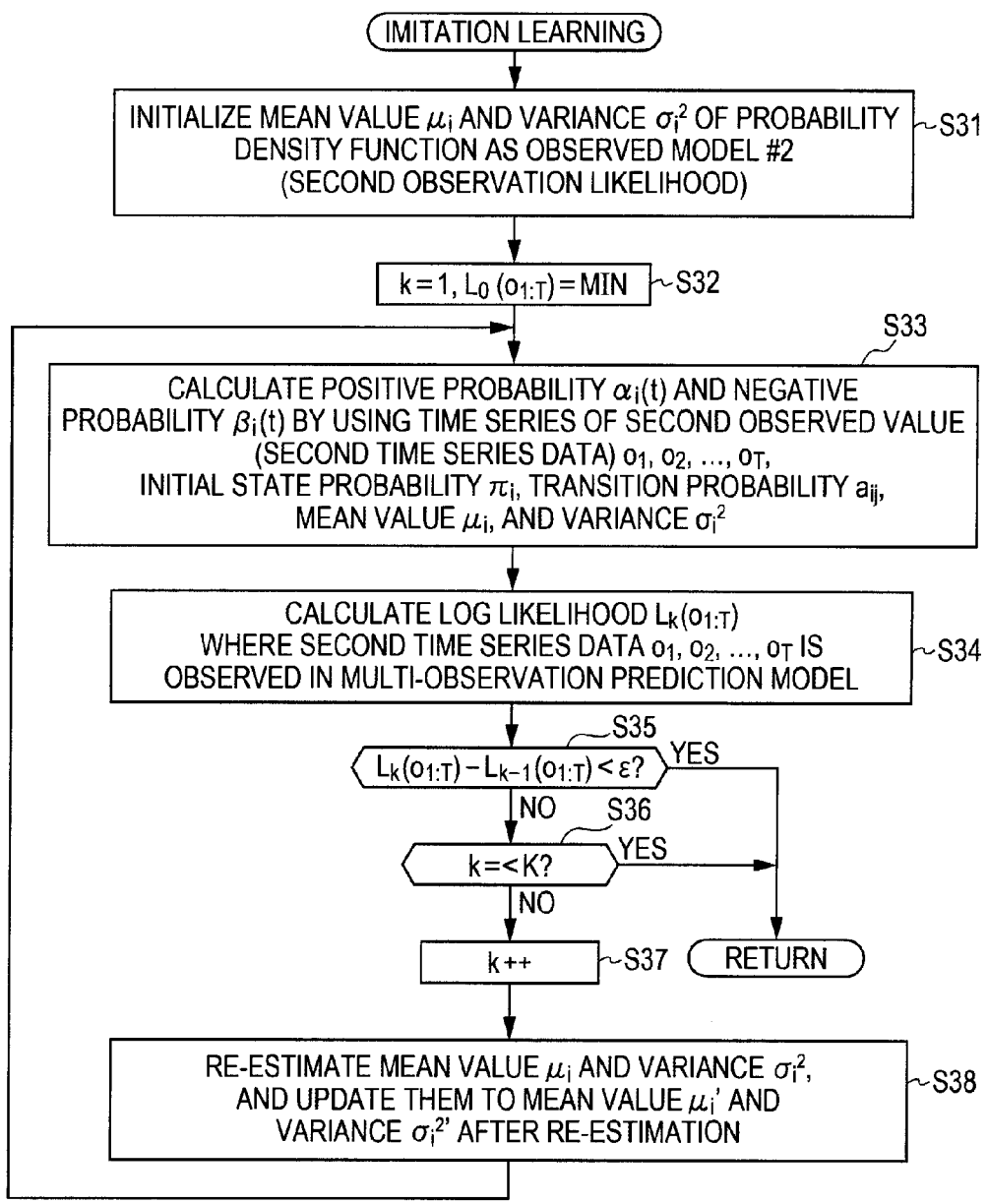
FIG. 14 is a flowchart illustrating an imitation learning process.

FIG. 14 is a detailed flowchart illustrating the imitation learning according to the Baum-Welch algorithm performed at step S12 in FIG. 11.

In the imitation learning, at step S31, the model learning unit 22 initializes the second observation likelihood $b_j(o)$ of the multi-observation prediction model.

Here, the initialization of the second observation likelihood $b_j(o)$ is performed in the same manner as the initialization of the first observation likelihood described with reference to FIG. 12.

In other words, in this embodiment, the second observed value o is the 25-dimensional vector and thus is a continuous value as described in FIG. 10, and thereby the second observation likelihood $b_j(o)$ is expressed by, for example, the probability density function.

In the state $S_j$, the probability density function expressing the second observation likelihood $b_j(o)$ where the second observed value o is observed employs, for example, the normal distribution $N(x, \mu_j, \sigma_j^2)$ where a mean value (mean vector) of the variable x is denoted by $\mu_j$ and the variance (variance covariance matrix) is denoted by $\sigma_j^2$, and, in this case, in the initialization of the second observation likelihood $b_j(o)$, the mean value $\mu_j$ and the variance $\sigma_j^2$ are initialized.

If the second observed value o (each component of the vector as the observed value) is normalized so as to have values ranging from 0.0 to 1.0, the mean value $\mu_j$ (each component of the vector as the mean value) is initialized to, for example, 0.5 or the like which is the middle value in the range of 0.0 to 1.0. In addition, the variance $\sigma_j^2$ (for example, diagonal components of the variance covariance matrix as the variance) is initialized to, for example, 0.5 or the like which is great in the variance in the range of 0.0 to 1.0.

At step S31, the second observation likelihood $b_j(o)$ in the multi-observation prediction model is initialized, the process goes to step S32, and the model learning unit 22 initializes the variable k for counting the number of the re-estimations of the second observation likelihood $b_j(o)$, to 1.

In addition, the model learning unit 22 initializes a log likelihood $L_0(o_{1:T})$ where the second time series data $o_{1:T}$ which is a time series of the second observed value o as the model learning data stored in the buffer 21 is observed, to a small value MIN corresponding to an extent that is not regarded as the second time series data $o_{1:T}$ being observed, in a multi-observation prediction model defined by the second observation likelihood $b_j(o)$ after re-estimation of 0 time (the second observation likelihood $b_j(o)$ which is not re-estimated yet), and the process goes to step S33 from step S32.

Here, the second time series data $o_{1:T}$ is a time series $o_1$, $o_2, \ldots, o_T$ of the second observed values o of T.

At step S33, the model learning unit 22 calculates a positive probability $\alpha_{t+1}(j)$ and a negative probability $\beta_t(i)$ based on equation (1) to (4) in the same manner as the self learning by using the second time series data $o_{1:T}$, the second observation likelihood $b_j(o)$, and the initial state probability $\pi_i$ and the transition probability $a_{ij}$ obtained during the self learning, and the process goes to step S34.

At step S34, the model learning unit 22 calculates a log likelihood $L_k(o_{1:T})$ where the second time series data $o_{1:T}$ as the model learning data stored in the buffer 21 is observed, based on equation (6) in the same manner as the self learning, by using the positive probability $\alpha_{t+1}(j)$ obtained at previous step S33, in a multi-observation prediction model defined by a second observation likelihood $b_j(o)$ after k re-estimations, and the initial state probability $\pi_i$ and the transition probability $a_{ij}$ obtained during the self learning, and the process goes to step S35.

At step S35, the model learning unit 22 determines whether or not a difference $L_k(o_{1:T})-L_{k-1}(o_{1:T})$ between the log likelihood $L_k(o_{1:T})$ calculated based on the second observation likelihood $b_j(o)$ after the k re-estimations, and the initial state probability $\pi_i$ and the transition probability $a_{ij}$ obtained during the self learning, and a log likelihood $L_{k-1}(o_{1:T})$ calculated based on a second observation likelihood $b_j(o)$ after previous (k−1) re-estimations, and the initial state probability $\pi_i$ and the transition probability $a_{ij}$ obtained during the self learning, is smaller than a predetermined small threshold value $\epsilon$.

If the difference $L_k(o_{1:T})−L_{k−1}(o_{1:T})$ is determined to be smaller than the threshold value $\epsilon$ at step S35, that is, for example, if the log likelihood $L_k(o_{1:T})$ calculated based on the second observation likelihood $b_j(o)$ after the k re-estimations is hardly increased from the log likelihood $L_{k−1}(o_{1:T})$ calculated based on the second observation likelihood $b_j(o)$ after the previous (k−1) re-estimations, and thus the second observation likelihood $b_j(o)$ converges, the model learning unit 22 finishes the process of the imitation learning.

On the other hand, if the difference $L_k(o_{1:T})−L_{k−1}(o_{1:T})$ is determined not to be smaller than the threshold value $\epsilon$ at step S35, that is, if the log likelihood $L_k(o_{1:T})$ calculated based on the second observation likelihood $b_j(o)$ after the k re-estimations is increased by the threshold value $\epsilon$ or more from the log likelihood $L_{k−1}(o_{1:T})$ calculated based on the second observation likelihood $b_j(o)$ after the previous (k−1) re-estimations, the process goes to step S36, where the model learning unit 22 determines whether or not the variable k is equal to or smaller than the maximum number K which is preset as the maximum number of re-estimations of the second observation likelihood $b_j(o)$.

If the variable k is determined to be equal to or smaller than the maximum number K at step S36, the process goes to step S37, where the model learning unit 22 increases the variable k by 1, and the process goes to step S38.

At step S38, the model learning unit 22 re-estimates the second observation likelihood $b_j(o)$, and the current observation likelihood $b_j(o)$ is updated to the second observation likelihood $b_j(o)$ after the re-estimation.

In other words, if the mean value $\mu_j$ and the variance $\sigma_j^2$ of the second observation likelihood $b_j(o)$ after the re-estimations are respectively denoted by $\mu_j'$ and $\sigma_j^{2'}$, the model learning unit 22 obtains (re-estimates) $\mu_j'$ and $\sigma_j^{2'}$, based on equations (9) and (10) in the same manner as the self learning.

The model learning unit 22 updates the mean value $\mu_j$ and the variance $\sigma_j^2$ of the second observation likelihood $b_j(o)$ to $\mu_j'$ and $\sigma_j^{2'}$ after the re-estimations, respectively.

In addition, the initial state probability $\pi_i$ and the transition probability $a_{ij}$ are maintained to be the same values as were obtained during the self learning (not updated).

Subsequently, the process returns to step S33 from step S38. The same process is repeated from the step using the mean value $\mu_j$ and the variance $\sigma_j^2$ of the second observation likelihood $b_j(o)$, which have been updated, and the initial state probability $\pi_i$ and the transition probability $a_{ij}$ obtained during the self learning.

Therefore, during the imitation learning, the initial state probability $\pi_i$ and the transition probability $a_{ij}$ obtained during the self learning are not updated and fixed to the same values (as were obtained during the self learning), and only the second observation likelihood $b_j(o)$ (the mean value $\mu_j$ and the variance $\sigma_j^2$ thereof) are updated through the re-estimations.

On the other hand, if the variable k is determined not to be equal to or smaller than the maximum number K at step S36, that is, the second observation likelihood $b_j(o)$ does not converge even by re-estimations of only the maximum number K, the model learning unit 22 finishes the process of the imitation learning.

According to the above-described imitation learning, the learning of the multi-observation prediction model (obtainment of the time series patterns of the time series of the second observed values) for recognition of the second observed values observed from the other agent is not only carried out, but the learning of the correlation of a state of the imitator (the self agent) himself/herself with a state of another person (the other agent) is also carried out, that is, the relationship between the second observed value observed when the other agent does a certain action and the first observed value observed when the self agent does the same action as the other agent is obtained.

In other words, in the self learning, the first observation likelihood defining the multi-observation prediction model may not be applied to the process using an image of the other agent which is the second observed value observed from the other agent since the first observation likelihood is obtained using the first observed value which is the rotation angle θ of the simple pendulum as the self agent itself.

Therefore, in the process using the second observed value observed from the other agent, the second observation likelihood (observation model #2) where the second observed value is observed is defined independently from the first observation likelihood (observation model #1), and the imitation learning for obtaining the second observation likelihood is carried out independently from the self learning for obtaining the first observation likelihood in the multi-observation prediction model.

In addition, in the imitation learning, for the learning of the multi-observation prediction model after the self learning, the second observed value observed from the other agent is used, the initial state probability and the transition probability obtained during the self learning are fixed, and thereby only the second observation likelihood is updated, such that the multi-observation prediction model for recognition of the second observed value is learned. Furthermore, the correlation (correspondence relationship) of a state of the imitator (the self agent) himself/herself with a state of another person (the other agent) is learned.

In other words, in the imitation learning, since the learning of the multi-observation prediction model after the self learning is carried out by using the second observed value observed from the other agent and fixing the initial state probability and the transition probability obtained during the self agent, the second observed value observed when the other agent does a certain action and the first observed value observed when the self agent does the same action as the other agent can be correlated with each other, so to speak, through the state such as corresponding to the above-described mirror neuron.

Therefore, the correlation of a state of the imitator (the self agent) himself/herself with a state of another person (the other agent) can be learned efficiently, and, as a result, the self agent can efficiently imitate an action done by the other agent through an imitation process described later.

Figure 15:
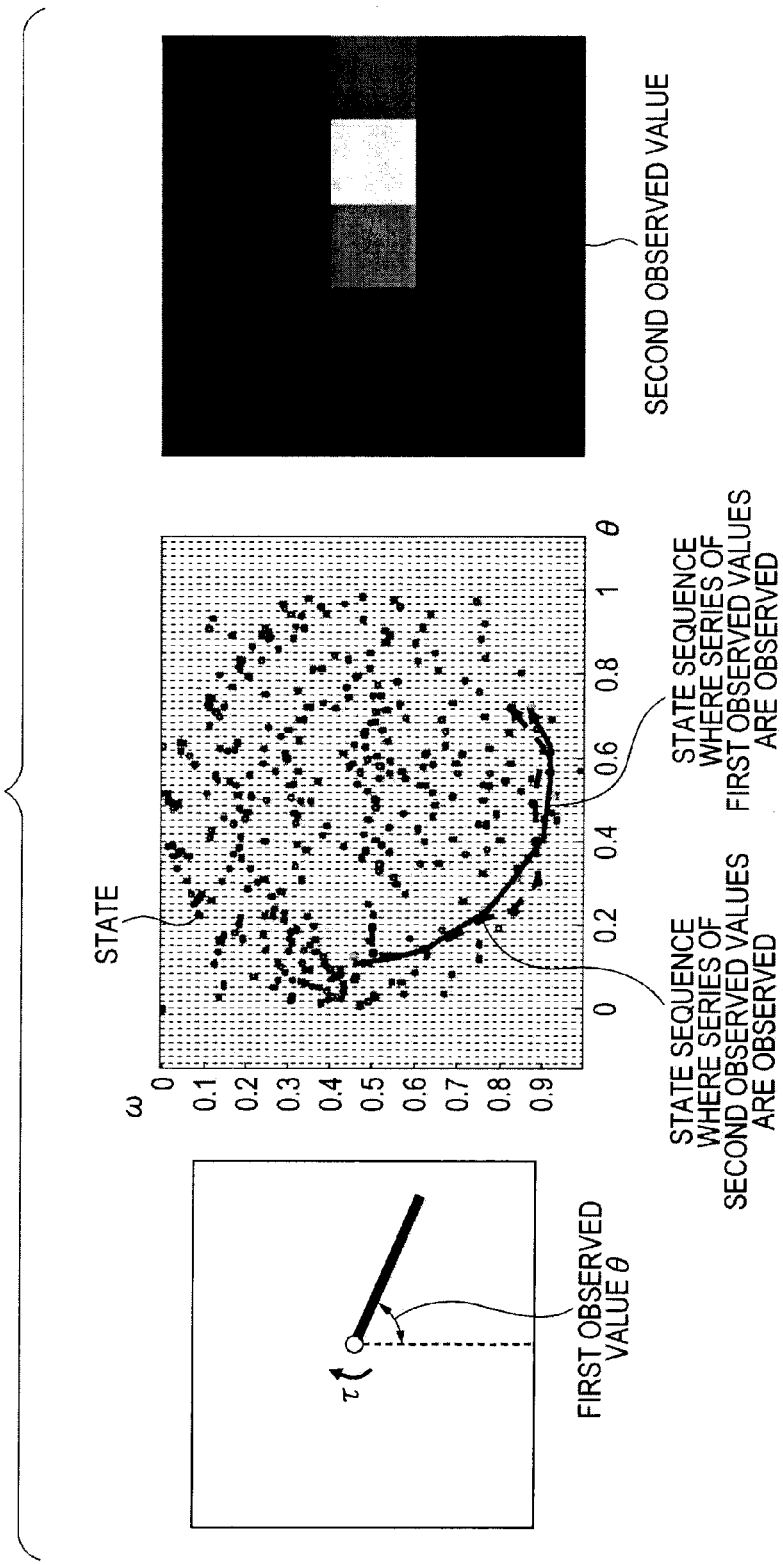
FIG. 15 is a diagram illustrating a state sequence where a first time series data is observed and a state sequence where a second time series data is observed, in a multi-observation prediction model after the imitation learning.

FIG. 15 is a diagram illustrating a state sequence where the first time series data is observed and a state sequence where the second time series data is observed in the multi-observation prediction model after the imitation learning.

In FIG. 15, in the same manner as FIG. 13, each state in the multi-observation prediction model after the imitation learning is plotted on the (θ, ω) plane.

In addition, FIG. 15 shows a state sequence having the maximum likelihood where each of the first time series data which is a time series of the rotation angle θ (the first observed value) of the self agent and the second time series data which is a time series of the image (the second observed value) of the other agent, which are observed when the simple pendulum as the self agent and the simple pendulum as the other agent rotate in synchronization with each other, is observed in the multi-observation prediction model.

In the multi-observation prediction model, since the state sequence (in the figure, marked with the solid arrow) which has the maximum likelihood where the first time series data is observed and the state sequence (in the figure, marked with the dotted arrow) which has the maximum likelihood where the second time series data is observed in the multi-observation prediction model are drawn by nearly the same loci on the $(\theta, \omega)$ plane, it is learned that the correlation of a state of the imitator (the self agent) himself/herself with a state of another person (the other agent) is accurately performed, that is, the second observed value observed when the other agent does a certain action and the first observed value observed when the self agent does the same action as the other agent are allocated to each state in the multi-observation prediction model.

Recognition Using the Multi-Observation Prediction Model

Figure 16:
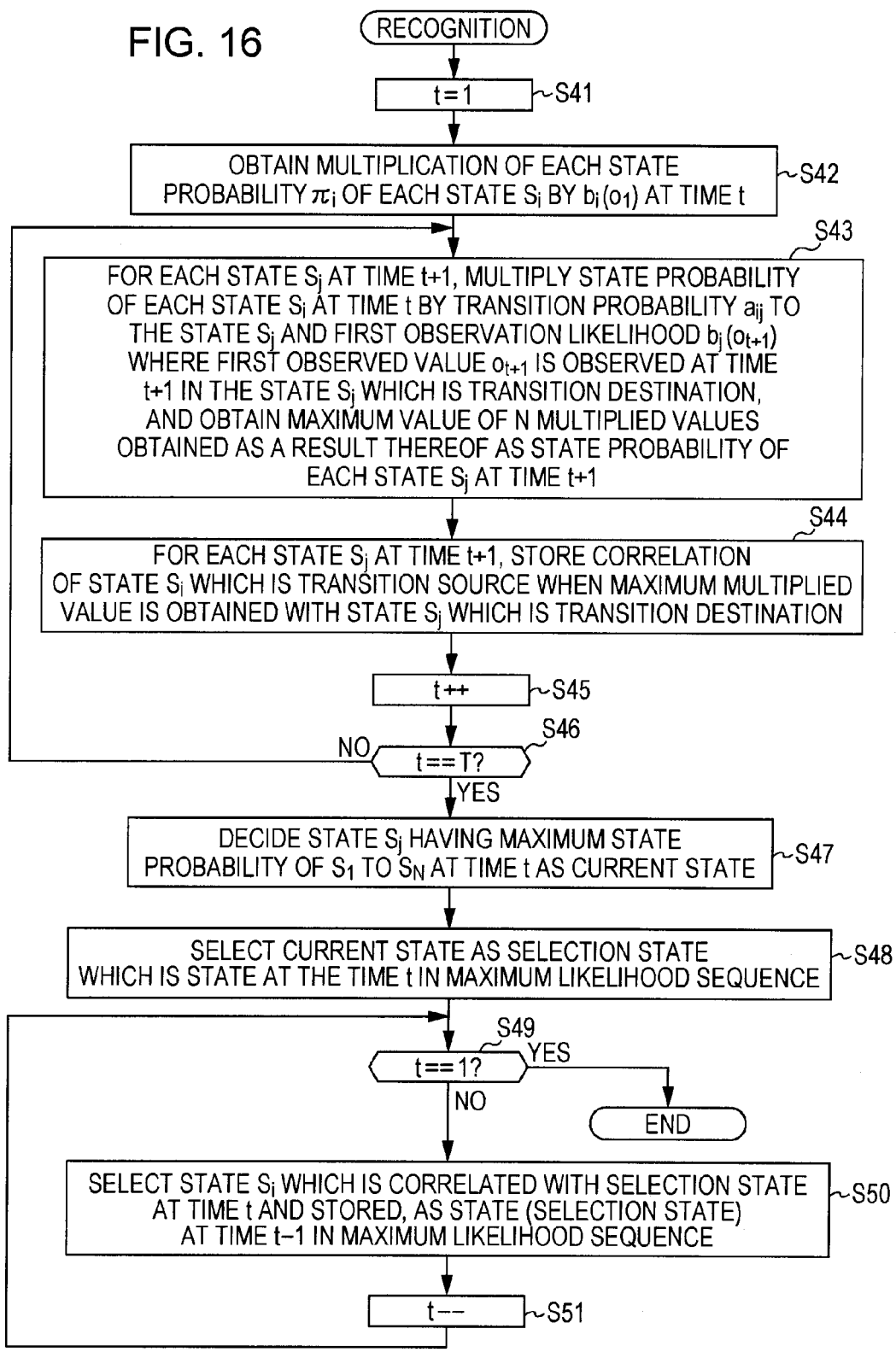
FIG. 16 is a flowchart illustrating a recognition process.

FIG. 16 is a flowchart illustrating a process of recognition (recognition process) using the multi-observation prediction model, performed by recognition unit 23 in FIG. 1.

By using the multi-observation prediction model where the self learning progresses to a degree, the time series of the first observed value is designated as recognition target data, and the recognition target data is recognized. As a result of the recognition of the recognition target data, it is possible to obtain (estimate) a current state which is a state where a latest (current) sample value (the first observed value) of the recognition target data is observed in the multi-observation prediction model.

In other words, the recognition unit 23 obtains, as a current state which is a result of the recognition of the recognition target data, a state having the maximum state probability when the latest sample value of the respective sample values of the recognition target data observed in a time series is observed, based on, for example, the Viterbi algorithm by using the multi-observation prediction model where the self learning progresses to a degree (including a multi-observation prediction model where the self learning is finished).

Specifically, the recognition unit 23 reads the sequence $o_1, o_2, \ldots, o_T$ of the first observed values of the latest predetermined number T (for example, fifty samples or the like) stored in the buffer 21 as the recognition target data, and, at step S41, sets a variable t denoting time to 1 as an initial value. Thereafter, the process goes to step S42.

At step S42, the recognition unit 23 obtains a state probability of each state $S_i$ of N forming the multi-observation prediction model at the time t=1 by multiplying the initial state probability $\pi_i$ of the state $S_i$ by the first observation likelihood $b_i(o_1)$ of the first observed value $o_1$ at the time t=1, and the process goes to step S43.

Here, the state probability of each state $S_i$ of N at the time t=1 may be obtained by multiplying the first observation likelihood $b_i(o_1)$ by 1/N when assuming a state at the time t=1 (a time preceding a current time by T samples) not to be constant, that is, assuming a state probability of each state $S_i$ as 1/N, in addition to being obtained by multiplying the initial state probability $\pi_i$ of the state $S_i$ by the first observation likelihood $b_i(o_1)$.

At step S43, for each state $S_j$ at the time t+1, the recognition unit 23 multiplies the state probability of each state $S_i$ at the time t by the transition probability $a_{ij}$ to the state $S_j$ and the first observation likelihood $b_j(o_{t+1})$ where the first observed value $o_{t+1}$ at the time t+1 is observed from the state $S_j$ which is the transition destination, and obtains the maximum value of the N multiplied values obtained as a result thereof, as the state probability of the state $S_j$ at the time t+1. Thereafter, the process goes to step S44.

At step S44, for each state $S_j$ at the time t+1, the recognition unit 23 stores the correlation of the state $S_j$ which is the transition source when the maximum multiplied value is obtained at previous step S43 with the state $S_j$ which is the transition destination, and the process goes to step S45.

At step S45, the recognition unit 23 increases the time t by 1, and the process goes to step S46.

At step S46, the recognition unit 23 determines whether or not the time t is equal to the time series length T of the recognition target data.

At step S46, if the time t is determined not to be equal to the time series length T of the recognition target data, the process returns to step S43, and the same process is repeated from the step.

In addition, at step S46, if the time t is determined to be equal to the time series length T of the recognition target data, that is, if, in the multi-observation prediction model, the sequence $o_1, o_2, \ldots, o_T$ of the first observed values of T which is the recognition target data is observed and the state probability of each state $S_i$ is obtained, the process goes to step S47, where the recognition unit 23 decides the current state as a result of the recognition of the recognition target data.

That is to say, at step S47, the recognition unit 23 decides the state $S_j$ having the maximum state probability of the states $S_1$ to $S_N$ at the time t(=T) as the current state.

Subsequently, the process goes to step S48 from step S47. Hereinafter, in the multi-observation prediction model, a maximum likelihood sequence which is a state sequence having the maximum likelihood where the recognition target data is observed is obtained.

In other words, at step S48, the recognition unit 23 selects the current state as a selection state which is a state at the time t (=T) in the maximum likelihood sequence, and the process goes to step S49.

At step S49, the recognition unit 23 determines whether or not the time t is equal to the initial value 1.

At step S49, if the time t is determined not to be equal to the initial value, the process goes to step S50, where the recognition unit 23 selects, as a selection state which is a state at the time t−1 in the maximum likelihood sequence, the state (a state of a transition source transited to a selection state at the time t) $S_i$ which is correlated with the selection state at the time t and stored, and the process goes to step S51.

At step S51, the recognition unit 23 increases the time t by 1, the process returns to step S49, and the same process is repeated from the step.

At step S49, if the time t is determined to be equal to the initial value 1, that is, if a state sequence which becomes the maximum likelihood sequence can be obtained, the recognition unit 23 finishes the recognition process.

By using the multi-observation prediction model where the imitation learning progresses to a degree (including the multi-observation prediction model where the imitation learning is finished), in the same method as is described with reference to FIG. 16, the recognition unit 23 may designate the time series of the second observed value as recognition target data, recognize the recognition target data, as a result of the recognition of the recognition target data, obtain a current state which is a state where a latest (current) sample value (the second observed value) of the recognition target data is observed in the multi-observation prediction model, and obtain the maximum likelihood sequence having the maximum likelihood where the time series of the second observed value as the recognition target data are observed in the multi-observation prediction model.

Action Learning

Figure 17:
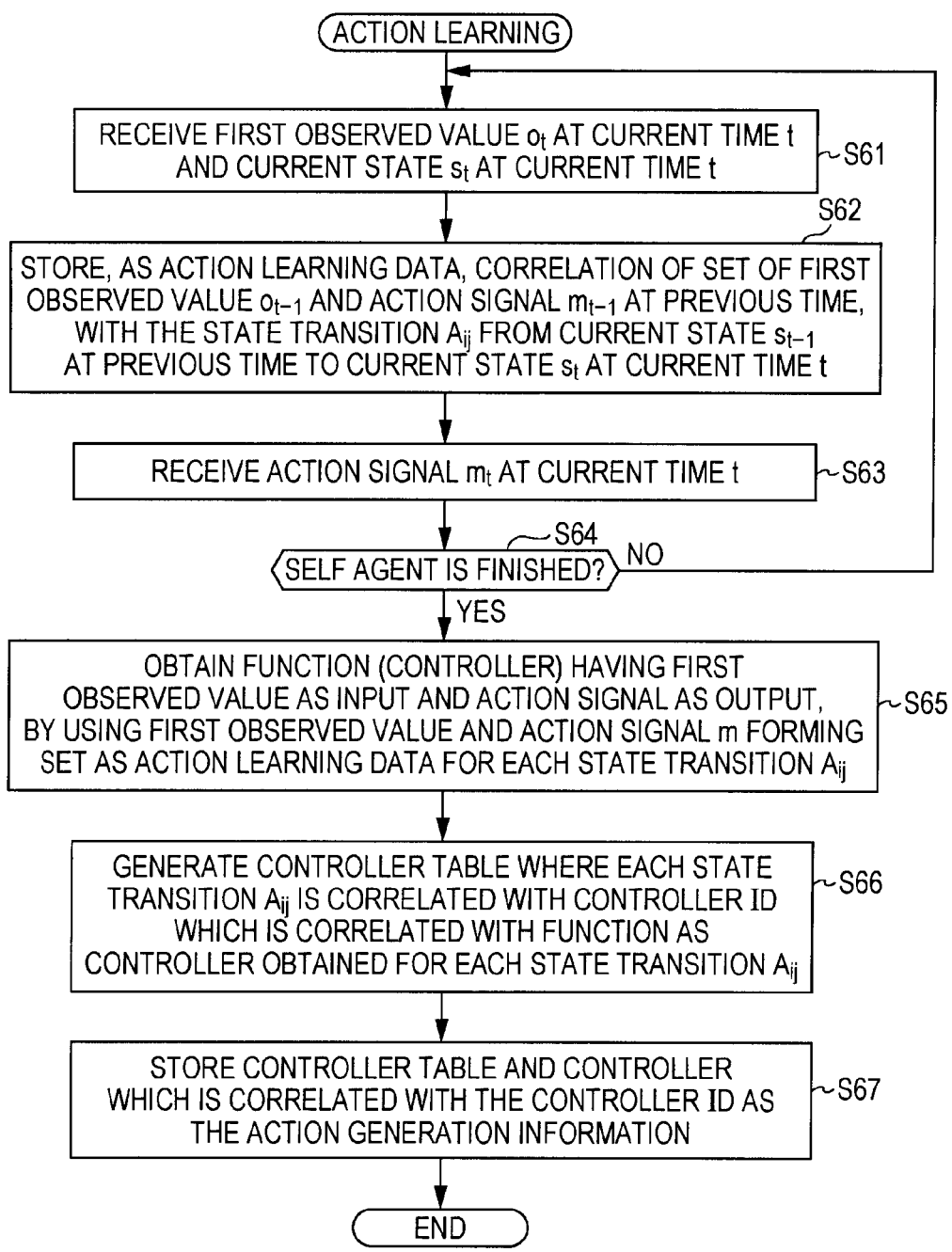
FIG. 17 is a flowchart illustrating an action learning process.

FIG. 17 is a flowchart illustrating a process of an action learning (action learning process) carried out by the action learning unit 33 in FIG. 1.

As described with reference to FIG. 16, if the self learning progresses to a degree, the recognition unit 23 can obtain the current state when the series of the first observed values as the recognition target data are observed by using the multi-observation prediction model where the self learning progresses to a degree.

In other words, it is possible to obtain the current state as a result of the recognition of the first time series data formed by the latest first observed values of T which have the first observed value at the time t as the latest sample value for each time.

Therefore, when the first observed values exceeding T are observed, it is possible to decide a state transition $A_{ij}$ from the current state $S_t$ at the time t to a current state $S_{t+1}$ at the next time t+1 for each time t after the time t=T.

In the case where the self learning has been carried out, the simple pendulum as the self agent does an action of rotation in response to the action signal generated by the innate controller 35.

Now, if an action signal generated by the innate controller 35 at the time t is denoted by $m_t$, there is an establishment of a causal model that, in the current state $S_t$ where the first observed value $o_t$ at the time t is observed, an action responding to the action signal $m_t$ at the time t is done, and thereby the state transition $A_{ij}$ to the current state $S_{t+1}$ at the next time t+1 occurs.

For each state transition $A_{ij}$, the action learning unit 33 collects a set of the first observed value $o_t$ at the time t before the state transition $A_{ij}$ occurs and the action signal $m_t$ at the time t, as action learning data used to learn actions, and learns, by using the action learning data, actions, that is, a relationship between the action signal $m_t$ for making the self agent do a predetermined action and the state transition $A_{ij}$ in the multi-observation prediction model which is caused by doing an action responding to the action signal.

Specifically, the action learning unit 33, during the action learning, obtains a function $m_t=f_{ij}(o_t)$ outputting an action signal $m_t$ used to do an action causing a state transition for each state transition $A_{ij}$ by using the action learning data and having the first observed value $o_t$ as an input, as a controller.

The function $F_{ij}(\ )$ may use, for example, neural network or the like.

In the action learning process in FIG. 17, as described above, the function $m_t=F_{ij}(o_t)$ as a controller is obtained.

The action learning process in FIG. 17 starts, for example, when the self learning progresses to a degree. At step S61, the recognition unit 23 recognizes the first time series data formed by the latest first observed values of T as the recognition target data, and the action learning unit 33 waits for the current state $S_t$ at the current time (the latest time) t and the first observed value $o_t$ at the current time t to be output and receives the current state $S_t$ and the first observed value $o_t$ at the current time t. Thereafter, the process goes to step S62.

At step S62, the action learning unit 33 stores, as the action learning data, the correlation of a set of the first observed value $o_{t-1}$ at the time t−1 which has been received from the recognition unit 23 at the previous time and an action signal $m_{t-1}$ at the time t−1 which has been received from the innate controller 35 at the previous time, with the state transition $A_{ij}$ from the current state $S_{t-1}$ at the time t−1 which has been received from the recognition unit 23 at the previous time to the current state $S_t$ at the current time t which has been received from the recognition unit 23 at the previous step S61.

Thereafter, the action learning unit 33 waits for the innate controller 35 to output an action signal $m_t$ at the current time t, the process goes to step S63 from step S62 where the action learning unit 33 receives the action signal $m_t$ at the current time t output from the innate controller 35, and the process goes to step S64.

At step S64, the action learning unit 33 determines whether the self learning is finished or the sufficient number of the action learning data for each state transition $A_{ij}$ was obtained.

At step S64, if it is determined that the self learning is not finished and the sufficient number of the action learning data was not obtained for each state transition the recognition unit 23 recognizes the first time series data observed from the latest first observed values of T including the first observed value $o_{t+1}$ at the next time t+1 as recognition target data, and the action learning unit 33 waits for the current state $S_{t+1}$ at the time t+1 and the first observed value $o_{t+1}$ at the time t+1 to be output. Thereafter, the process returns to step S61, and the same process is repeated from the step.

On the other hand, at step S64, if it is determined that the self learning is finished or the sufficient number of the action learning data was obtained for each state transition $A_{ij}$, the process goes to step S65, the action learning unit 33 obtains a controller which is a function $m=F_{ij}(o)$ having the first observed value o as an input and the action signal m as an output, by using the first observed value o and the action signal m forming a set as the action learning data for each state transition $A_{ij}$.

When the controller which is the function $m=F_{ij}(o)$ is obtained for each state transition $A_{ij}$, the process goes to step S66 from step S65, where the action learning unit 33 correlates a unique controller ID for identifying the controller with the function $m=F_{ij}(o)$ as a controller obtained for each state transition $A_{ij}$.

In addition, the action learning unit 33 generates a controller table where each state transition $A_{ij}$ is correlated with the controller ID which is correlated with the function $m=F_{ij}(o)$ as a controller obtained for each state transition $A_{ij}$, and the process goes to step S67 from step S66.

At step S67, the action learning unit 33 stores the function $m=F_{ij}(o)$ as a controller which is correlated with the controller ID obtained at step S66 and the controller table, in the action generation information storage unit 34, as action generation information, and finishes the action learning process.

In addition, in FIG. 17, although the controller of the state transition $A_{ij}$ uses the function $m=F_{ij}(o)$ having the first observed value o as an input and the action signal m as an output, the controller of the state transition $A_{ij}$ may use others, for example, a function which outputs a constant value such as the mean value of the action signal m forming the action learning data regarding the state transition $A_{ij}$, irrespective of the first observed value o.

Planning

Figure 18:
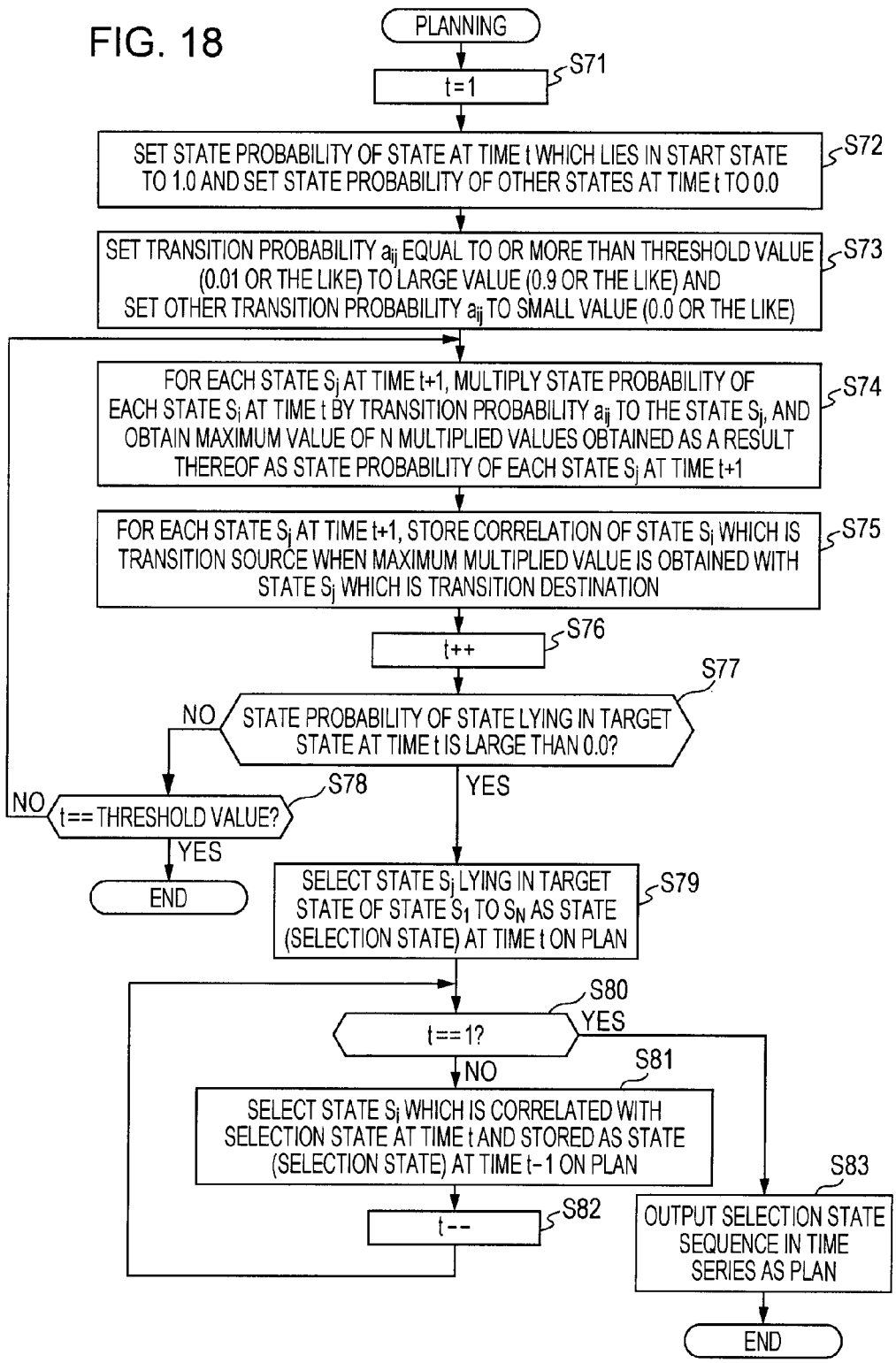
FIG. 18 is a flowchart illustrating a planning process.

FIG. 18 is a flowchart illustrating a process of planning (planning process) performed by the planning unit 31 in FIG. 1.

When the action learning process (FIG. 17) is finished, the self agent (FIG. 1) designates one state $S_s$ in the multi-observation prediction model as a start state and another state $S_e$ as a target state, performs the planning process for obtaining a plan which is a state sequence of reaching the target state from the start state, and does actions that the self agent is sequentially transited to states on the plan and finally reaches the target state.

As a method of obtaining the plan in the planning process, there is a method where when a start state and a target state are given, only one of state transitions of which a transition probability of a state transition having the start state as a transition source state is equal to or more than a predetermined threshold value is randomly selected, and only one of state transitions of which a transition probability of a state transition having a transition destination state in the state transition as a transition source state is equal to or more than a predetermined threshold value is again randomly selected, which are repeated until the transition destination state in the state transition becomes the target state.

However, in this method, in many cases, a plan (a plan having a large number of state transitions (states therein)) taking a time in reaching the target state from the start state is obtained.

Thereby, methods of obtaining a plan of reaching the target state from the start state in a short time include a method of applying, for example, the Viterbi algorithm.

The flowchart in FIG. 18 shows a planning process for obtaining a plan by the method of applying the Viterbi algorithm.

In addition, during the planning process, when the planning unit 31 obtains a plan as a target state which is a state indicated by the target information (FIG. 1) supplied to the planning unit 31, the planning unit 31 designates a start state as a current state supplied from the recognition unit 23.

In the planning process in FIG. 18, the planning unit 31 sets the variable t indicating a time to 1 as an initial value at step S71, and the process goes to step S72.

At step S72, the planning unit 31 sets a state probability of a start state (a state lying in the start state) at the time t=1 to 1.0 as an initial value, and sets a state probability of states other than the start state at the time t to 0.0. Thereafter, the process goes to step S73.

At step S73, the planning unit 31 sets a transition probability $a_{ij}$ equal to or more than a predetermined threshold value (for example, 0.01 or the like) of transition probabilities $a_{ij}$ to a large value (for example, 0.9 or the like) within limits used in the planning process, and sets other transition probabilities $a_{ij}$ to a small value (for example, 0.0 or the like) within limits used in the planning process. Thereafter, the process goes to step S74.

At step S74, the planning unit 31, for each state $S_j$ at the time t+1, multiplies a state probability of each state $S_i$ at the time t by a transition probability $a_{ij}$ to the state $S_j$, and obtains the maximum value of N multiplied values obtained as a result thereof as a state probability of each state at the time t+1. Thereafter, the process goes to step S75.

At step S75, the planning unit 31, for each state $S_j$ at the time t+1, stores the correlation of a transition source state $S_i$ when the maximum multiplied value is obtained with a transition destination state $S_j$ at step S74, and the process goes to step S76.

At step S76, the planning unit 31 increases the time t by 1, and the process goes to step S77.

At step S77, the planning unit 31 determines whether or not a state probability of the target state (the state lying therein) at the time t is larger than 0.0.

If the state probability of the target state at the time t is determined not to be larger than 0.0 at step S77, that is, if the start state does not reach the target state only by the state transition where the transition probability $a_{ij}$ is set to the large value at step S73, the process goes to step S78, where the planning unit 31 determines whether or not the time t is equal to a preset threshold value which is the maximum value of the series length (the number of states) of the state sequence as the plan.

If the time t is determined to be equal to the threshold value at step S78, that is, if a state sequence having a series length within the threshold value may not be detected as a plan, since the plan may not be obtained, the planning process is finished.

In this case, the planning unit 31 may request, for example, new target information, to change the target state, or enable the self agent to do an arbitrary action to change the current state and further the start state, so as to start the planning process again.

On the other hand, if the time t is determined not to be equal to the threshold value at step S78, the process returns to step S74, and the same process is repeated from the step.

If the state probability of the target state at the time t is determined to be larger than 0.0 at step S77, that is, if the start state reaches the target state only by the state transition where the transition probability $a_{ij}$ is set to the large value at step S73, the process goes to step S79, and, a state sequence of reaching the target state from the start state is obtained as a plan from the step.

That is to say, at step S79, the planning unit 31 selects, as a selection state which is a state at the time t on a plan, the target state (the state lying therein) $S_j$ of a state $S_1$ to a state $S_N$ in the multi-observation prediction model, and the process goes to step S80.

At step S80, the planning unit 31 determines whether or not the time t is equal to 1 which is an initial value.

When the time t is determined not to be equal to the initial value at step S80, the process goes to step S81, and the planning unit 31 selects, as a selection state which is a state at the time t−1 on the plan, the state (the transition source state which is transited to the selection state at the time t) $S_i$ which is correlated with the selection state at the time t and stored. Thereafter, the process goes to step S82.

At step S82, the planning unit 31 increases the time t by 1, the process returns to step S80, and the same process is repeated from the step.

If the time t is determined to be equal to the initial value of 1 at step S80, that is, if all the selection states forming a state sequence as the plan can be obtained, the process goes to step S83, where the planning unit 31 arranges the selection states in a time series, and outputs a state sequence corresponding to the arrangement of the selection states in a time series as the plan. Thus, the planning process is finished.

As described above, if the plan can be obtained by the planning unit 31, the self agent (FIG. 1) does actions of sequentially transiting to states on the plan and finally reaching the target state.

The plan output from the planning unit 31 is supplied to the action signal generation unit 32.

The action signal generation unit 32 generates an action signal used to do actions of sequentially transiting to the states on the plan from the planning unit 31 and finally reaching the target state, and supplies the action signal to the action unit 14.

The action unit 14 drives movable parts in response to the action signal from the action signal generation unit 32, and thus the simple pendulum as the self agent does an action of rotation due to a torque τ responding to the action signal, and enters a state (the rotation angle θ, and the angular velocity ω) corresponding to the last state (target state) on the plan.

Action Signal Generation

Figure 19:
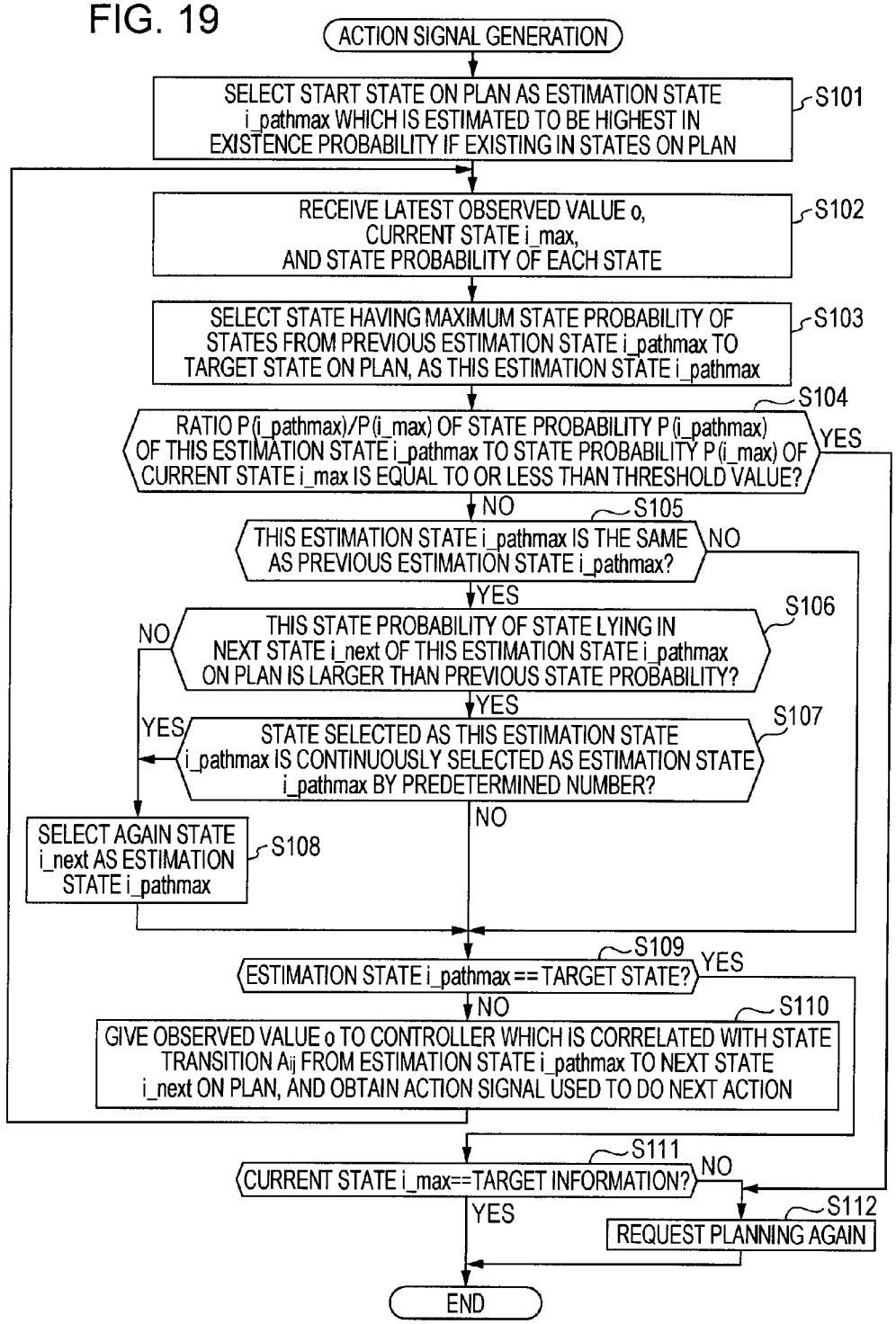
FIG. 19 is a flowchart illustrating an action signal generation process.

FIG. 19 is a flowchart illustrating a process of generating action signals (action signal generation process) performed by the action signal generation unit 32.

The action signal generation unit 32 starts the action signal generation process, for example, when the planning unit 31 supplies the plan.

During the action signal generation process, at step S101, the action signal generation unit 32 selects a start state on the plan as an estimation state i_pathmax which is estimated to be highest in an existence probability if existing in states on the plan.

Thereafter, the recognition unit 23 recognizes the first time series data observed from the latest first observed values of T as recognition target data, and the action signal generation unit 32 waits for the current state i_max at the current time (the latest time) t, the first observed value o at the current time t, and a state probability of each state at the current time t to be output. Thereafter, the process goes to step S102 from step S101, where the action signal generation unit 32 receives the current state i_max, the first observed value o, and the state probability at the current time t, and, the process goes to step S103.

At step S103, the action signal generation unit 32 (temporarily) selects a state supplied from the recognition unit 23 and having the maximum state probability of states from the previous estimation state i_pathmax to the target state as this estimation state i_pathmax, and the process goes to step S104.

Here, when the process at step S103 is performed for the first time after the plan is supplied to the action signal generation unit 32 from the planning unit 31, the start state selected at step S101 becomes the previous estimation state i_pathmax.

At step S104, the action signal generation unit 32 determines whether or not a ratio P(i_pathmax)/P(i_max) of a state probability P(i_pathmax) of this estimation state i_pathmax to a state probability P(i_max) of the current state i_max, of the state probabilities from the recognition unit 23, is equal to or less than a threshold value (for example, 0.7 or the like).

If the ratio P(i_pathmax)/P(i_max) is determined to be equal to or less than the threshold value at step S104, the process goes to step S112, where the action signal generation unit 32 requests planning again to the planning unit 31, and the action signal generation process is finished.

In other words, if the ratio P(i_pathmax)/P(i_max) is equal to or less than the predetermined threshold value, since the current state i_max is not estimated to be states on the plan or states close to the states on the plan, it is difficult to generate an action signal used to do an action causing state transitions (including both of state transitions following states on the plan and state transitions where states close to the states on the plan go towards the target state) according to the plan, and thus the action signal generation unit 32 requests the planning again to the planning unit 31 in order to change a plan of reaching the target state from the current state $S_t$ (or a state close to the current state $S_t$). Thereafter, the action signal generation process is finished.

On the other hand, if the ratio P(i_pathmax)/P(i_max) is determined not to be equal to or less than the predetermined threshold value at step S104, the process goes to step S105, where the action signal generation unit 32 determines whether or not this estimation state i_pathmax is the same as the previous estimation state i_pathmax.

If this estimation state i_pathmax is determined not to be the same as the previous estimation state i_pathmax at step S105, the process goes to step S109.

On the other hand, if this estimation state i_pathmax is determined to be the same as the previous estimation state i_pathmax at step S105, the process goes to step S106, where the action signal generation unit 32 determines whether or not this state probability of a state lying in the next state i_next of this estimation state i_pathmax on the plan is larger than a previous state probability.

When this state probability of the state lying in the next state i_next is determined not to be larger than the previous state probability at step S106, that is, when an estimation state i_pathmax to be estimated to exist if existing in states on the plan is not changed before and after an action is done, but a state probability of the next state i_next of the estimation state i_pathmax is not increased after the action is done as compared with that before the action is done, the process goes to step S108, where the action signal generation unit 32 selects the next state i_next (the state lying therein) as this estimation state i_pathmax again, and the process goes to step S109.

Here, when an estimation state i_pathmax to be estimated to exist if existing in states on the plan is not changed before and after an action is done, but a state probability of the next state i_next of the estimation state i_pathmax is not increased after the action is done as compared with that before the action is done, it is estimated that state transitions according to the plan are not performed.

In this case, the action signal generation unit 32 tentatively sets this estimation state i_pathmax to the next state i_next, generates an action signal used to do an action causing a state transition from the state i_next to a next state of the state i_next on the plan in step S110 which will be described later, and tests whether or not the current state comes close to a state on the plan by doing an action in response to the action signal.

As a result, if the current state comes close to the state on the plan, the process continues.

On the other hand, if the current state does not come close to the state on the plan, thereafter, the ratio P(i_pathmax)/P(i_max) becomes equal to or less than the predetermined value, as described above, at step S112, the action signal generation unit 32 requests planning again to the planning unit 31 so as to be changed to a plan of reaching the target state, and the action signal generation process is finished.

In contrast, in step S106, when this state probability of the state lying in the next state i_next is determined to be larger than the previous state probability, that is, when the current state is estimated to come close to the next state i_next (the state lying therein), the process goes to step S107, where the action signal generation unit 32 determines whether or not a state selected as this estimation state i_pathmax is selected consecutively selected as estimation states i_pathmax by a predetermined number of times (for example, fifty times or the like).

When the state selected as this estimation state i_pathmax is determined to be consecutively selected as an estimation state i_pathmax by the predetermined number of times at step S107, that is, when, although an action is done, it is estimated that the current state i_max stops at a certain state on the plan or a state close to the state, or a state transition is repeated between the states, the process goes to step S108, where the action signal generation unit 32 selects the next state i_next (a state lying therein) as this estimation state i_pathmax again as described above, and the process goes to step S109.

In other words, when, although an action is done, it is estimated that the current state i_max stops at a certain state on the plan or a state close to the state, or a state transition is repeated between the states, the action signal generation unit 32 sets this estimation state i_pathmax to the next state i_next, accordingly generates an action signal used to do an action causing a state transition from the state i_next to a next state of the state i_next on the plan, at step S110 described later, and causes a state transition from the current state to the target state by doing an action in response to the action signal.

At step S109, the action signal generation unit 32 determines whether or not this estimation state i_pathmax is equal to the target state (the last state on the plan).

When this estimation state i_pathmax is determined not to be equal to the target state at step S109, that is, when not reaching the target state or a state close to the target state, the process goes to step S110. At step 110, the action signal generation unit 32 refers to the action generation information in the action generation information storage unit 34, and inputs the first observed value o at the current time t from the recognition unit 23 to the controller which is the function $m=F_{ij}(o)$ correlated with the state transition $A_{ij}$ from this estimation state i_pathmax to the next state i_next, thereby generating the action signal m used to do an action causing a state transition according to the plan as an action to be done next time and supplying the action signal m to the action unit 14.

The action unit 14 drives movable parts in response to the action signal m from the action signal generation unit 32, and thus the simple pendulum as the self agent does an action of rotation due to a torque τ responding to the action signal m.

If the self agent does an action, the sensor unit 11 observes the rotation angle θ as the latest first observed value from the self agent doing the action, and stores the rotation angle θ in the buffer 21.

The recognition unit 23 recognizes the first time series data constituted by the latest first observed values of T including the latest first observed value as recognition target data, the action signal generation unit 32 waits for the latest current state, the latest first observed value, and a state probability of each of the latest states to be output, and the process returns to step S102 from step S110. Thereafter, the same process is repeated from the step.

On the other hand, when this estimation state i_pathmax is determined to be equal to the target state at step S109, that is, when reaching the target state or a state close to the target state, the process goes to step S111, where the action signal generation unit 32 determines whether or not the current state i_max from the recognition unit 23 is equal to the target state.

When the current state i_max is determined not to be equal to the target state at step S111, that is, when the current state i_max exists in a state close to target state but does not exist in the target state, the process goes to step S112, where the action signal generation unit 32 requests planning again to the planning unit 31 so as to change the plan to a plan of reaching the target state from the current state i_max (or, a state close to the current state i_max), and the action signal generation process is finished.

On the other hand, when the current state i_max is determined to be equal to the target state at step S111, that is, when reaching the target state, the action signal generation process is finished.

As described above, the self agent having carried out the self learning (FIG. 12) and the action learning (FIG. 17), if the target state is given, can perform the planning a plan of reaching the target state from the current state, and do an action of reaching the target state (becoming a state such as a posture corresponding to the target state) according to the plan.

In addition, the self agent having carried out the imitation learning (FIG. 14) can observe the other agent and do an action of imitating the other agent.

Imitation Process

Figure 20:
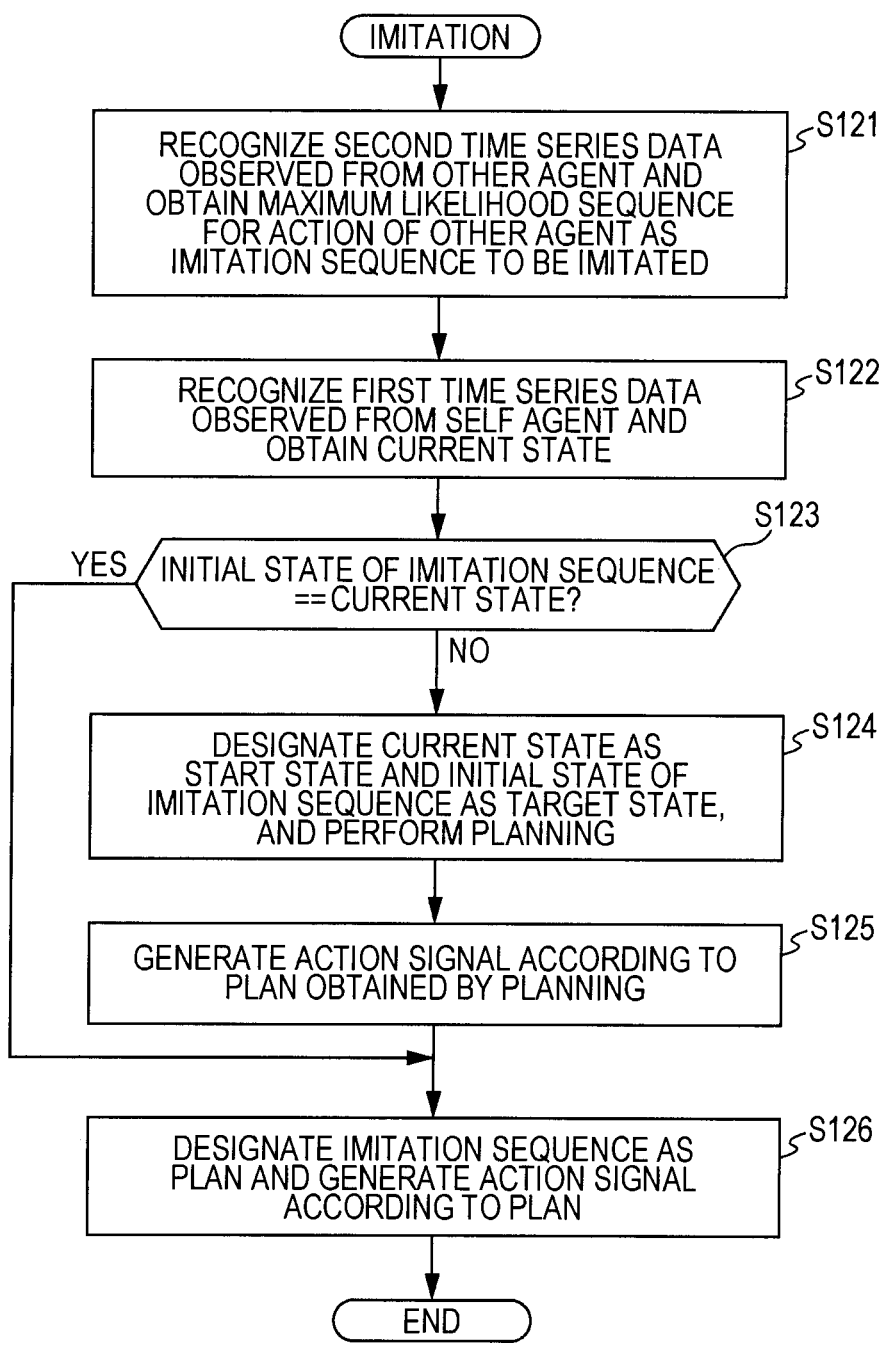
FIG. 20 is a flowchart illustrating an imitation process.

FIG. 20 is a flowchart illustrating an imitation process by which the self agent does an action of imitating the other agent.

In the imitation process, at step S121, the recognition unit 23 recognizes, as described with reference to FIG. 16, the time series of the second observed values (the second time series data) which is the image observed from the other agent, sensed (observed) by the sensor unit 11 and stored in the buffer 21, as the recognition target data, and obtains the maximum likelihood sequence which is a state sequence having the maximum likelihood where the recognition target data is observed in the multi-observation prediction model, as an imitation sequence to be imitated by the self agent.

The recognition unit 23 supplies the maximum likelihood sequence as the imitation sequence to the action signal generation unit 32, and the process goes to step S122 from step S121.

In addition, at step S121, a series of actions done by the other agent during the time period when the second time series data as the recognition target data is observed become a series of actions which are imitated by the self agent.

In other words, at step S121, the self agent imitates a series of actions done by the other agent during the time period when the second time series data as the recognition target data is observed.

Here, a series of actions of the other agent imitated by the self agent are also referred to as a teacher action.

At step S122, the recognition unit 23 recognizes, as described with reference to FIG. 16, the time series of the first observed value (the first time series data) which is the rotation angle θ sensed (observed) by the sensor unit 11, stored in the buffer 21 and observed from the self agent, as the recognition target data, and obtains a current state corresponding to a current situation (the rotation angle θ and the angular velocity ω) of the self agent as a result of the recognition.

The recognition unit 23 supplies the current state as a result of the recognition of the first time series data as the recognition target data to the action signal generation unit 32, and the process goes to step S123 from step S122.

At step S123, the action signal generation unit 32 determines whether or not the current state i_max corresponding to the current situation of the self agent from the recognition unit 23 is the same as an initial state in the imitation sequence.

When the current state is determined to be the same as the initial state in the imitation sequence at step S123, the process skips steps S124 and S125 and goes to step S126, where the action signal generation unit 32 designates the imitation sequence from the recognition unit 23 as a plan, as described with reference to FIG. 19, generates an action signal according to the plan, and finishes the imitation process.

Here, if the current state is the same as the initial state in the imitation sequence, since the rotation angle θ, the angular velocity ω and so on of the simple pendulum as the self agent are the same as those when the other agent starts the teacher action (since the self agent enters a state the same as that when the other agent starts the teacher action), the self agent does an action causing state transitions of the imitation sequence, and thereby the self agent does an actions (an action for imitating the teacher action) the same as the teacher action.

Therefore, when the current state is the same as the initial state in the imitation sequence, the action signal generation unit 32 uses the imitation sequence from the recognition unit 23 as a plan as it is, and generates an action signal.

On the other hand, when the current state is determined not to be the same as the initial state in the imitation sequence at step S123, the action signal generation unit 32 requests to the planning unit 31 a planning for obtaining a plan having the current state from the recognition unit 23 as a start state and the initial state in the imitation sequence as a target state, and the process goes to step S124.

At step S124, the planning unit 31 obtains the plan having the current state as a start state and the initial state in the imitation sequence as a target state, depending on the request from the action signal generation unit 32, as described with reference to FIG. 18.

The planning unit 31 supplies the plan to the action signal generation unit 32, and the process goes to step S125 from step S124.

At step S125, the action signal generation unit 32 generates an action signal according to the plan from the planning unit 31 as described with reference to FIG. 19.

Here, when the current state is not the same as the initial state in the imitation sequence, since the rotation angle θ and the angular velocity ω of the simple pendulum as the self agent is not the same as those when the other agent starts the teacher action, first, it is necessary to make the rotation angle θ and the angular velocity ω of the simple pendulum as the self agent the same as those when the other agent starts the teacher action (to make a state of the self agent the same as that when the other agent starts the teacher action), such that the self agent does an action the same as the teacher action.

Therefore, when the current state is not the same as the initial state in the imitation sequence, the action signal generation unit 32 generates an action signal according to the plan which has the current state as a start state and the initial state in the imitation sequence as the target state, and thereby the self agent enters a state the same as that when the other agent starts the teacher action.

Thereafter, the process goes to step S126 from step S125, where the action signal generation unit 32 designates the imitation sequence from the recognition unit 23 as the plan, generates an action signal according to the plan as described with reference to FIG. 19, and finishes the imitation process.

In other words, at step S125, the action signal generation unit 32 generates the action signal according to the plan which has the current state as a start state and the initial state in the imitation sequence as a target state, and thereby the self agent enters a state the same as that when the other agent starts the teacher action. Accordingly, thereafter, the action signal generation unit 32 designates the imitation sequence as the plan, and generates the action signal according to the plan, such that the self agent does an action (an action for imitating the teacher action) the same as the teacher action.

According to the imitation process described above, it is possible to implement that the simple pendulum as the self agent which can do an action of rotation where the rotation angle θ is set to a desired angle copies an action of rotation done by another simple pendulum as the other agent, so to speak, by visually observing (viewing) the action.

In addition, in this embodiment, although the multi-observation prediction model has employed the state transition prediction model using the HMM, the multi-observation prediction model may employ a state transition prediction model using an RNN (recurrent neural network), Bayesian network linear state space model, or the like.

For example, when the state transition prediction model using the RNN is employed as the multi-observation prediction model, context layers (a group of units (nodes) where the context is input) of the RNN correspond to internal states. In addition, a weight for the context corresponds to a transition model, and a weight for an output of each unit other than the context corresponds to an observed model.

Also, for example, when a state transition prediction model using the linear state space model (system) is employed as the multi-observation prediction model, a state vector x(t) corresponds to an internal state, a state matrix A(t) corresponds to a transition model, an output vector y(t) corresponds to an observed value, and an output matrix C(t) corresponds to an observed model.

Here, the linear state space model is expressed by the following state equation.

$$x'(t)=A(t)x(t)+B(t)u(t)\ y(t)=C(t)x(t)+D(t)u(t)$$

In the above state equation, x'(t) indicates a differential of the state vector x(t), and B(t) and D(t) indicate matrices. In addition, u(t) indicates an input vector, and the input vector u(t) may use, for example, 0 (vector).

Further, in this embodiment, although the first observed value observed from the self agent has employed the rotation angle θ and the second observed value observed from the other agent has employed the image containing the other agent, the first and second observed values are not limited thereto.

In other words, according to the imitation learning (FIG. 14), if the first and second observed values have the same dynamics (mechanisms) although different in kind, the first and second observed values different in kind can be correlated with each other (correlation of a state of the imitator himself/herself with a state of another person), and therefore the first and second observed values may employ observed values having the same dynamics and different in kind (modal).

Specifically, for example, the first observed value may employ an angle of a joint part of the self agent and the second observed value may employ information for a three-dimensional position of the joint part of the other agent.

Figure 21:
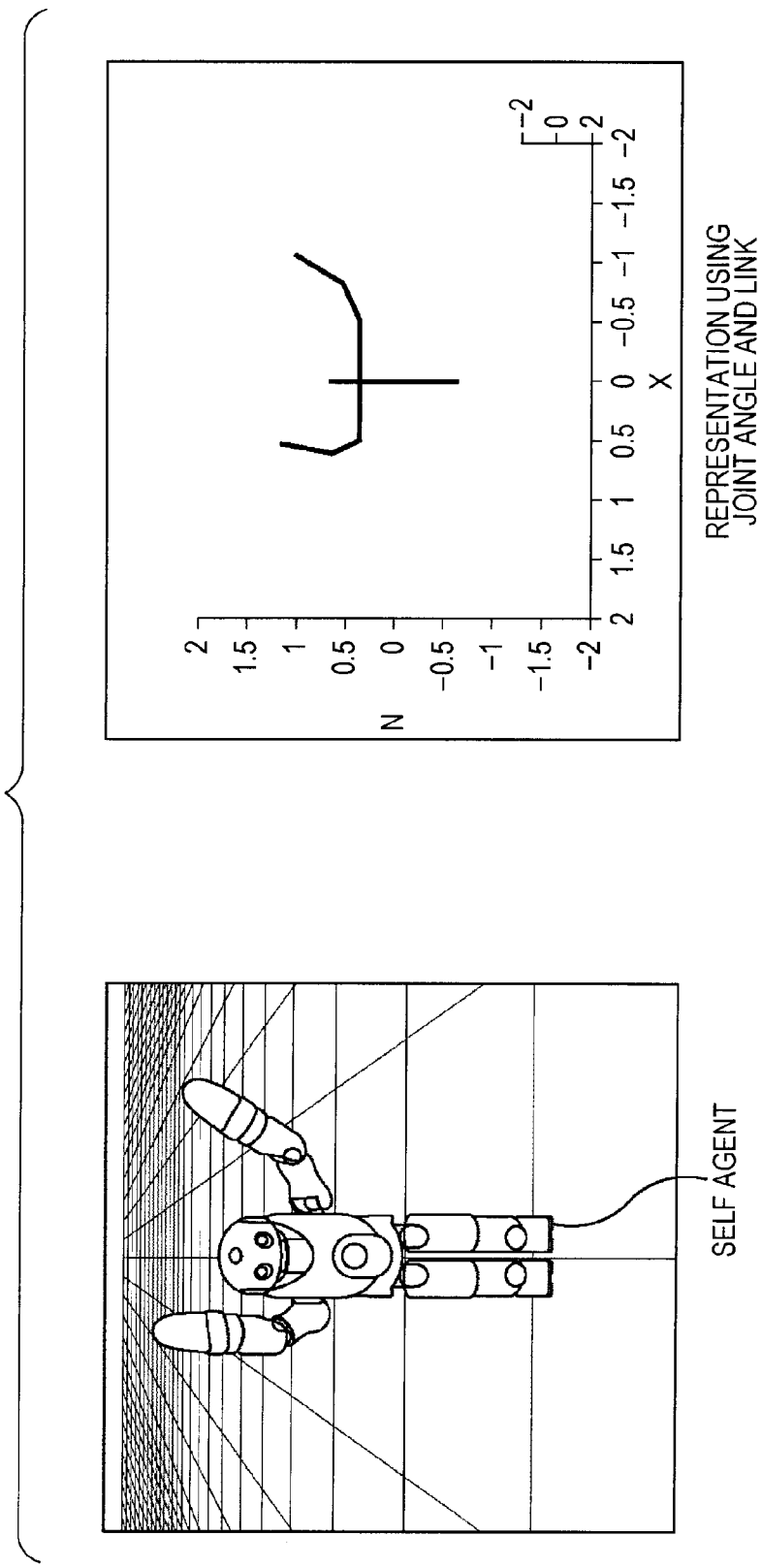
FIG. 21 is a diagram illustrating examples of a human type self agent and a first observed value observed from the human type self agent.

FIG. 21 is a diagram illustrating a human type agent as the self agent (an agent having human physical features) and an example of the first observed value observed from such a human type self agent.

In FIG. 21, angles of the joint parts may be observed from the human type self agent as the first observed values, and a time series of the first observed values may be used in the self learning (FIG. 12).

Here, in FIG. 21, the angles of the joint parts of the self agent observed as the first observed value are represented by connecting the joint parts using the straight lines.

Figure 22:
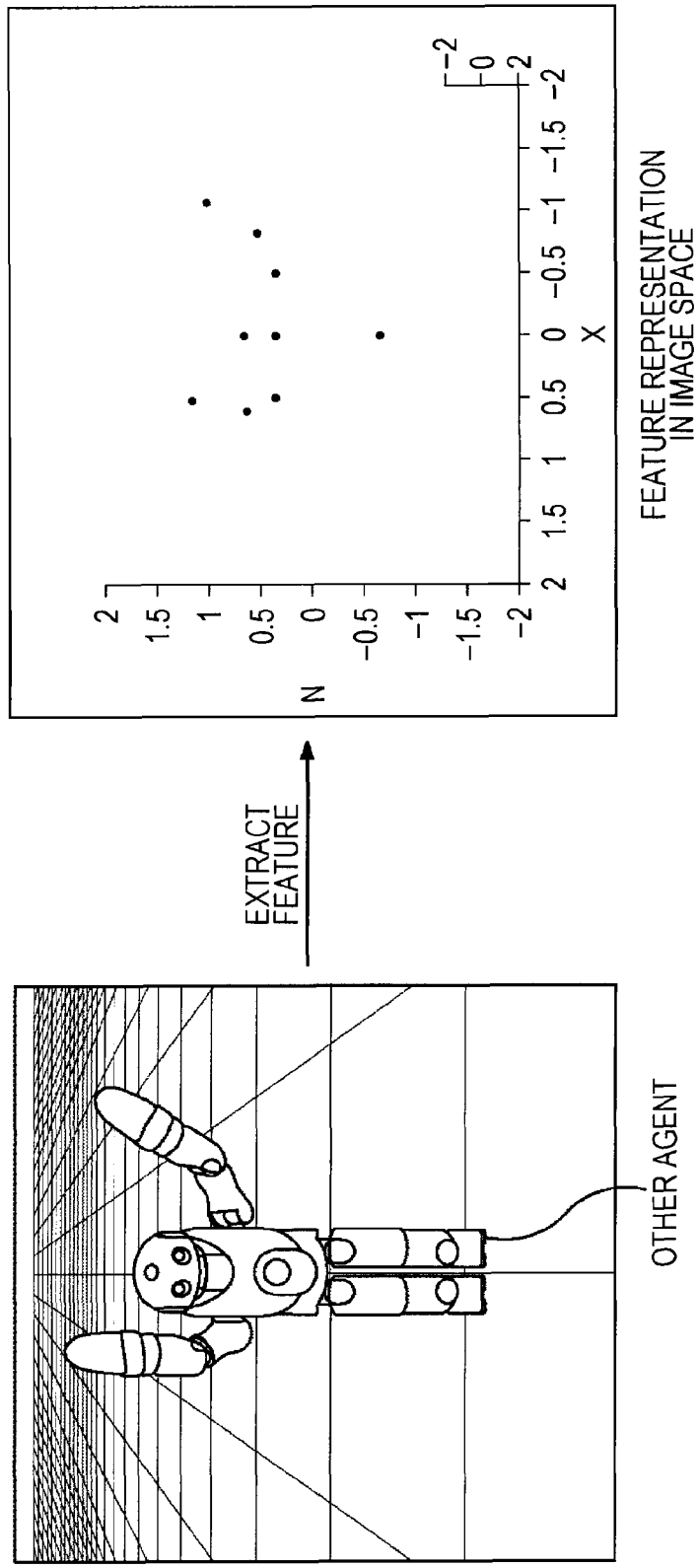
FIG. 22 is a diagram illustrating examples of a human type other agent and a second observed value observed from the human type other agent.

FIG. 22 is a diagram illustrating a human type agent as the other agent and an example of the second observed value observed from such a human type other agent.

In the same manner as the human type self agent in FIG. 21, three-dimensional coordinates of positions of the joint parts of the other agent as shown in FIG. 22 may be obtained as the second observed values by observing the human type other agent, and a time series of the coordinates may be used in the imitation learning (FIG. 14).

Here, in FIG. 22, the positions of the joint parts of the other agent are shown by being plotted on the two-dimensional plane.

The human type self agent having carried out the self learning and the imitation learning can do an action for imitating the other agent as described with reference to FIG. 20.

Here, in addition to the human type other agent in FIG. 22, the human type self agent in FIG. 21 may observe coordinates of position of joint parts from a person (for example, a person to whom luminous bodies are attached in the joint parts) lying in a state where the joint parts can be observed from the outside, as the second observed value, and carry out the imitation learning. In this case, the human type self agent observes the person and does the same action as the person.

The first and second observed values may be observed values of the same kind.

In addition, in this embodiment, although the self agent and the other agent have employed the simple pendulum capable of doing the same action, the self agent and the other agent may not be agents capable of doing the same action, that is, agents having the same physical features.

In other words, the self agent may employ, for example, a human type agent (an agent having human physical features), and the other agent may employ an elephant type agent which does motions of an animal elephant (an agent having physical features of an elephant).

In this case, when the human type self agent is made to imitate an action that the elephant type other agent swings the long nose, it is anticipated that like a case where a human being copies an elephant in the real world, the human type self agent selects its arms as a nose of an elephant, and does an action that the human being swings its arms selected as the nose of the elephant as an action for imitating the elephant type other agent.

Figure 23:
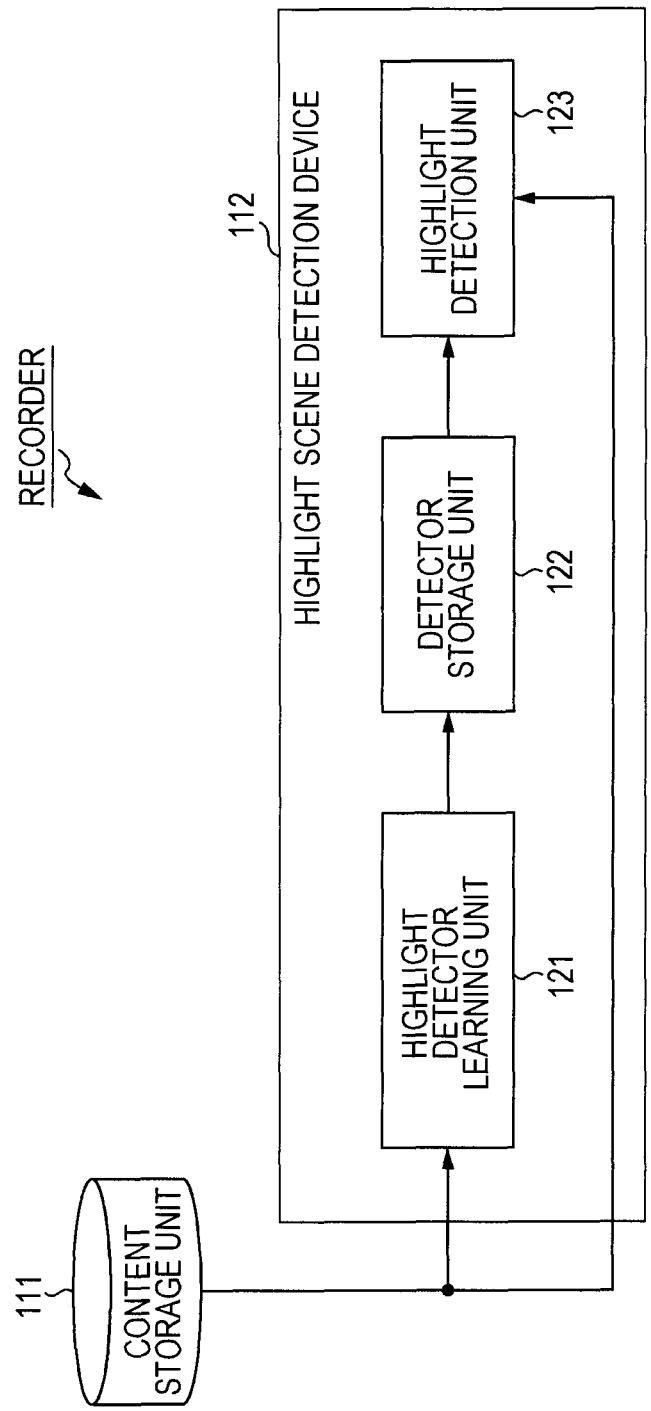
FIG. 23 is a block diagram illustrating a configuration example of a recorder according to an embodiment of the present invention.

A recorder to which an information processing device according to an embodiment of the present invention is applied FIG. 23 is a block diagram illustrating a configuration example of a recorder to which an information processing device according to an embodiment of the present invention is applied.

The recorder in FIG. 23 is, for example, a HD (hard disc) recorder or the like, which can record (store) various kinds of contents such as TV programs, contents provided through a network such as the Internet, or contents photographed by a video camera or the like.

In FIG. 23, the recorder has a content storage unit 111 and a highlight scene detection device 112.

The content storage unit 111 stores (records), for example, contents such as TV programs. The storage of contents in the content storage unit 111 means recording of the contents, and the recorded contents (contents stored in the content storage unit 111) are reproduced, for example, by an operation of a user.

The highlight scene detection device 112 detects scenes in which a user is interested as highlight scenes, from the contents stored in the content storage unit 111, and generates a digest where the highlight scenes are collected.

Here, data of contents stored in the content storage unit 111 is assumed to include data (stream) of images, speech and necessary texts (caption).

In addition, here, only image data of the content data is assumed to be used in the process by the highlight scene detection device 112.

However, in addition to the image data, speech or text data may be used in the process by the highlight scene detection device 112.

The highlight scene detection device 112 includes a highlight detector learning unit 121, a detector storage unit 122, and a highlight detection unit 123.

The highlight detector learning unit 121 learns a highlight detector which is a learning model used to detect scenes interesting a user as highlight scenes, using the contents stored in the content storage unit 111.

The highlight detector learning unit 121 supplies a highlight detector after learning to the detector storage unit 122.

Here, the learning model as the highlight detector may employ, for example, the HMM which is one of the state transition prediction models.

The detector storage unit 122 stores the highlight detector from the highlight detector learning unit 121.

The highlight detection unit 123 detects frames of the highlight scenes from the contents stored in the content storage unit 111, using the highlight detector stored in the detector storage unit 122. In addition, the highlight detection unit 123 generates digest contents which are digests of the contents stored in the content storage unit 111 by using the frames of the highlight scenes.

A Configuration Example of the Highlight Detector Learning Unit 121

Figure 24:
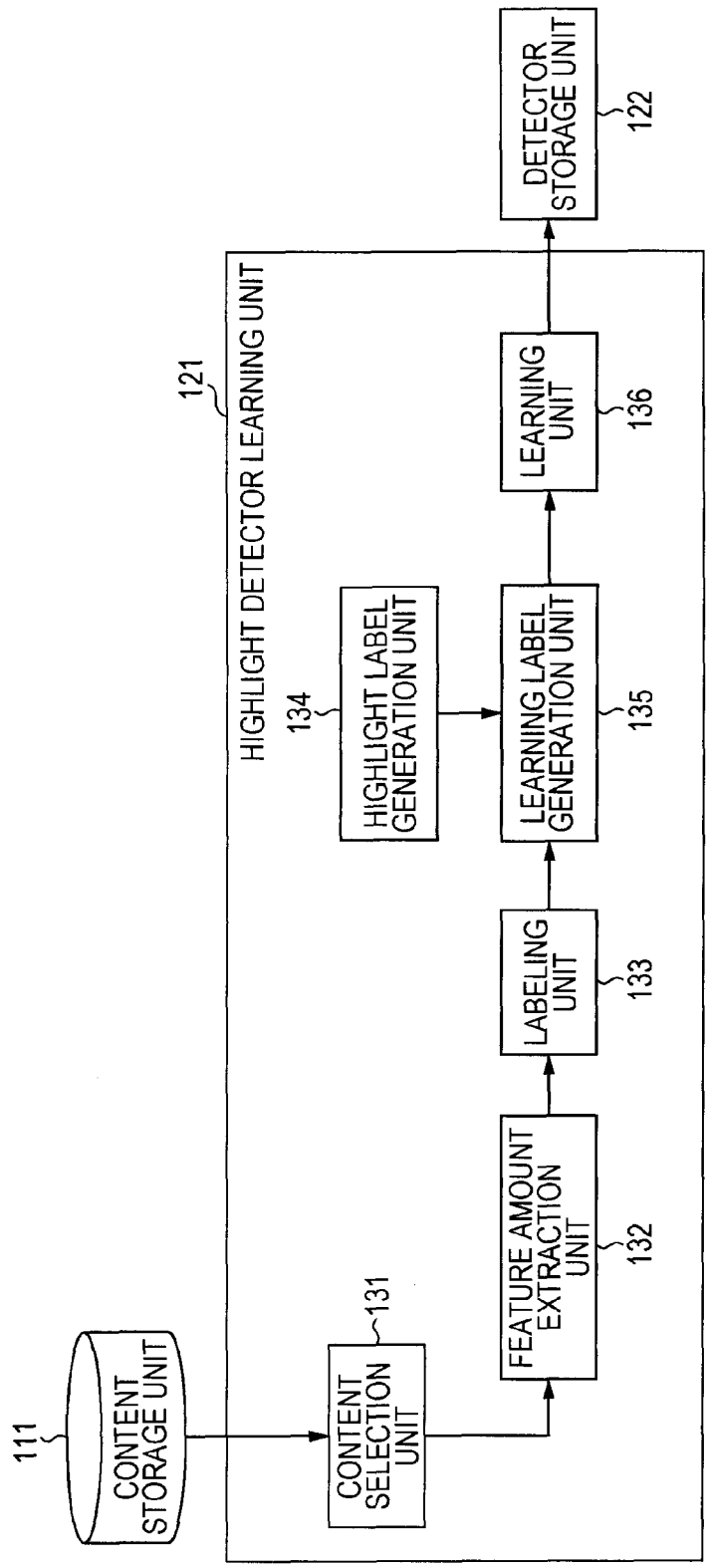
FIG. 24 is a block diagram illustrating a configuration example of the highlight detector learning unit.

FIG. 24 is a block diagram illustrating a configuration example of the highlight detector learning unit 121 in FIG. 23.

In FIG. 24, the highlight detector learning unit 121 includes a content selection unit 131, a feature amount extraction unit 132, a labeling unit 133, a highlight label generation unit 134, a learning label generation unit 135, and a learning unit 136.

The content selection unit 131 selects contents for use in learning of the highlight detector, as notable detector learning contents (hereinafter, abbreviated to "notable contents") from the contents stored in the content storage unit 111 by, for example, an operation of a user.

In other words, the content selection unit 131 selects, as the notable contents, contents (programs) designated by a user to be reproduced, for example, among recorded programs, for example, which are contents stored in the content storage unit 111, and supplies the contents to the feature amount extraction unit 132.

The feature amount extraction unit 132 extracts a feature amount of an image of each frame of the notable contents supplied from the content selection unit 131, as a feature amount of each frame, and supplies (a time series of) the feature amount of each frame of the notable contents to the labeling unit 133.

Here, for example, an image of a frame is divided into sub-regions which are a number of small regions, a feature amount of a sub-region such as GIST is obtained from each sub-region, and a vector having the feature amount of the sub-region as a component may be used as the feature amount of an image which is the feature amount of a frame.

GIST is disclosed in detail in, for example, A. Torralba, K. Murphy, W. Freeman, M. Rubin, "Context-based vision system for place and object recognition", IEEE Int. Conf. Computer Vision, vol. 1, no. 1, pp. 273-280, 2003.

The labeling unit 133 puts a label having a scalar value (a one-dimensional value) on vector values which are the feature amounts of the frames of the notable contents from the feature amount extraction unit 132, and supplies the label to the learning label generation unit 135 as a feature amount after the labeling.

Here, as a method of labeling a feature amount of a vector, there is vector quantization. The vector quantization may be carried out, for example, by extracting a feature amount of each frame from the contents stored in the content storage unit 111, obtaining a codebook through a k-means method through use of the feature amount, and using the codebook.

Here, the label for the feature amount of the frame obtained by the labeling unit 133 is also referred to as a feature label.

Here, the feature label is a code indicating a representative vector (centroid vector) registered in the codebook.

The highlight label generation unit 134 puts, by an operation of a user, a highlight label indicating highlight scenes or not on each frame of the notable contents selected by the content selection unit 131, and thereby generates a highlight label sequence for the notable contents.

In other words, the notable contents selected by the content selection unit 131 are contents designated by a user to be reproduced as described above, and images of the notable contents are displayed on a display (not shown) (along therewith, speech is output from a speaker (not shown)).

When interesting scenes are displayed on the display, the user operates a remote command (not shown) or the like to input information indicating the interesting scenes, and the highlight label generation unit 134 generates a highlight label depending on the operation of the user.

Specifically, for example, if a user's operation for inputs information indicating interesting scenes is referred to as a favorite operation, the highlight label generation unit 134 generates a highlight label having a value of, for example, "0" indicating nonexistence of interesting scenes regarding frames which do not undergo the favorite operation.

In addition, the highlight label generation unit 134 generates a highlight label having a value of, for example, "1" indicating highlight scenes regarding frames which undergoes the favorite operation.

The highlight label generation unit 134 supplies a highlight label sequence which is a time series of the highlight labels generated for the notable contents to the learning label generation unit 135.

The learning label generation unit 135 generates a learning label sequence formed by a pair of the feature label sequence of the notable contents from the labeling unit 133 and the highlight label sequence from the highlight label generation unit 134.

In other words, the learning label generation unit 135 generates a multi-stream learning label sequence formed by a pair of a feature label at each time t (a feature label obtained by labeling a feature amount of a frame t) and a highlight label (a highlight label for the frame t) (which is also referred to as "a sample at the time t") in the feature label sequence from the labeling unit 133 and the highlight label sequence from the highlight label generation unit 134.

The learning label generation unit 135 supplies the learning label sequence to the learning unit 136.

The learning unit 136 learns a highlight detector which is, for example, an ergodic type multi-stream HMM, according to the Baum-Welch re-estimation method by using the learning label sequence from the learning label generation unit 135.

The learning unit 136 supplies the highlight detector after the learning to the detector storage unit 122 for storage.

In the multi-stream HMM, it is possible to set, to each sequence (stream) constituting the multi-stream (hereinafter, also referred to as "a constituent element sequence"), a weight of a degree that the constituent element sequence has influence on the multi-stream HMM (hereinafter, also referred to as "a sequence weight").

During the learning of the multi-stream HMM or the recognition using the multi-stream HMM (when obtaining the maximum likelihood sequence), a large sequence weight is set to a constituent element sequence regarded to be important, and thereby it is possible to provide a previous knowledge such that a result of learning of the multi-stream HMM does not lead to a local solution.

Further, details of the multi-stream HMM are disclosed in, for example, Tetsuji Tamura, Koji Iwano, Sadaoki Furui, "Consideration of Multi-modal Speech Recognition Using Optical Flow," Acoustical Society of Japan, 2001, autumn lecture collected papers, 1-1-14, pp. 27-28 (2001-10), etc.

In the above paper, an example of using the multi-stream HMM is introduced in the field of the audio-visual speech recognition. If an SN ratio (signal to noise ratio) of speech is low, a sequence weight for a feature amount sequence of the speech is lowered so as to increase influence of images more than the speech, and the learning and the recognition are carried out.

The multi-stream HMM is different from an HMM using a single sequence in that, as shown in equation (11), observation likelihoods $b_j(o_{[1]}, o_{[2]}, \ldots o_{[M]})$ of the overall multi-stream are calculated in consideration of a preset sequence weight $W_m$, along with an observation likelihood (an output probability distribution) $b_{[m]j}(o_{[m]})$ of each constituent element sequence (a sample (observed value)) $o_{[m]}$ constituting the multi-stream.

$$b_j(o_{[1]}, o_{[2]}, \ldots , o_{[M]}) = \prod_{m=1}^{M} b_{[m]j}(o_{[m]})^{W_m}, \quad (11)$$

where $$W_m \geq 0, \sum_{m=1}^{M} W_m = 1$$

Here, in equation (11), M indicates the number of the constituent element sequences $o_{[m]}$ (the number of streams) constituting the multi-stream, and the sequence weight $W_m$ indicates a sequence weight for an m-th constituent element sequence $o_{[m]}$ of the M constituent element sequences constituting the multi-stream.

The learning label sequence which is a multi-stream used in the learning by the learning unit 136 in FIG. 24 is constituted by two constituent element sequences, the feature label sequence $o_{[V]}(=o_{[1]})$ and the highlight label sequence $o_{[HL]}(=o_{[2]})$.

In this case, the observation likelihood $b_j(o_{[V]}, o_{[HL]})$ of the learning label sequence is expressed by equation (12).

$$b_j(o_{[V]}, o_{[HL]}) = (b_{[V]j}(o_{[V]}))^W \times (b_{[HL]j}(o_{[HL]}))^{1-W} \quad (12)$$

Here, in equation (12), $b_{[V]j}(o_{[V]})$ indicates an observation likelihood (an observation likelihood where an observed value $o_{[V]}$ is observed from a state $S_j$) of a feature label sequence (a feature label thereof) $o_{[V]}$, and $b_{[HL]j}(o_{[HL]})$ indicates an observation likelihood of the highlight label sequence (a highlight label thereof) $o_{[HL]}$. In addition, W indicates a sequence weight for the feature label sequence $o_{[V]}$, and 1−W indicates a sequence weight for the highlight label sequence $o_{[HL]}$.

In the learning of the multi-stream HMM as the highlight detector, the sequence weight W may use, for example, 0.5.

In the highlight detector learning unit 121 configured as described above, the content selection unit 131 selects, for example, contents designated by an operation of a user to be reproduced, from the contents stored in the content storage unit 111, as the notable contents (the notable detector learning contents), and supplies the contents to the feature amount extraction unit 132.

The feature amount extraction unit 132 extracts a feature amount of each frame from the notable contents supplied from the content selection unit 131, and supplies the feature amount to the labeling unit 133.

The labeling unit 133 labels the feature amounts of the notable contents from the feature amount extraction unit 132, and supplies a feature label sequence which is a feature amount after the labeling to the learning label generation unit 135.

In addition, the highlight label generation unit 134 puts the highlight label on each frame of the notable contents selected by the content selection unit 131 by an operation of a user, and thereby generates a highlight label sequence for the notable contents.

The highlight label generation unit 134 supplies the highlight label sequence generated for the notable contents to the learning label generation unit 135.

The learning label generation unit 135 generates a multi-stream learning label sequence formed by the feature label sequence of the notable contents from the labeling unit 133 and the highlight label sequence from the highlight label generation unit 134, and supplies the multi-stream learning label to the learning unit 136.

The learning unit 136 learns the highlight detector which is the multi-stream HMM by using the learning label sequence from the learning label generation unit 135, and supplies the highlight detector after the learning to the detector storage unit 122 for storage.

As described above, the highlight detector can be obtained by learning the multi-stream HMM, using the multi-stream learning label sequence formed by the feature label sequence obtained by labeling the feature amounts of the notable contents and the highlight label sequence generated depending on the operation of the user.

Therefore, by referring to the observation likelihood $b_{[HL]j}(o_{[HL]})$ of the highlight label $o_{[HL]}$ for each state in the highlight detector, it is possible to determine whether or not a frame having a feature label observed (high probability) in the state is a scene (highlight scene) interesting a user.

A Configuration Example of the Highlight Detection Unit 123

Figure 25:
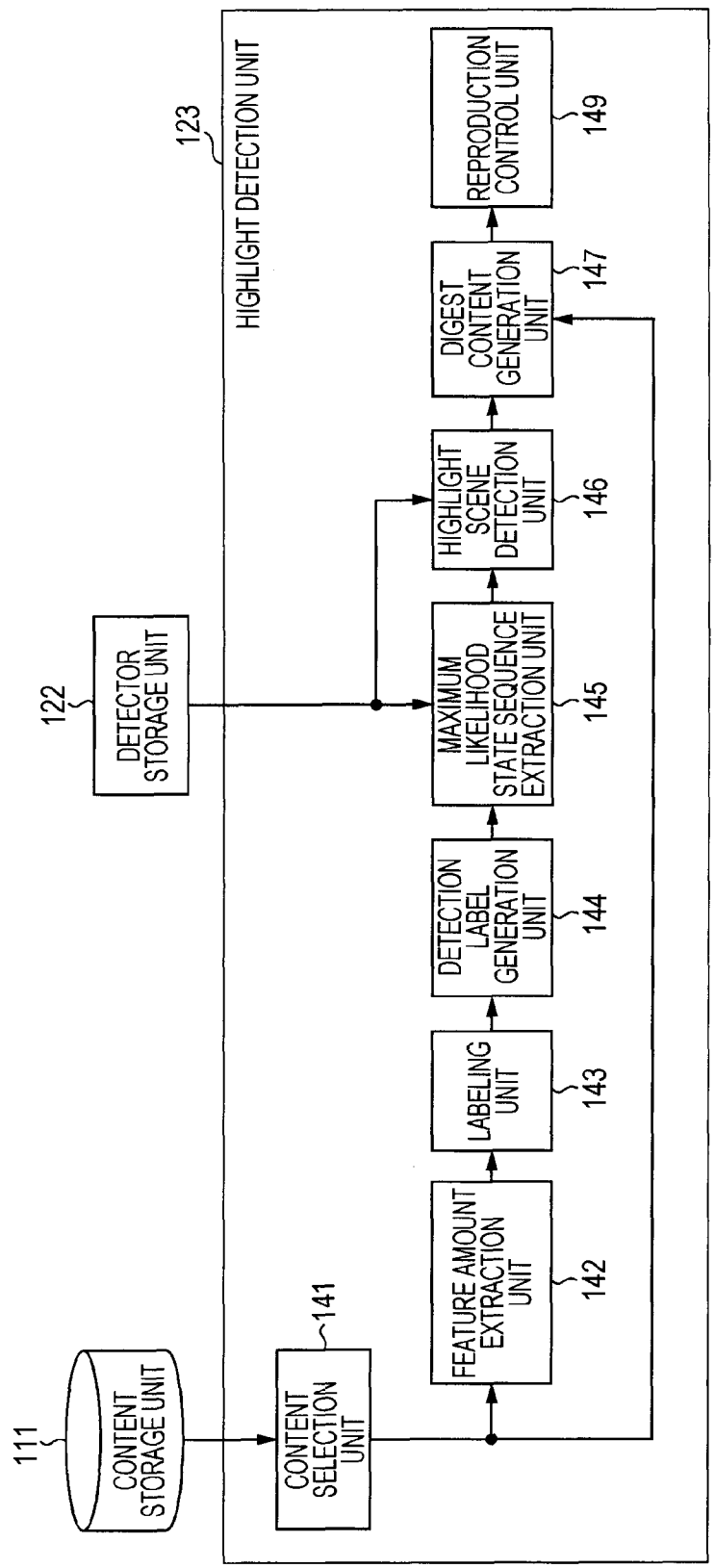
FIG. 25 is a block diagram illustrating a configuration example of the highlight detection unit.

FIG. 25 is a block diagram illustrating a configuration example of the highlight detection unit 123 in FIG. 23.

In FIG. 25, the highlight detection unit 123 includes a content selection unit 141, a feature amount extraction unit 142, a labeling unit 143, a detection label generation unit 144, a maximum state sequence estimation unit 145, a highlight scene detection unit 146, a digest content generation unit 147, and a reproduction control unit 148.

The content selection unit 141 selects notable highlight detection contents (hereinafter, abbreviated to "notable contents") which are contents used to detect highlight scenes from the contents stored in the content storage unit 111, for example, by an operation of a user, and supplies the contents to the feature amount extraction unit 142 and the digest content generation unit 147.

Here, the content selection unit 141 selects contents, for example, used to generate digest and designated by a user, as the notable contents. Alternatively, the content selection unit 141 selects, for example, an arbitrary single content among contents which do not generate digest yet, as the notable content.

The feature amount extraction unit 142 extracts a feature amount of each frame of the notable contents supplied from the content selection unit 141 in the same manner as the feature amount extraction unit 132 in FIG. 24, and supplies the feature amount to the labeling unit 143.

The labeling unit 143 labels the feature amounts (a time series thereof) of the notable contents from the feature amount extraction unit 142 in the same manner as the labeling unit 133 in FIG. 24, and supplies a feature label sequence which is a sequence of the feature amounts after the labeling, to the detection label generation unit 144.

The detection label generation unit 144 generates a detection label sequence formed by a pair of the feature label sequence of (the feature amounts) of the notable contents from the labeling unit 143 and a highlight label sequence including only highlight labels indicating things which are not highlight scenes (or things which are highlight scenes).

In other words, the detection label generation unit 144 gives a highlight label sequence formed by only the highlight labels indicating things which are not highlight scenes and a highlight label sequence having the same length as the feature label sequence from the labeling unit 143, to the highlight detector, so to speak, generates a highlight label sequence as a dummy sequence.

In addition, the detection label generation unit 144 generates multi-stream detection label sequences by forming a pair of a feature label at the time t (a feature amount of a feature label of a frame t) in the feature label sequence from the labeling unit 143 and a highlight label at the time t (a highlight label for the frame t (here, the highlight label indicating a thing which is not a highlight scene)) in the highlight label sequence which is the dummy sequence.

The detection label generation unit 144 supplies the detection label sequences to the maximum state sequence estimation unit 145.

The maximum state sequence estimation unit 145 estimates the maximum likelihood sequence (maximum state sequence) (hereinafter, also referred to as "a highlight relation state sequence") which shows a state transition having the highest likelihood where the detection label sequences from the detection label generation unit 144 are observed in the highlight detector which is the multi-stream HMM (after learning) stored in the detector storage unit 122, based on, for example, the Viterbi algorithm, and supplies the maximum likelihood sequence to the highlight scene detection unit 146.

The detection label sequences are multiple streams having the feature label sequence $o_{[V]}$ of the notable contents and the highlight label sequence $o_{[HL]}$ which is the dummy sequence as a constituent element sequence, and, when the highlight relation state sequence is estimated, the observation likelihood $b_j(o_{[V]}, o_{[HL]})$ of the detection label sequences is obtained based on equation (12) in the same manner as the case of the learning label sequence.

However, when the observation likelihood $b_j(o_{[V]}, o_{[HL]})$ of the detection label sequences is obtained, the sequence weight W of the feature label sequence $o_{[V]}$ uses 1.0. In this case, the sequence weight 1−W of the highlight label sequence $o_{[HL]}$ becomes 0.0. Accordingly, the maximum state sequence estimation unit 145 estimates the highlight relation state sequence only in consideration of the feature label sequence of the notable contents without consideration of the highlight label sequence input as the dummy sequence.

The highlight scene detection unit 146 recognizes the observation likelihood $b_{[HL]j}(o_{[HL]})$ of the highlight label $o_{[HL]}$ of each state in the maximum likelihood sequence (the highlight relation state sequence) obtained from the detection label sequences supplied from the maximum state sequence estimation unit 145, by referring to the highlight detector (which is also used to obtain the highlight relation state sequence) stored in the detector storage unit 122.

The highlight scene detection unit 146 detects frames of the highlight scenes from the notable contents based on the observation likelihood $b_{[HL]j}(o_{[HL]})$ of the highlight label $o_{[HL]}$.

In other words, the highlight scene detection unit 146 detects a frame t of the notable contents corresponding to a state $S_j$ at the time t as a frame of a highlight scene, when a difference $b_{[HL]j}(o_{[HL]}="1")-b_{[HL]j}(o_{[HL]}="0")$ between an observation likelihood $b_{[HL]j}(o_{[HL]}="1")$ of a highlight label indicating a thing which is a highlight scene and an observation likelihood $b_{[HL]j}(o_{[HL]}="0")$ of a highlight label indicating a thing which is not a highlight scene is greater than a predetermined threshold value THb (for example, THb=0 or the like), in the state $S_j$ at the time t in the highlight relation state sequence.

The highlight scene detection unit 146 sets a value indicating a thing which is a highlight scene, for example, "1" to a one-bit highlight flag indicating whether or not the frame is a frame of a highlight scene, regarding the frames of highlight scenes of the notable contents. In addition, the highlight scene detection unit 146 sets a value indicating a thing which is not a highlight scene, for example, "0" to the highlight flag, regarding the frames of the scenes which are not highlight scenes, of the notable contents.

The highlight scene detection unit 146 supplies (a time series of) the highlight flags of the respective frames of the notable contents to the digest content generation unit 147.

The digest content generation unit 147 extracts the frames of the highlight scenes specified by the highlight flags from the highlight scene detection unit 146, from the frames of the notable contents supplied from the content selection unit 141.

In addition, the digest content generation unit 147 arranges the frames of the highlight scenes extracted from the frames of the notable contents, for example, in a time series, thereby generating digest contents as a digest of the notable contents, and supplies the digest contents to the reproduction control unit 148.

The reproduction control unit 148 controls the reproduction of the digest contents from the digest content generation unit 147.

In the highlight detection unit 123 configured as described above, the content selection unit 141 selects the notable contents (notable highlight detection contents) used to detect the highlight scenes from the contents stored in the content storage unit 111, and supplies the contents to the feature amount extraction unit 142 and the digest content generation unit 147.

The feature amount extraction unit 142 extracts a feature amount of each frame of the notable contents supplied from the content selection unit 141, and supplies the feature amount to the labeling unit 143.

The labeling unit 143 labels (a time series) of the feature amounts of the notable contents from the feature amount extraction unit 142, and supplies the feature label sequence obtained as a result thereof to the detection label generation unit 144.

The detection label generation unit 144 generates the highlight label sequence formed only by the highlight labels (of which values are "0") indicating things which are not highlight scenes as a dummy highlight label sequence. In addition, the detection label generation unit 144 generates the detection label sequence formed by a pair of the feature label sequence of the notable contents from the labeling unit 143 and the dummy highlight label sequence and supplies the maximum likelihood sequence to the maximum state sequence estimation unit 145.

The maximum state sequence estimation unit 145 estimates the highlight relation state sequence as the maximum likelihood sequence which shows a state transition having the highest likelihood where the detection label sequences from the detection label generation unit 144 are observed in the highlight detector stored in the detector storage unit 122, and supplies the maximum likelihood sequence to the highlight scene detection unit 146.

The highlight scene detection unit 146 detects the frames of the highlight scenes from the notable contents as described above, based on the observation likelihood of the highlight labels for states forming the highlight relation state sequence from the maximum state sequence estimation unit 145, of states in the multi-stream HMM which is the highlight detector stored in the detector storage unit 122, and supplies highlight flags specifying the frames to the digest content generation unit 147.

The digest content generation unit 147 extracts the frames of the highlight scenes specified by the highlight flags output from the highlight scene detection unit 146, from the frames of the notable contents supplied from the content selection unit 141.

In addition, the digest content generation unit 147 generates the digest contents of the notable contents by using the frames of the highlight scenes extracted from the frames of the notable contents, and supplies the contents to the reproduction control unit 148.

The reproduction control unit 148 controls the reproduction of the digest contents from the digest content generation unit 147.

As described above, the highlight detection unit 123 (FIG. 25) estimates the highlight relation state sequence which is the maximum likelihood sequence in the case where the detection label sequences formed by a pair of the feature label sequence of the notable contents and the dummy highlight label sequence are observed in the highlight detector, detects the frames of the highlight scenes from the notable contents based on the observation likelihood of the highlight label for each state in the highlight relation state sequence, and generates the digest contents by using the frames of the highlight scenes.

The highlight detector can be obtained by learning the multi-stream HMM, using the learning label sequences formed by a pair of the feature label sequence obtained by labeling the feature amounts of the contents and the highlight label sequence generated depending on the operation of the user.

Therefore, even when the notable contents generating the digest contents are not used to learn the highlight detector, if the highlight detector is learned using contents having the same structure as the notable contents, it is possible to easily obtain a digest (digest contents) where scenes interesting a user are collected as highlight scenes by using the highlight detector.

Figure 26:
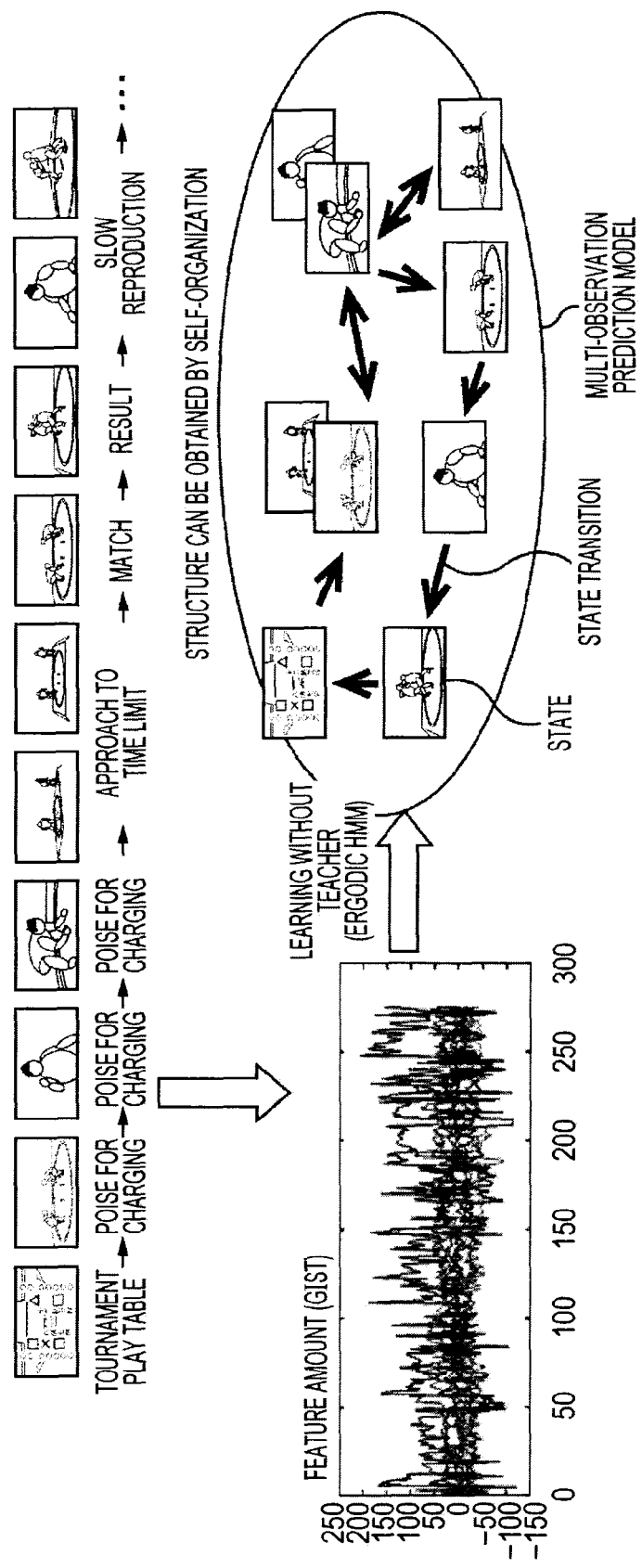
FIG. 26 is a diagram illustrating a process in the highlight detector learning unit.

FIG. 26 is a diagram illustrating the learning of the highlight detector by the highlight detector learning unit 121 in FIG. 24.

In the learning of the highlight detector, since the learning label sequence used in the learning includes the feature label sequence of the feature amounts extracted from contents, a structure of contents (for example, a configuration of a program, or a structure formed by a camerawork or the like) hidden in the learning contents used to learn the highlight detector is obtained by self-organization.

Here, when the learning content is, for example, a program relaying sumo wrestling one day, the program substantially has a basic flow, such as, a scene displaying a tournament play table, a scene displaying poise for charging, a scene displaying approach to time limit, a scene displaying match, a scene displaying a result of the match, and a scene slowly reproducing the match, and the program relaying sumo wrestling progresses by the repetition of the basic flow.

The basic flow of the above program becomes a structure of contents.

Each of the scene displaying a tournament play table, the scene displaying poise for charging, the scene displaying approach to time limit, the scene displaying match, the scene displaying a result of the match, and the scene slowly reproducing the match, constituting the basic flow of the program, may be referred to as an element in the structure of the contents.

In addition, for example, the progress from the scene displaying a tournament play table or the like to the scene displaying poise for charging or the like may be referred to as a temporal transition between the elements in the structure of the contents.

In the learning of the highlight detector, each state in the multi-stream HMM as the highlight detector represents an element in the structure of the learning contents, and a state transition represents a temporal transition between the elements in the structure of the learning contents.

In other words, in the multi-stream HMM as the highlight detector, the states in the multi-stream HMM arrange and represent a group of frames spatially close to each other and temporally similar to each other, that is, "similar scenes" in a feature amount space (a space of the feature amounts extracted by the feature amount extraction unit 132 (FIG. 24)).

In addition, in the learning of the highlight detector, since the learning label sequence used in the learning includes the highlight label sequence according to the favorite operation by a user, a degree that a user is interested in the "similar scenes" represented by the state, that is, a degree of the highlight scenes to a user is obtained in a form of the observation likelihood of the highlight label in the highlight detector.

As a result, even when the notable contents generating the digest contents are not used to learn the highlight detector (even when not the learning contents), if the highlight detector is learned using contents having the same structure as the notable contents, it is possible to easily obtain a digest (digest contents) where scenes interesting a user are collected as highlight scenes by using the highlight detector.

Here, as the contents having the same structure, for example, there are contents belonging to the same category.

The contents belonging to the same category mean, for example, programs having the same type, consecutive programs, programs (programs having the same title) broadcast periodically such as every week, every day, and others, or the like.

The type may have a large sorting such as, for example, a sport program, a news program, or the like; however, it preferably has a detailed sorting such as, for example, a soccer match program, a baseball match program, or the like.

For example, in the case of a soccer match program, contents may be sorted so as to belong to different categories for each channel (broadcast station).

In addition, in the above case, although the learning of the highlight detector in the highlight detector learning unit 121 and the estimation of the maximum likelihood sequence (the highlight relation state sequence) in the highlight detection unit 123 employ the feature label (the feature amount after the labeling) where the feature amount of images of frames of contents, the learning of the highlight detector and the estimation of the highlight relation state sequence may use a feature amount of images of frames of contents (vector itself which is not labeled).

In addition, in the above case, the feature amount of frames employs only the feature amount of images of frames, and the multiple streams having the two sequences, the sequence of the feature amounts (the feature label where the feature amounts are labeled) and the highlight label sequence as a constituent element sequence are used in the learning of the highlight detector and the estimation of the highlight relation state sequence; however, in addition to the feature amount of images of frames, the feature amount of the frames may also use a feature amount of speech including the frames during a predetermined time period, for example, an MFCC (Mel Frequency Cepstral Coefficient).

In this case, in the learning of the highlight detector and the estimation of the highlight relation state sequence, the feature amount of frames may use multiple streams having three sequences, a sequence of feature amounts of images, a sequence of feature amounts of speech, and the highlight label sequence, as a constituent element sequence.

In addition, in the above case, although the highlight detector employs the multi-stream HMM itself, the highlight detector may employ others, for example, a state transition prediction model using the multi-stream HMM as the multi-observation prediction model.

Here, the state transition prediction model using the multi-stream HMM as the multi-observation prediction model is configured in the same manner as the state transition prediction model using the above-described HMM (which is not a multi-stream) as the multi-observation prediction model, except that the observation likelihood of the (overall) multi-stream is obtained by using an observation likelihood of each constituent element sequence constituting the multi-stream as shown in equation (11) or (12).

Figure 27:
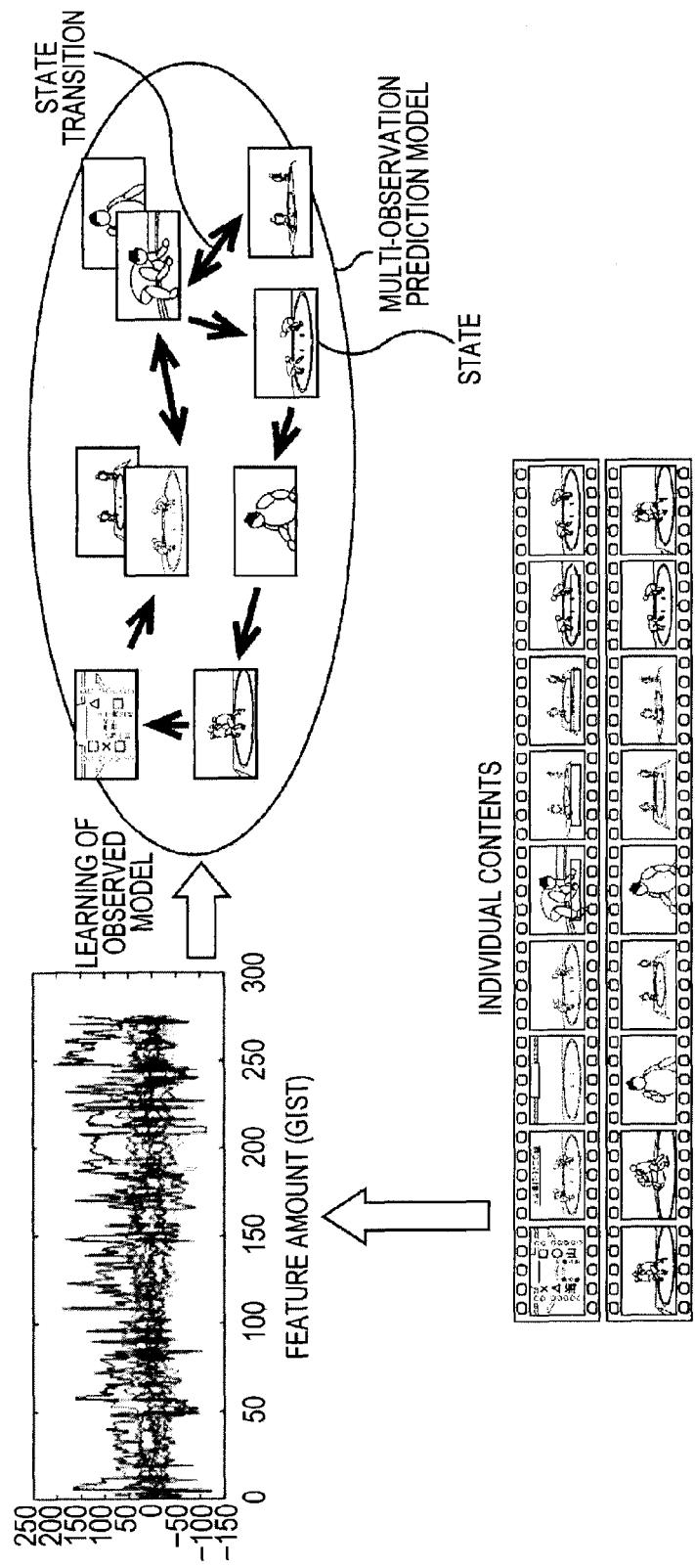
FIG. 27 is a diagram illustrating a process in the highlight detector learning unit.

FIG. 27 is a diagram illustrating the learning of the highlight detector and the estimation of the highlight relation state sequence when the multi-observation prediction model is used as the highlight detector.

The highlight detector learning unit 121 in the highlight scene detection device 112 (FIG. 23) carries out the learning of the multi-observation prediction model as the highlight detector by using, for example, a program relaying sumo wrestling one day (hereinafter, also referred to as a first program), as learning contents.

In other words, the highlight detector learning unit 121 learns the multi-observation prediction model as the highlight detector, by using a multi-stream (hereinafter, also referred to as a multi-stream of the first program) constituted by a sequence of feature amounts (feature amount label thereof) of frames extracted from the first program as the learning contents and the highlight label sequence generated according to a favorite operation of a user, as the first time series data.

By the learning using the first time series data, the initial state probability and the transition probability of the multi-observation prediction model, and the first observation likelihood (the observation model #1 (FIG. 6)) which is an observation likelihood $b_j(o)$ of the first time series data (the first observed value which is a sample thereof), are obtained.

In addition, for example, when the digest contents are generated using a program relaying sumo wrestling another day (hereinafter, also referred to as a second program) as a target content used to generate the digest contents, the highlight detection unit 123 (FIG. 25) in the highlight scene detection device 112 obtains an observation likelihood (a state probability of the last state in the maximum likelihood sequence) where the first time series data is observed and the highlight relation state sequence which is the maximum likelihood sequence in the multi-observation prediction model as the highlight detector, based on the initial state probability, the transition probability, and the first observation likelihood, by using a multi-stream (hereinafter, also referred to as a multi-stream of the second program) constituted by a sequence of feature amounts (feature labels thereof) of frames extracted from the second program as the target content and the dummy highlight label sequence, as the first time series data.

When the observation likelihood where the multi-stream of the second program used as the first time series data is equal to or more than a predetermined threshold value, the highlight detection unit 123 detects frames of highlight scenes from the second program as the target content, as described with reference to FIG. 25, based on the observation likelihood (the observation likelihood of the highlight label also used to obtain the first observation likelihood) of the highlight label in the first observation likelihood of each state in the highlight relation state sequence which is the maximum likelihood sequence where the multi-stream of the second program used as the first time series data is observed in the multi-observation prediction model as the highlight detector. In addition, the highlight detection unit 123 generates digest contents by using the frames of the highlight scenes.

On the other hand, when the observation likelihood where the multi-stream of the second program used as the first time series data is not equal to or more than the predetermined threshold value, the highlight detector learning unit 121 in the highlight scene detection device 112 learns the multi-observation prediction model as the highlight detector by using the multi-stream of the second program as the second time series data.

Here, in this case, the first and second programs are contents belonging to the same type, the sumo wrestling, and a structure of the contents, that is, scenes included in the contents and temporal transitions (progresses) of the scenes are the same in the first and second programs.

However, even in the first and second programs having the same structure of the contents, images contained in frames are not the same, and thus there is a case where a feature amount greatly different in a probability distribution is extracted from frames of the same scenes such as, for example, frames forming the match scenes, in the first and second programs.

In other words, there is a case where, for the first observation likelihood of a certain state in the multi-observation prediction model as the highlight detector, a probability is distributed such that a feature amount of frames forming the match scenes of the first program is easy to observe, but a feature amount of frames forming the match scenes of the second program is difficult to observe.

In this case, in the multi-observation prediction model as the highlight detector, the likelihood where the multi-stream of the second program used as the first time series data is observed is lowered.

Therefore, in the multi-observation prediction model as the highlight detector, when the likelihood where the multi-stream of the second program used as the first time series data is observed is not equal to or more than a predetermined threshold value, the highlight detector learning unit 121 in the highlight scene detection device 112 uses the multi-stream of the second program not as the first time series data but as the second time series data, and learns the multi-observation prediction model as the highlight detector.

In the learning of the multi-observation prediction model as the highlight detector using the multi-stream of the second program as the second time series data, the highlight detector learning unit 121 obtains the second observation likelihood (the observation model #2 (FIG. 6)) which is the observation likelihood of the second time series data (the second observed value which is a sample thereof) by using the multi-stream of the second program as the second time series data and fixing the initial state probability and the transition probability of the multi-observation prediction model as the highlight detector after the learning using the multi-stream of the first program as the first time series data.

In the learning of the multi-observation prediction model as the highlight detector using the multi-stream of the second program as the second time series data, the sequence weight 1−W (equation 12) of the dummy highlight label sequence constituting the multi-stream of the second program is set to 0.

In addition, in the learning of the multi-observation prediction model as the highlight detector using the multi-stream of the second program as the second time series data, the observation likelihood of the highlight label sequence employs the observation likelihood of the highlight label sequence in the first observation likelihood which is obtained from the learning of the multi-observation prediction model as the highlight detector using the multi-stream of the first program as the first time series data.

Therefore, the observation likelihood of the highlight label sequence in the second observation likelihood after the learning of the multi-observation prediction model as the highlight detector using the multi-stream of the second program as the second time series data is the same as the observation likelihood of the highlight label sequence in the first observation likelihood.

If the learning of multi-observation prediction model as the highlight detector using the multi-stream of the second program as the second time series data is finished, the highlight detection unit 123 (FIG. 25) in the highlight scene detection device 112 obtains the highlight relation state sequence which is the maximum likelihood sequence where the second time series data is observed in the multi-observation prediction model as the highlight detector, based on the initial state probability, the transition probability, and the second observation likelihood, by using the multi-stream of the second program as the second time series data.

In addition, the highlight detection unit 123 detects the frames of the highlight scenes from the second program, as described with reference to FIG. 25, based on the observation likelihood of the highlight label sequence in the first observation likelihood (or the second observation likelihood) of each state in the highlight relation state sequence which is the maximum likelihood sequence where the multi-stream of the second program used as the second time series data is observed in the multi-observation prediction model as the highlight detector, and generates the digest contents by using the frames of the highlight scenes.

When the likelihood where the multi-stream of the second program used as the first time series data is observed in the multi-observation prediction model as the highlight detector is not equal to or more than a predetermined threshold value, the highlight scene detection device 112 (FIG. 23) obtains the second observation likelihood of the second time series data by using the multi-stream of the second program as the second time series data and fixing the initial state probability and the transition probability, and obtains the highlight relation state sequence which is the maximum likelihood sequence where the multi-stream of the second program is observed, by using the second observation likelihood. Thus, since the frames of the highlight scenes are detected from the second program based on the highlight relation state sequence, it is possible to accurately detect frames of the scenes the same as the scenes of the frames of the first program, for which a user performs the favorite operation, from the second program, as frames of the highlight scenes.

As described above, the first and second observed values (time series data) observed in the multi-observation prediction model may be observed values which are the same in kind such as the feature amount of images (the feature amount extracted from the images).

In addition, when the state transition prediction model using the multi-stream HMM is used as the multi-observation prediction model, it is possible to obtain a correspondence relationship between programs having the same structure of contents, for example, a TV program (TV broadcast program) and a radio program which relay a baseball game.

In other words, for example, feature amounts of images and speech are extracted from the TV program relaying the baseball game, a multi-stream of the feature amount sequence of the images and the speech is used as the first time series data, and the multi-observation prediction model is learned, thereby obtaining the initial state probability, the transition probability, and the first observation likelihood. Further, feature amounts of speech are extracted from the radio program relaying the baseball game, and the multi-observation prediction model is learned by using the feature amount sequence of the speech as the second time series data and fixing the initial state probability and the transition probability, thereby obtaining the second observation likelihood, such that, from the first and second observation likelihoods of each state in the multi-observation prediction model, the correspondence relationship indicating a correspondence between the images and the speech (the feature amounts thereof) of the TV program and the speech (the feature amounts thereof) of the radio program, which are easily observed from the state, can be obtained.

Explanation of a Computer According to an Embodiment of the Present Invention

The above-described series of processes may be implemented by hardware or software. If the series of processes is implemented by software, a program constituting the software is installed in a general computer or the like.

Figure 28:
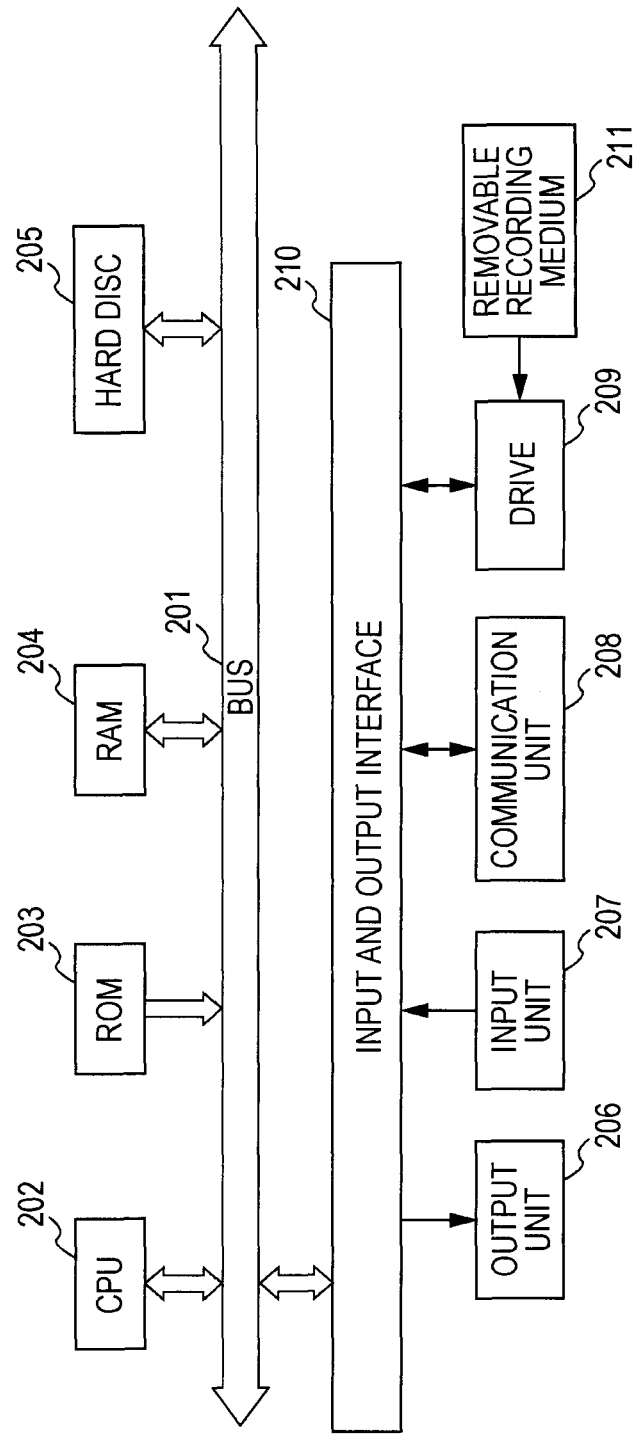
FIG. 28 is a block diagram illustrating a configuration example of a computer according to an embodiment of the present invention.

FIG. 28 shows a configuration example of an embodiment of a computer in which the program executing the above-described series of processes is installed.

The program may be in advance recorded in a hard disc 205 or a ROM 203 which is a recording medium embedded in the computer.

Alternatively, the program may be stored (recorded) in a removable recording medium 211. The removable recording medium 211 may be provided as so-called package software. Here, the removable recording medium 211 includes, for example, a flexible disc, a CD-ROM (compact disc read only memory), an MO (magneto optical) disc, a DVD (digital versatile disc), a magnetic disc, a semiconductor memory, and so on.

As well as the program is installed to the computer from the removable recording medium 211 as described above, the program may be downloaded to the computer through a communication network or a broadcasting network and installed in the embedded hard disc 205. That is to say, the program may be wirelessly transmitted to the computer from a download site, through an artificial satellite for digital satellite broadcasting, or may be transmitted to the computer through a network such as LAN (local area network) or the Internet, in a wire manner.

The computer is equipped with a CPU (central processing unit) 202, and the CPU 202 is connected to an input and output interface 210 via a bus 201.

The CPU 202 receives commands from a user by an operation of an input unit 207 via the input and output interface 210, and executes the program stored in the ROM (read only memory) 203 in response to the commands. The CPU 202 executes the program by loading the program stored in the hard disc 205 to the RAM (random access memory) 204.

Thus, the CPU 202 performs the processes according to the above-described flowcharts or the processes carried out by the configuration of the above-described block diagram. In addition, if necessary, the CPU 202, for example, outputs the process result from an output unit 206, transmits the process result from the communication unit 208 via the input and output interface 210, records the process result in the hard disc 205, or the like.

In addition, the input unit 207 includes a keyboard, a mouse, a microphone, and so forth. The output unit 206 includes an LCD (liquid crystal display), a speaker, and so forth.

Here, in this specification, the processes which the computer performs according to the program are not necessarily performed in a time series based on the order described in the flowcharts. In other words, the processes which the computer performs according to the program also include processes performed in parallel or individually (for example, parallel processes or processes by an object).

In addition, the program may be processed by a single computer (processor) or may be dispersedly processed by a plurality of computers. The program may be executed by being transmitted to a distant computer.

The embodiments of the present invention are not limited to the above-described embodiments, but may have a variety of modifications without departing from the scope of the present invention.

The present application contains subject matter related to that disclosed in Japanese Priority Patent Application JP 2009-258208 filed in the Japan Patent Office on Nov. 11, 2009 and Japanese Priority Patent Application JP 2010-179355 filed in the Japan Patent Office on Aug. 10, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising a model learning means that carries out learning for self-organization of internal states of a state transition prediction model which is a learning model having internal states, a transition model of the internal states, and an observation model where observed values are generated from the internal states, by using first time series data,
a recognition means that recognizes time series data by using the state transition prediction model, and obtains a maximum likelihood sequence which is a sequence of the states generating a state transition such that a likelihood where the time series data is observed is maximized; and
an action signal generation means that generates an action signal causing a predetermined state transition based on a result of an action learning where a relationship between an action signal for making an agent capable of doing an action do a predetermined action and a state transition caused by an action responding to the action signal is learned,
wherein the model learning means learns the observation model of the state transition prediction model after the learning using the first time series data, by holding steady the transition model and using second time series data different from the first time series data, thereby obtaining the state transition prediction model having a first observation model where each sample value of the first time series data is observed and a second observation model where each sample value of the second time series data is observed,
wherein the first time series data is a sequence of the first observed values observed from the agent,
wherein the second time series data is a sequence of the second observed values observed from an object other than the agent,
wherein the recognition means recognizes the second time series data by using the state transition prediction model, and obtains a maximum likelihood sequence where the second time series data is observed, as an imitation sequence to be imitated by the agent, and wherein the action signal generation means generates an action signal causing a state transition in the imitation sequence.

2. The information processing device according to claim 1, wherein the model learning means carries out learning for self-organization of a state transition prediction model which is a learning model having a transition probability of a state transition between internal states where observed values are observed and an observation likelihood where observed values are observed from the internal states, by using first time series data, and learns the state transition prediction model after the learning using the first time series data by holding steady the transition probability and using second time series data different from the first time series data, thereby obtaining the state transition prediction model having a first observation likelihood where each sample value of the first time series data is observed and a second observation likelihood where each sample value of the second time series data is observed.

3. The information processing device according to claim 2, wherein the state transition prediction model comprises a plurality of states as the internal states,
    wherein each state is defined by:
        an initial state probability in an initial state;
        a transition probability that a state transition is generated between the states;
        a first observation likelihood where a first observed value is observed in each state; and
        a second observation likelihood where a second observed value different from the first observed value is observed in each state, and
    wherein the model learning means obtains the initial state probability, the transition probability, and the first observation likelihood through learning according to a Baum-Welch algorithm by using the first time series data, and carries out learning according to the Baum-Welch algorithm through use of the second time series data by holding steady the initial state probability and the transition probability obtained using the first time series data, thereby obtaining the second observation likelihood.

4. The information processing device according to claim 3, further comprising a planning unit that designates one state as a start state and another state as a target state in the state transition prediction model, and obtains a state sequence having a maximum likelihood of a state transition from the start state to the target state, as a plan of reaching the target state from the start state,
    wherein the recognition means recognizes the first time series data by using the state transition prediction model, and obtains a current state which is a state corresponding to a current situation of the agent,
    wherein when the current state is the same as an initial state in the imitation sequence, the action signal generation means generates an action signal causing a state transition in the imitation sequence, and
    wherein when the current state is not the same as the initial state of the imitation sequence, the planning means designates the current state as the start state and the initial state in the imitation sequence as the target state, thereby obtaining the plan, and, the action signal generation means generates an action signal causing a state transition in the plan and thereafter generates an action signal causing a state transition in the imitation sequence.

5. The information processing device according to claim 3, wherein the second time series data is time series data different in kind from the first time series data.

6. The information processing device according to claim 3, wherein the second observed value which is a sample value of the second time series data is image data obtained by photographing a subject which is an object other than the agent.

7. The information processing device according to claim 6, wherein the subject is another agent which can do the same action as the agent.

8. The information processing device according to claim 6, wherein the agent has a rotatable movable part, and the first observed value which is a sample value of the first time series data is a rotation angle of the movable part.

9. A program enabling a computer to function as a model learning means that carries out learning for self-organization of internal states of a state transition prediction model which is a learning model having internal states, a transition model of the internal states, and an observation model where observed values are generated from the internal states, by using first time series data,
    a recognition means that recognizes time series data by using the state transition prediction model, and obtains a maximum likelihood sequence which is a sequence of the states generating a state transition such that a likelihood where the time series data is observed is maximized; and
    an action signal generation means that generates an action signal causing a predetermined state transition based on a result of an action learning where a relationship between an action signal for making an agent capable of doing an action do a predetermined action and a state transition caused by an action responding to the action signal is learned,
    wherein the model learning means learns the observation model of the state transition prediction model after the learning using the first time series data, by holding steady the transition model and using second time series data different from the first time series data, thereby obtaining the state transition prediction model having a first observation model where each sample value of the first time series data is observed and a second observation model where each sample value of the second time series data is observed,
    wherein the first time series data is a sequence of the first observed values observed from the agent,
    wherein the second time series data is a sequence of the second observed values observed from an object other than the agent,
    wherein the recognition means recognizes the second time series data by using the state transition prediction model, and obtains a maximum likelihood sequence where the second time series data is observed, as an imitation sequence to be imitated by the agent, and
    wherein the action signal generation means generates an action signal causing a state transition in the imitation sequence.

10. An information processing device comprising a model learning unit that carries out learning for self-organization of internal states of a state transition prediction model which is a learning model having internal states, a transition model of the internal states, and an observation model where observed values are generated from the internal states, by using first time series data,
    a recognition means that recognizes time series data by using the state transition prediction model, and obtains a maximum likelihood sequence which is a sequence of the states generating a state transition such that a likelihood where the time series data is observed is maximized; and an action signal generation means that generates an action signal causing a predetermined state transition based on a result of an action learning where a relationship between an action signal for making an agent capable of doing an action do a predetermined action and a state transition caused by an action responding to the action signal is learned, wherein the model learning unit learns the observation model of the state transition prediction model after the learning using the first time series data, by holding steady the transition model and using second time series data different from the first time series data, thereby obtaining the state transition prediction model having a first observation model where each sample value of the first time series data is observed and a second observation model where each sample value of the second time series data is observed, wherein the first time series data is a sequence of the first observed values observed from the agent, wherein the second time series data is a sequence of the second observed values observed from an object other than the agent, wherein the recognition means recognizes the second time series data by using the state transition prediction model, and obtains a maximum likelihood sequence where the second time series data is observed, as an imitation sequence to be imitated by the agent, and wherein the action signal generation means generates an action signal causing a state transition in the imitation sequence.

* * * * *

UNITED STATES PATENT AND TRADEMARK OFFICE
CERTIFICATE OF CORRECTION

PATENT NO. : 8,447,708 B2  Page 1 of 1
APPLICATION NO. : 12/915616
DATED : May 21, 2013
INVENTOR(S) : Kohtaro Sabe It is certified that error appears in the above-identified patent and that said Letters Patent is hereby corrected as shown below:

On the Title Page, after Item (30), the Foreign Application Priority Data for P2009-258208, and before item (51),
insert the following missing data:

--Aug. 10, 2010 (JP).................................................P2010-179355--

Signed and Sealed this
Twelfth Day of November, 2013

Teresa Stanek Rea
*Deputy Director of the United States Patent and Trademark Office*